United States Patent
Woodard et al.

(10) Patent No.: US 7,159,774 B2
(45) Date of Patent: Jan. 9, 2007

(54) MAGNETIC FIELD RESPONSE MEASUREMENT ACQUISITION SYSTEM

(75) Inventors: Stanley E. Woodard, Hampton, VA (US); Bryant D. Taylor, Smithfield, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/305,854

(22) Filed: Dec. 16, 2005

(65) Prior Publication Data
US 2006/0124740 A1 Jun. 15, 2006

Related U.S. Application Data

(63) Continuation of application No. 10/839,445, filed on Apr. 30, 2004.

(60) Provisional application No. 60/467,844, filed on Apr. 30, 2003, provisional application No. 60/467,840, filed on May 1, 2003, provisional application No. 60/467,841, filed on May 1, 2003, provisional application No. 60/467,113, filed on May 1, 2003, provisional application No. 60/467,839, filed on May 1, 2003, provisional application No. 60/467,842, filed on May 1, 2003, provisional application No. 60/467,112, filed on May 1, 2003, provisional application No. 60/467,194, filed on May 1, 2003.

(51) Int. Cl.
*G06K 7/08* (2006.01)
(52) U.S. Cl. ..................................... 235/449
(58) Field of Classification Search ................ 235/384, 235/435, 439, 449
See application file for complete search history.

(56) References Cited

U.S. PATENT DOCUMENTS

| 3,444,738 | A |   | 5/1969  | Grangaard, Jr. et al. |
|-----------|---|---|---------|-----------------------|
| 3,755,803 | A | * | 8/1973  | Cole et al. ............... 340/572.1 |
| 3,975,706 | A |   | 8/1976  | Kato |
| 4,127,110 | A |   | 11/1978 | Bullara |
| 4,302,965 | A |   | 12/1981 | Johnson et al. |
| 4,556,063 | A |   | 12/1985 | Thompson et al. |
| 4,594,640 | A |   | 6/1986  | Tatsumi |
| 4,750,359 | A |   | 6/1988  | Johnson et al. |
| 4,912,407 | A |   | 3/1990  | Gualtieri et al. |
| 4,929,896 | A | * | 5/1990  | Lara ........................... 324/240 |

(Continued)

OTHER PUBLICATIONS

John C. Butler, Anthony J. Vigliotti, Fred W. Verdi, & Shawn M. Walsh, "Wireless, passive, resonant-circuit, inductively coupled, inductive strain sensor," Elsevier, Elsevier Science B.V., p. 63-66.

(Continued)

*Primary Examiner*—Daniel Stcyr
(74) *Attorney, Agent, or Firm*—Robin W. Edwards

(57) ABSTRACT

Magnetic field response sensors designed as passive inductor-capacitor circuits produce magnetic field responses whose harmonic frequencies correspond to states of physical properties for which the sensors measure. Power to the sensing element is acquired using Faraday induction. A radio frequency antenna produces the time varying magnetic field used for powering the sensor, as well as receiving the magnetic field response of the sensor. An interrogation architecture for discerning changes in sensor's response frequency, resistance and amplitude is integral to the method thus enabling a variety of measurements. Multiple sensors can be interrogated using this method, thus eliminating the need to have a data acquisition channel dedicated to each sensor. The method does not require the sensors to be in proximity to any form of acquisition hardware. A vast array of sensors can be used as interchangeable parts in an overall sensing system.

20 Claims, 26 Drawing Sheets

U.S. PATENT DOCUMENTS

| | | |
|---|---|---|
| 4,977,786 A | 12/1990 | Davis |
| 5,075,600 A | 12/1991 | El-Hamamsy et al. |
| 5,420,757 A | 5/1995 | Eberhardt et al. |
| 5,423,206 A | 6/1995 | Hetzel |
| 5,423,334 A | 6/1995 | Jordan |
| 5,608,417 A | 3/1997 | de Vall |
| 5,750,939 A | 5/1998 | Makinwa et al. |
| 5,832,772 A | 11/1998 | McEwan |
| 5,873,840 A | 2/1999 | Neff |
| 5,881,310 A * | 3/1999 | Airhart et al. ............ 710/3 |
| 5,909,171 A | 6/1999 | Kyrtsos |
| 5,942,991 A | 8/1999 | Gaudreau et al. |
| 5,975,250 A | 11/1999 | Brandmeier et al. |
| 6,025,725 A | 2/2000 | Gershenfeld et al. |
| 6,025,735 A | 2/2000 | Gardner et al. |
| 6,111,520 A | 8/2000 | Allen et al. |
| 6,164,132 A | 12/2000 | Matulek |
| 6,165,135 A | 12/2000 | Neff |
| 6,250,430 B1 | 6/2001 | Kyrtsos |
| 6,278,379 B1 | 8/2001 | Allen et al. |
| 6,335,690 B1 | 1/2002 | Konchin et al. |
| 6,359,444 B1 | 3/2002 | Grimes |
| 6,384,721 B1 | 5/2002 | Paielli |
| 6,412,977 B1 | 7/2002 | Black et al. |
| 6,450,300 B1 | 9/2002 | Kramer |
| 6,463,798 B1 | 10/2002 | Niekerk et al. |
| 6,490,920 B1 | 12/2002 | Netzer |
| 6,517,483 B1 | 2/2003 | Park et al. |
| 6,532,834 B1 | 3/2003 | Pinto et al. |
| 6,546,795 B1 | 4/2003 | Dietz |
| 6,615,954 B1 | 9/2003 | Wirth et al. |
| 6,639,402 B1 | 10/2003 | Grimes et al. |
| 6,642,720 B1 | 11/2003 | Maylotte et al. |
| 6,677,859 B1 | 1/2004 | Bensen |
| 6,834,251 B1 * | 12/2004 | Fletcher ............ 702/150 |

OTHER PUBLICATIONS

K.G. Ong, C.A. Grimes, C.L. Robbins, & R.S. Singh, "Design and application of a wireless, passive, resonant-circuit environmental monitoring sensor," Elsevier, Elsevier Science B.V., p. 33-43.

Keat Ghee Ong & Craig A. Grimes, "A resonant printed-circuit sensor for remote query monitoring of environmental parameters," Smart Materials Strut. 9 (2000), p. 421-428.

* cited by examiner

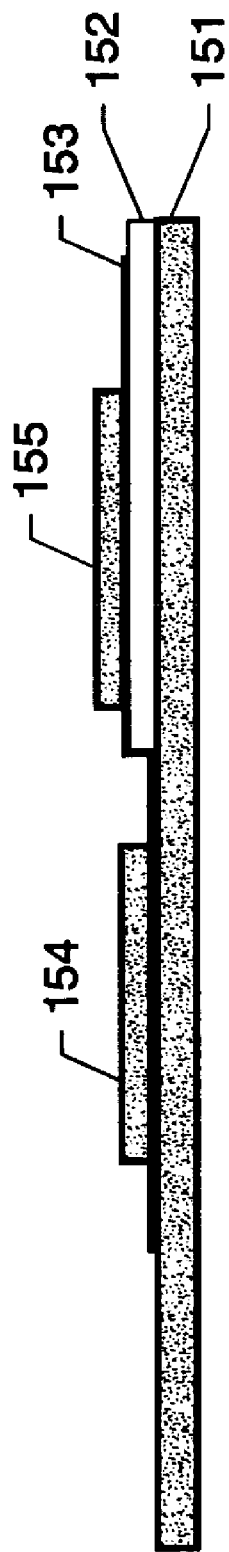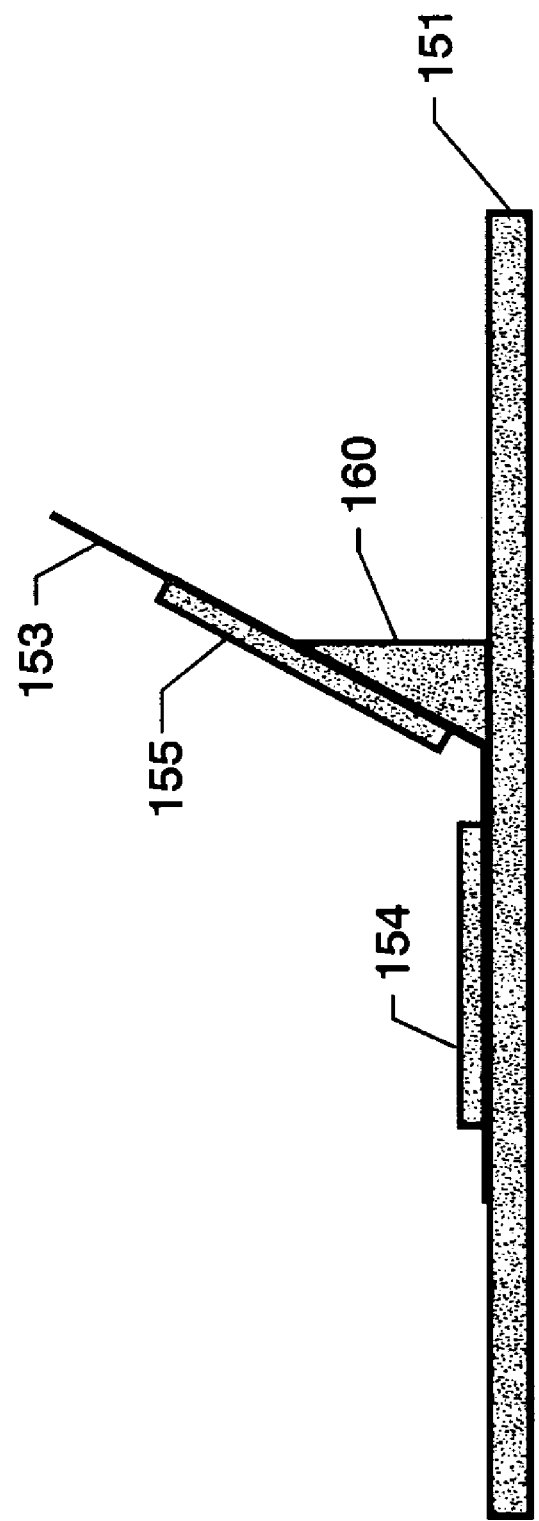

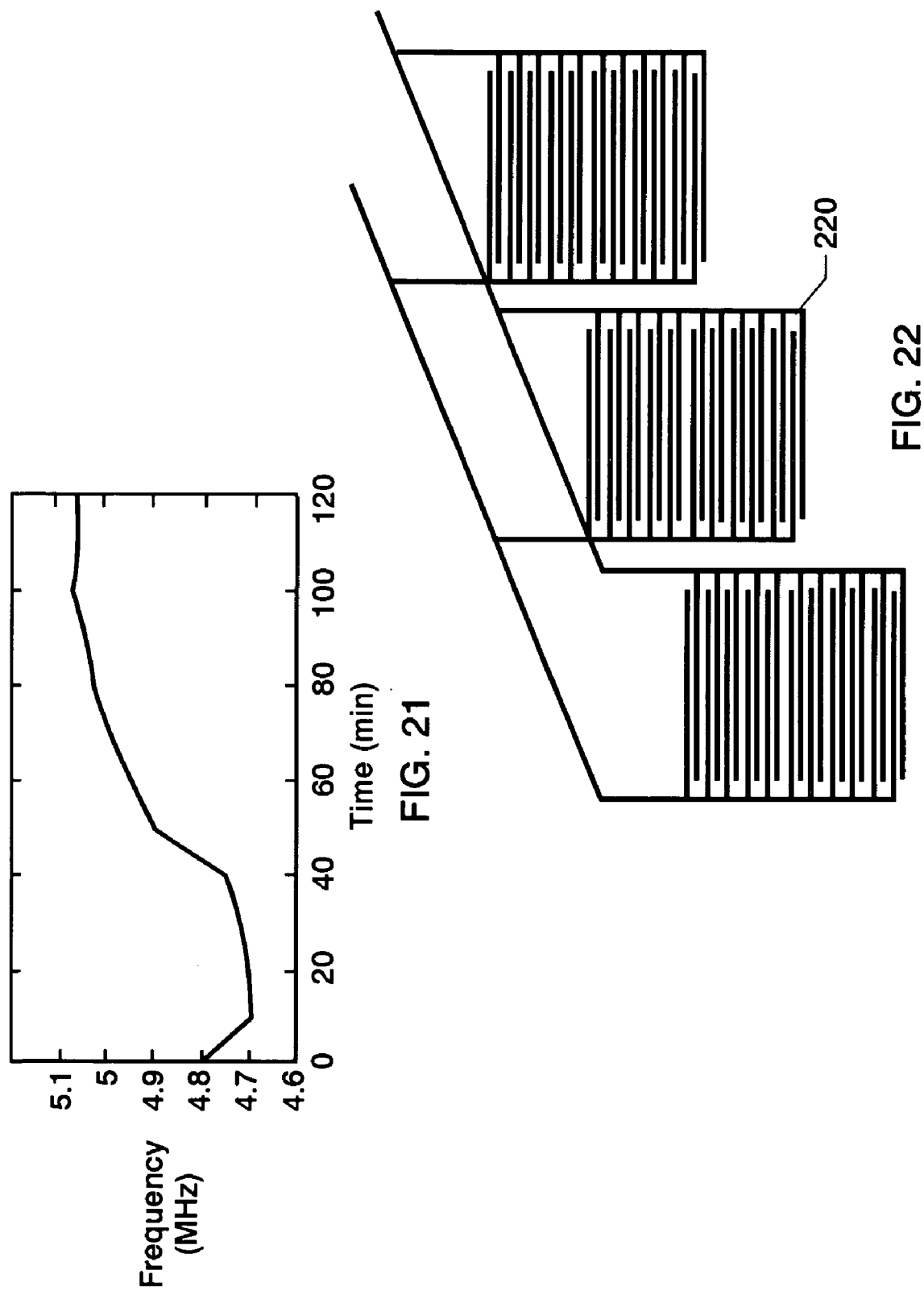

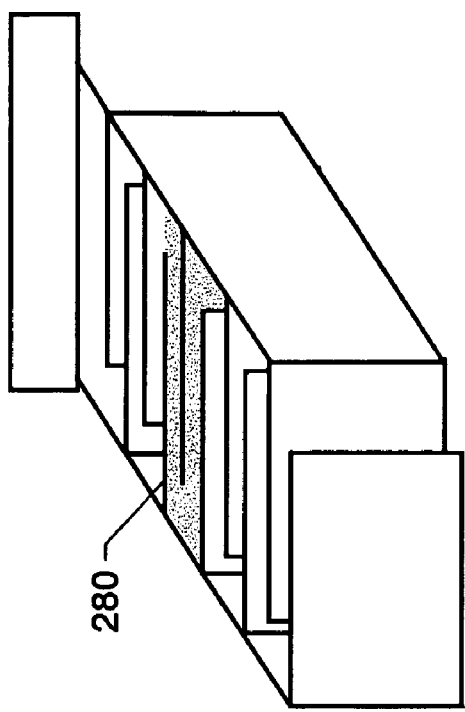
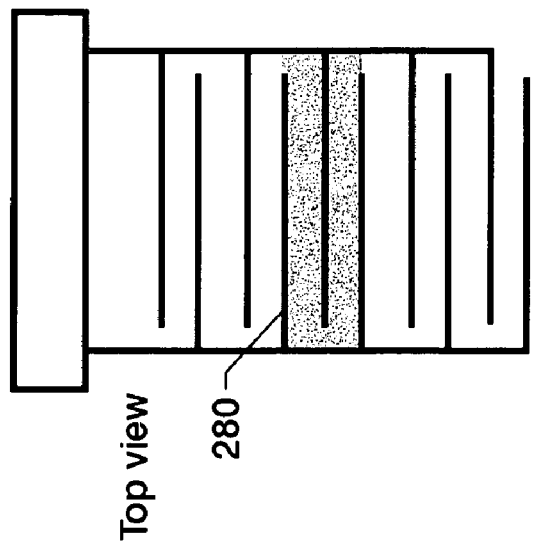
FIG. 28
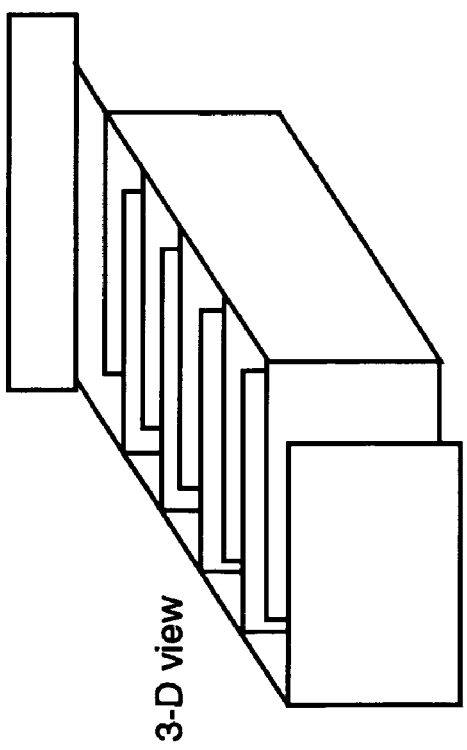
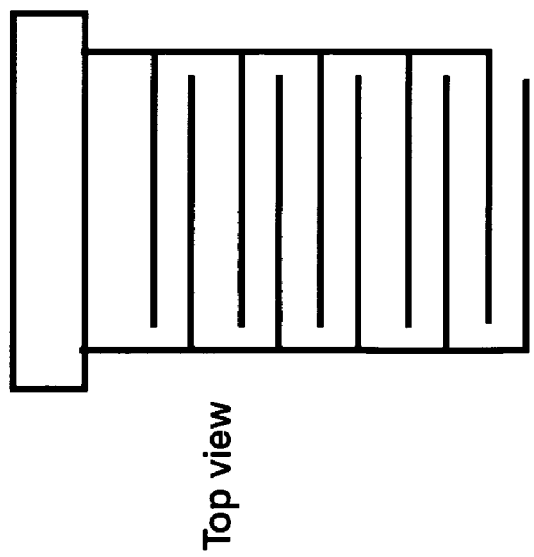
FIG. 27

US 7,159,774 B2

MAGNETIC FIELD RESPONSE MEASUREMENT ACQUISITION SYSTEM

CLAIM OF BENEFIT OF PROVISIONAL APPLICATION

Pursuant to 35 U.S.C. § 119, the benefit of priority from provisional applications having U.S. Ser. Nos. 60/467,844, filed on Apr. 30, 2003; 60/467,840, filed on May 1, 2003; 60/467,841, filed on May 1, 2003; 60/467,113, filed on May 1, 2003; 60/467,839, filed on May 1, 2003; and 60/467,842 filed on May 1, 2003; 60/467,112, filed on May 1, 2003; and 60/467,194, filed May 1, 2003 is claimed for this nonprovisional application.

CROSS-REFERENCE TO RELATED APPLICATIONS

This application is related to co-pending, commonly owned patent application Ser. No. 10/839,448, filed Apr. 30, 2004, entitled "Magnetic Field Response Sensor for Conductive Media," and is a continuation of co-pending, commonly owned patent application Ser. No. 10/839,445, filed Apr. 30, 2004, entitled "Magnetic Field Response Measurement Acquisition System."

STATEMENT REGARDING FEDERALLY SPONSORED RESEARCH OR DEVELOPMENT

The invention described herein was made in part by employees of the United States Government and may be manufactured and used by and for the Government of the United States for governmental purposes without the payment of any royalties thereon or therefore.

BACKGROUND OF THE INVENTION

1. Field of the Invention

The present invention relates generally to a remote monitoring system. It relates in particular to a monitoring system comprising one or more sensors, which utilize L-C (inductance-capacitance) or L-C-R (inductance-capacitance-resistance) resonant circuits, in combination with an interrogation means, to monitor a variety of properties, including strain, temperature, pressure, identification, performance, chemical phase transition (such as melting and state-of-cure), fluid level, wear, rotation rate, location and proximity. The system eliminates the need for physical connection to a power source (i.e., no lead wires) or to data acquisition equipment, and allows for multiple measurements using a single acquisition channel. Additionally, it does not require that the sensors be in proximity to any form of acquisition hardware and it facilitates use of a portable handheld interrogation unit.

2. Description of the Related Art

A magnetic field response sensor is a passive inductor-capacitive circuit designed to change correspondingly with a change in the physical state that the sensor measures. Use of inductors and capacitors to form resonant circuits is established in the literature. See, for example, D. Halliday and R. Resnick, *Fundamental of Physics*, 2nd Edition, Wiley, N.Y., pp. 624–634 or similar basic physics or electronics texts. Wireless measurement acquisition systems that use existing sensors physically connected to a power source, microprocessor and transmitters are described in Woodard, S. E., Coffey, N. C., Gonzalez, G. A., Taylor, B. D., Brett, R. R., Woodman, K. L., Weathered, B. W. and Rollins, C. H., "Development and Flight Testing of an Adaptable Vehicle Health-Monitoring Architecture," Journal of Aircraft, Vol. 41, No. 3, May–June 2004, pp. 531–539. A method of acquiring measurements without the need for physical connection to a power source is the use of radio frequency identification (RFID) tags. This method relies on the use of radio frequency integrated circuits functionally coupled to sensors. Representative of patents covering RFID tags is U.S. Pat. No. 5,420,757. An example of a system for interrogating fluid level is that presented by Kochin et al. in U.S. Pat. No. 6,335,690, which teaches a preferred separation distance between the sensor and the interrogator of less than 3.5 cm. U.S. Pat. No. 6,111,520 (Allen) and Fonseca, M. A., English, J. M., Arx, M. V. Allen, M. G., "High Temperature Characterization of Ceramic Pressure Sensors," Proceeding of 1999 IEEE MEMS Workshop, pp 146–149 discuss several methods of magnetic field response sensor interrogation having the sensors within the perimeter of the antenna used for interrogation. Planar or laminar designs of L-C circuits include rectangular inductors (e.g., U.S. Pat. No. 6,025,735), spiral inductors (e.g., U.S. Pat. No. 6,111,520), parallel place capacitors (e.g. U.S. Pat. No. 6,335,690) and interdigitated capacitors (e.g., see K. G. Ong and C.A. Gaines, *Smart Materials Structure*, (9) 2000; 421–428).

SUMMARY OF THE INVENTION

Accordingly, it is an object of the present invention to provide a magnetic field response measurement acquisition system having increased interrogation antenna and sensor separation distance.

Another object is the interrogation of multiple sensors concurrently using a single acquisition channel.

Another object is to provide a magnetic field response measurement acquisition system having a portable interrogator.

An additional object is to provide a magnetic field response measurement acquisition system enabling the easy incorporation of additional sensors.

Another object is to provide a magnetic field response measurement acquisition system capable of acquiring more than one measurement from each sensing element.

A further object is to facilitate multiple measurements whose dynamic characteristics affect different attributes of the sensor's magnetic field response.

Additional objects and advantages of the present invention are apparent from the drawings and specification which follow.

In accordance with the present invention, a magnetic field response wireless measurement acquisition system comprises an interrogator which may be portable and handheld, at least one inductively powered L-C sensor, and software to determine sensor properties (e.g., resonant frequency, bandwidth, amplitude, etc.). The interrogator and software can be used with L-C sensors that measure a variety of parameters, including temperature, pressure, strain, location, rotation rate, and other parameters. The sensors convey basic waveform information (e.g., frequency, bandwidth, etc.) that is dependent solely on the properties being measured, and do not require wide bandwidths to transmit modulated information. The sensors emit a single radio frequency (RF) transmission, thus there is no requirement that information be transmitted as a modulated signal on the RF carrier. As a result, the sensors can be designed to have a higher Q (i.e., narrower bandwidth) than existing wireless sensing systems. This higher Q sensor can be interrogated at a greater distance and at lower power than lower Q sensors. There is also potentially less interference from neighboring sensors and higher sensor densities. Additionally, simplified system architecture enables the interrogator to be built into a handheld unit. An algoritlun quickly determines the characteristic sensor parameters in an efficient manner, not requiring storage of readings across a spectral range and subsequent analysis of the ordered pairs. A vast array of sensors can be used as interchangeable parts in an overall L-C sensing system.

BRIEF DESCRIPTION OF THE DRAWINGS

FIG. 15 is an illustration of a sensor mounted on a conductive surface via a spacer.

FIG. 16 is an illustration of a sensor mounted on a conductive surface with the inductor projected away from the conductive surface.

FIG. 21 is a graph of time history of sensor response during resin curing.

FIG. 22 is a schematic of a sensor embodiment for wear or thermal measuring utilizing interdigital electrodes.

FIG. 27 illustrates interdigital electroplates.

FIG. 28 illustrates an embodiment of interdigital electroplates with temperature sensitive dielectric, thermomagnetic or a phase transition dielectric between the electroplates.

DETAILED DESCRIPTION OF THE INVENTION

Figure 1:
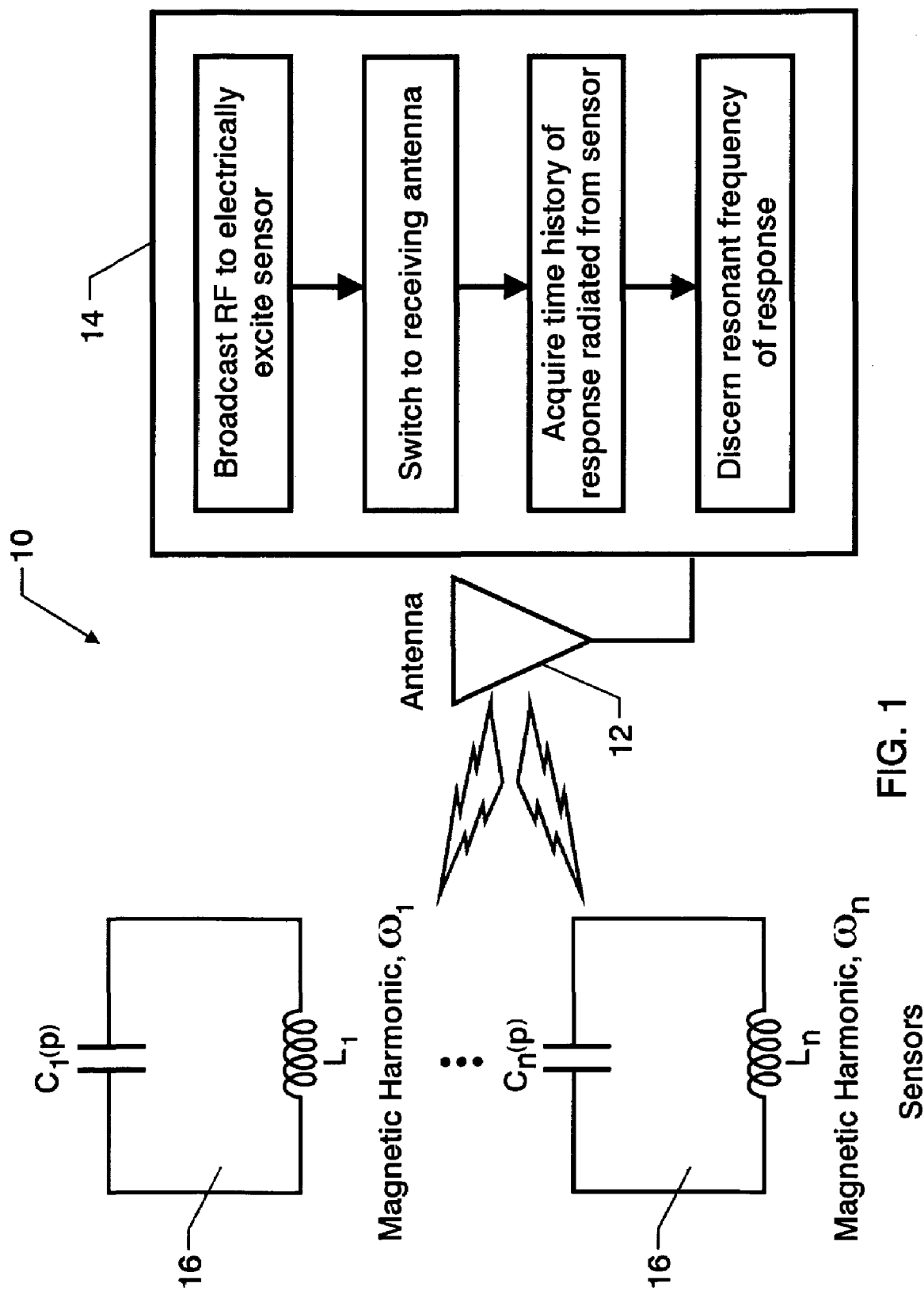
FIG. 1 is a schematic of an embodiment of an L-C measurement acquisition system in accordance with the present invention.

Referring now to the drawings, and more particularly to FIG. 1, an embodiment of a magnetic field response measurement acquisition system in accordance with the present invention is shown and referenced generally by numeral 10. Acquisition system 10 will first be described in terms of a general overview with the aid of FIG. 1.

Radio Frequency (RF) broadband antenna 12 transmits and receives RF energy. Processor 14 regulates the RF transmission and reception. Processor 14 includes algorithms embodied in software for controlling the antenna 12 and for analyzing the RF signals received from the one or more magnetic field response sensors 16. Sensors 16 are passive inductor-capacitor L-C circuits or inductor-capacitor-resistor L-C-R circuits. Each inductor L is placed in parallel with a capacitor C, forming an L-C(p) circuit. Processor 14 modulates the input signal to the antenna 12 to produce either a broadband time-varying magnetic field or a single harmonic magetic field. The variable magnetic field creates an electrical current in the sensors 16 as a result of Faraday induction. Each sensor 16 will electrically oscillate at resonant electrical frequencies that are dependent upon the capacitance and inductance of each sensor 16. The oscillation occurs as the energy is harmonically transferred between the inductor (as magnetic energy) and capacitor (as electrical energy). When the energy is in the inductors, the magnetic fields produced are single harmonic radio frequencies whose frequencies are the respective sensor 16 resonant frequencies, and are dependent on how the physical measured property changes the capacitance of the circuit. The antenna 12 is also used to receive the harmonic magnetic responses produced by the inductors. The receiving antenna can be the same antenna used to produce the initial broadcast of energy received by the L-C circuit or another antenna can be used. When the same antenna is used, it must be switched from a transmitting antenna to a receiving antennna. A simple microprocessor can be used to identify the frequencies of the signals received by the antenna 12. The measured frequencies are then correlated to measurement of physical states.

Figure 2:
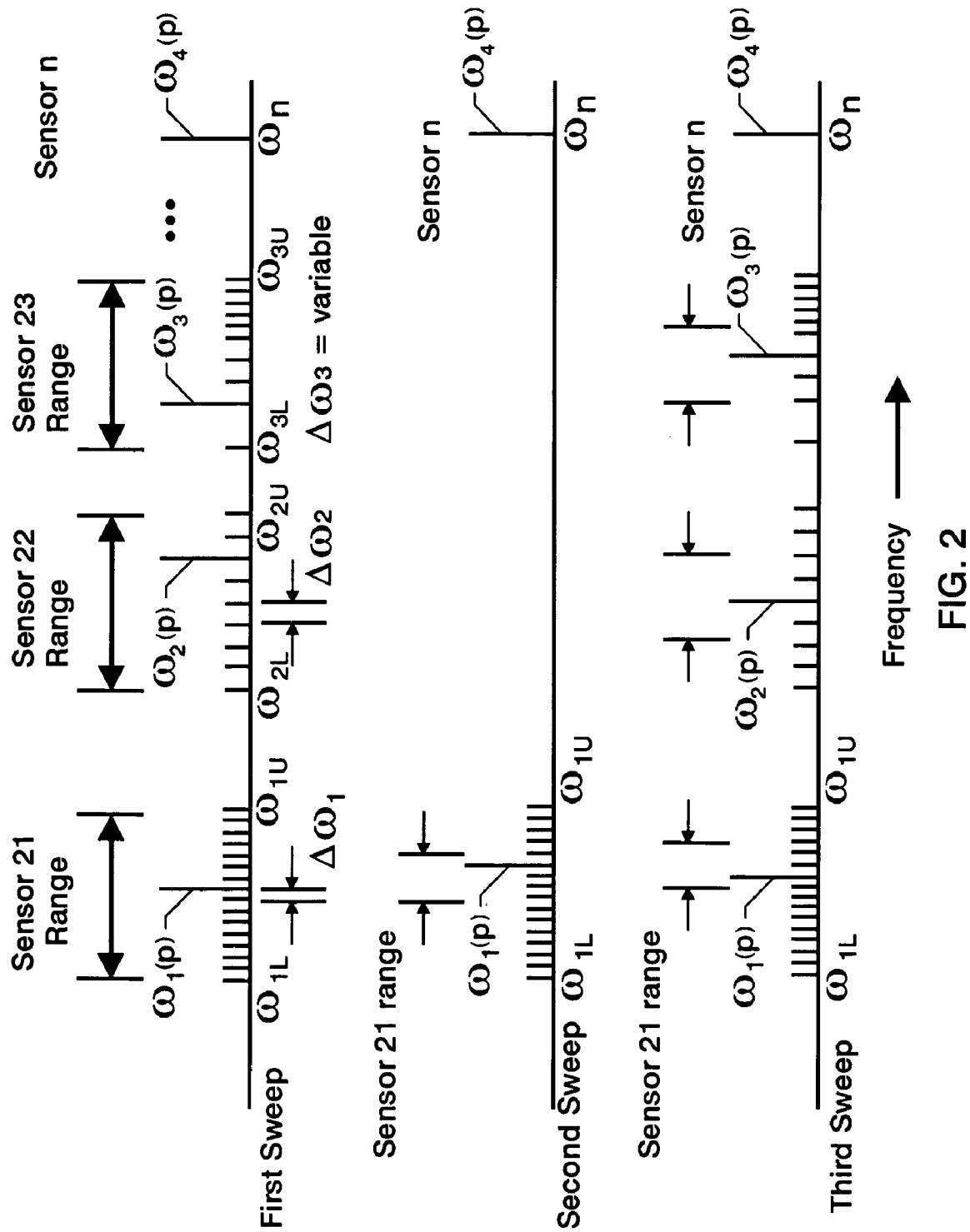
FIG. 2 is a schematic of magnetic field response sensor measurement bands.

As illustrated in FIG. 2, the sensors 16 are designed such that their range of measurement frequencies do not overlap, but are within a frequency range of the antenna 12. The individual ranges of resonant frequencies correspond to physical property values that can be measured. The capacitors are designed such that, when electrically coupled to the inductors, their range of values will be a predetermined partition of the RF frequency band. This method allows for any number of sensors 16 within the range of the antenna 12 to be interrogated concurrently.

The use of magnetic field sensors 16 and the measurement architecture of the present invention greatly reduces measurement acquisition complexity. The magnetic field response sensor 16 is a passive inductor-capacitive circuit designed to change correspondingly with a change in the physical state that the sensor 16 measures, and acquires power via Faraday induction. Sensing is provided by measuring resonant frequency shifts due to changes in inductance or capacitance, requiring no batteries. The harmonic magnetic field response of the inductor serves as a means of transmitting the resonant. Key attributes of the magnetic field response are amplitude, frequency and bandwidth. The sensors 16 can be designed such that one of the attributes varies correspondingly with the measured physical state. An RF antenna can produce the time varying magnetic field used for the Faraday induction, as well as receive the magnetic fields of the the sensor 16. The use of magnetic fields for powering the sensors 16 and for acquiring the measurements from the sensors 16 eliminates the need for physical connection from the sensor 16 to a power source and data acquisition equipment. The architecture also eliminates the need to have a data acquisition channel dedicated to each sensor 16. Multiple concurrent measurements can be accomplished with a single acquisition channel and multiple sensors, each with a different resonant frequency, can be probed by the broadband antenna 12.

Capacitor geometric, capacitor dielectric, inductor geometric or inductor permeability changes of a sensor will result in magnetic field response frequency change. Any resistive change will result in a response bandwidth change. Dielectric variations (e.g., due to the presence of chemical species or due to a material phase transition) to the capacitor can be designed for specific measurements. Further, a resistive element whose resistance changes with a physical parameter can also be placed in circuits of fixed capacitance and inductance. Hence, the system has the potential for acquiring many different types of measurements. Because the sensors' 16 functionality is based upon magnetic fields, they have potential use at cryogenic temperatures, extremely hot temperatures, harsh chemical environments and radiative environments.

When a sensor's 16 inductor comes in proximity to a conductive material, energy is lost in the sensor due to eddy currents being produced in the conductive material. As the sensor is brought closer to the material, the response amplitude decreases while the response frequency increases. Hence, this effect can be used to determine proximity to conductive surfaces. Otherwise, it is necessary to maintain a fixed separation. If capacitance and inductance are fixed, changes to a sensor's 16 orientation or position with respect to interrogating antenna 12 changes response amplitude. The interrogation system of the present invention allows for the acquisition of measurements from any magnetic field response sensor 16 developed to exploit the aforementioned phenomena. The system also allows for autonomous sensor interrogation, analysis of collected response to value of physical state and comparison of current measurements with prior measurements to produce dynamic measurements.

The measurement acquisition method can be used to acquire measurements even when the sensor 16 is embedded in material that is transmissive to the RF energy that interrogates the sensor 16. An advantage of this method is that the components for the method can be non-obtrusively added to the vehicle/system for which it is being used. An antenna 12 can be produced as a metallic foil or as metal deposited on a thin dielectric film. Either aforementioned version of the antenna 12 can be mounted to an existing bulkhead or other structural component. For some applications, sensors 16 can be fabricated using metal deposition methods. Metal deposition can be used to add sensors to a vehicle/structure during manufacturing. Other advantages of the method include (1) no line of sight being required between the antenna 12 and sensor 16, (2) the ability of the entire sensor 16 to be embedded in a nonconductive material, (3) the ability to embed the capacitive element in a conducting material with the inductive element being placed away from the surface of the conductive material, (4) no specific orientation of the sensor 16 with respect to the antenna 12 is required except that they cannot be 90 degrees to one other, and (5) no wiring is required to add new measurements, only a partition of an RF bandwidth used in the measurement spectrum and a frequency/measurement correlation table.

Interrogation

Figure 3:
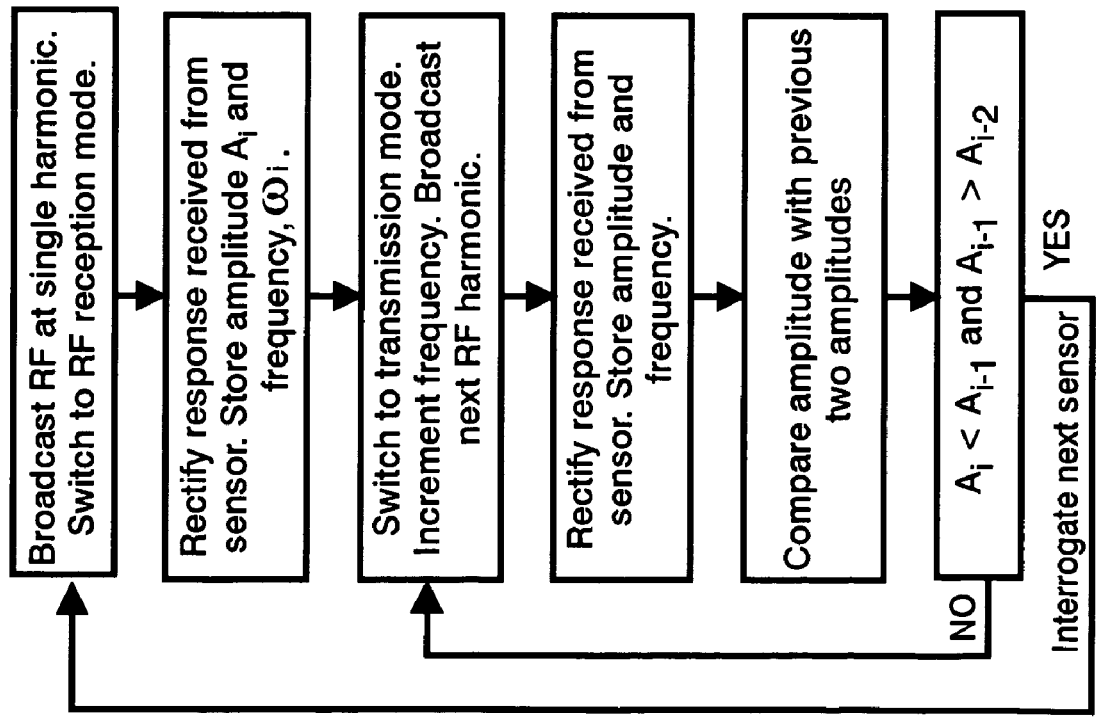
FIG. 3 is a flowchart illustrating interrogation logic.

Interrogation utilizes a scan-listen-compare technique, which allows for high signal-to-noise ratio. FIG. 3 illustrates the interrogation logic. Separate transmission and receiving antennae can be used or a single switching antenna can be used. Using two antennae provides a larger volumetric swath at which measurements can be taken, which is approximately double that of a single antenna. The interrogation procedure generally comprises the following steps:

(a) At the lower limit of a predetermined range, a radio frequency harmonic is transmitted for a predetermined length of time and then the transmission mode is swtiched off (i.e., the transmission antenna is turned off if two antennae are used or, if a single antenna is used, it ceases transmission).

(b) The receiving mode is then turned on (i.e., the receiving antenna is turned on if two antennae are used or, if a single antenna is used, it begins receiving). The received response from the sensor 16 is rectified to determine its amplitude. The amplitude, $A_i(t)$, and frequency, $\omega_i(t)$, are stored in memory.

(c) The receiving mode is turned off and the transmission mode is turned on. The transmitted radio frequency harmonic is then shifted by a predetermined amount.

The harmonic is transmitted for a predetermined length of time and then the transmission mode is turned off.

(d) The receiving mode is turned on. The received response from the sensor 16 is rectified to determine its amplitude. The amplitude, $A_i$, and frequency, $\omega_i$, are stored in memory.

(e) The current amplitude, $A_i$, is compared to the two previously attained (recorded) amplitudes, $A_{i-1}$ and $A_{i-2}$. If the previous amplitude, $A_{i-1}$, is greater than the current amplitude, $A_i$, and the previous amplitude $A_{i-1}$, is greater than amplitude prior to it, $A_{i-2}$, the previous amplitude, $A_{i-1}$, is the amplitude inflection. The amplitude inflection occurs when the excitation harmonic is equal to the resonant frequency of the sensor 16. The amplitude, $A_{i-1}$, and the corresponding frequency, $\omega_{i-1}$, are stored for the sensor 16 for the current frequency sweep.

These values can be compared to the values acquired during the next sweep. If an amplitude inflection has not been identified, then steps (c) and (d) are repeated.

(f) If amplitude inflection has been identified, the harmonic sweep continues to the next sensor 16.

FIG. 2 illustrates three antenna sweeps for n sensors 16. The initial frequency sweep can be used to identify and catalog (store) all key response attributes (resonant amplitudes and frequencies) associated with all n sensors 16 within the antenna's 12 range of interrogation. If a particular sensor 16 is resistive, its bandwidth will also be stored. The cataloged resonant amplitudes and frequencies for all sensors 16 can be used to reduce the sweep time for successive sweeps. For example, the next sweep to update each resonant frequency can start and end at a predetermined proximity to the cataloged resonant and then skip to the next resonant. Every sensor 16 does not need to be interrogated during each successive sweep. The interrogation rate for each sensor 16 should be dependent upon the rate that the physical state that sensor 16 measures changes. FIG. 2 illustrates interrogation of sensor 21 and sensor n during the second sweep. Sensors 21, 22 and 23 have frequency, bandwidth or amplitude changes corresponding to variations in their measured physical states. Sensor n only has amplitude variations corresponding to either a displacement or rotation measurement.

Measurement resolution is also depicted in FIG. 2. Each sensor 21, 22, 23 . . . n need not have the same resolution nor fixed resolution (e.g., sensor 23). The interrogation range of sensor 21 is reduced to be within a few frequency increments of the measurement acquired during the previous sweep. Dynamic measurements can also be produced by comparing variation in frequencies and amplitudes current sweeps with those of the prior sweeps. For example, if capacitance and inductance are fixed and if the circuit follows a known trajectory (e.g., displacement of a lever), the change in position of the sensor 16 is known by comparing the amplitude variations of successive sweeps. The method requires calibration to ascertain inductor magnetic response amplitude dependency to position from antenna 12 (i.e., (A(d))). The calibration correlates response amplitude with distance from the antenna 12. The time between measurements is $\Delta T$. Hence, displacement rate is derived as displacement rate=[d(A(sweep 1))–d(A(sweep 2))]/$\Delta T$.

Similarly, dynamic strain measurements can be determined by comparing the frequencies of successive amplitudes. The measurement system can also be used to identify an amplitude threshold at a set frequency. This is indicative of a certain antenna-inductor separation. If motion is rotary, the rate that the threshold is exceeded (number of times during a fixed duration) is indicative of rotation rate.

Figure 4:
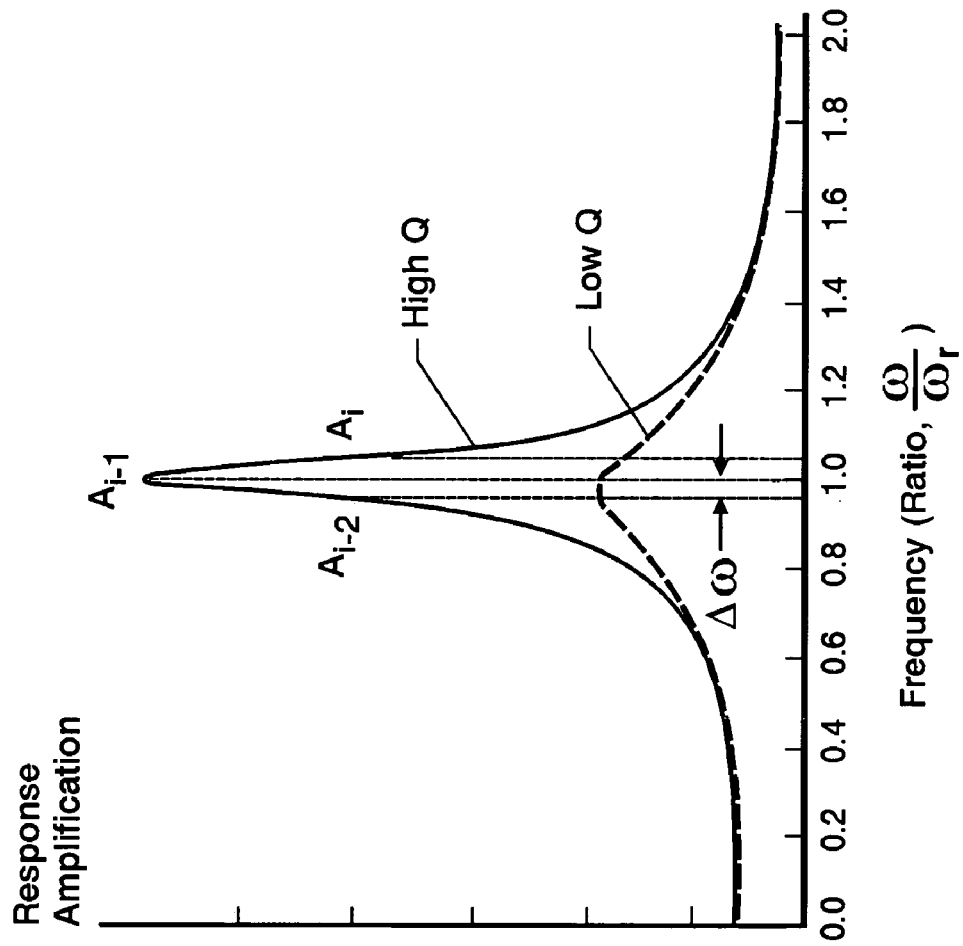
FIG. 4 is a graph of sensor response amplitude as excitation frequency approaches sensor resonant frequency.

The sweep of individual frequencies is used because it concentrates all energy used to excite the sensor 16 at a single frequency. FIG. 4 depicts a sensor's 16 response amplitude as the excitation frequency approaches the sensor's 16 resonant frequency. During each frequency sweep for each sensor 16 range, the current, $A_i$, and previous two amplitudes ($A_{i-1}$ and $A_{i-2}$) and frequencies are stored. The amplitudes are compared to identify the amplitude inflection. The frequency at which the amplitude inflection occurs is the resonant frequency. The purpose of the initial sweep is to ascertain all resonant frequencies and their corresponding amplitudes. Frequencies and amplitude values of successive sweeps can be compared to previous sweeps to ascertain if there is any change to a measured property or if the sensor 16 has moved with respect to the antenna 12. If the physical state has changed, the resonant frequency will be different from the prior sweep. If a sensor 16 has moved with respect to the antenna 12, the amplitudes will be different (frequency will remain constant). The magnitude and sign of the difference can be used to determine how fast the sensor 16 is moving and whether the sensor 16 is moving toward the antenna 12 or away from the antenna 12.

Figure 5:
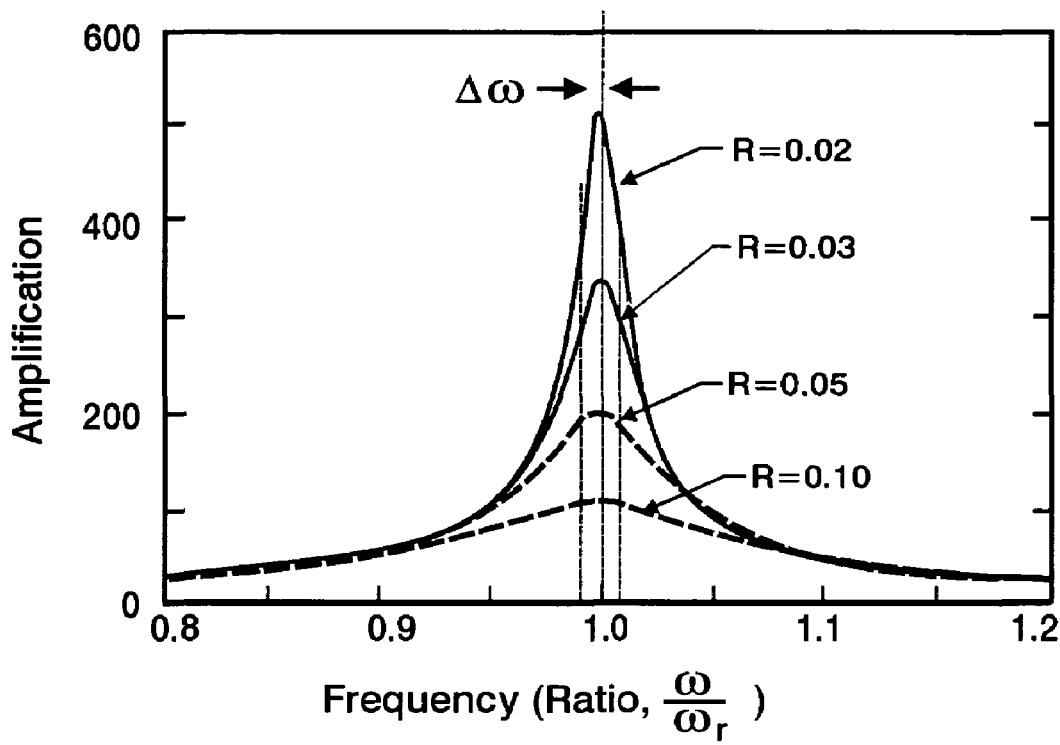
FIG. 5 illustrates resistive response curves.

The interrogation logic can be extended to allow for resistive measurements. Once the resonant frequency and its respective amplitude for a sensor 16 have been identified, the amplitude at a fixed frequency shift prior to the resonant is then acquired. The resistance is inversely proportional to the difference of the amplitudes. Resistive variations can be discerned using only two points of the magnetic field response curve. The bandwidth of the response is proportional to the circuit resistance. However, to measure bandwidth, it is necessary to identify the response peak and then measure the response curve on either side of the peak to ascertain the 3 dB reductions in amplitude. Identification of the 3 dB reduction would require measuring all amplitudes for each discrete frequency until the reduction amplitudes are identified. Another method to identify characterized resistance is to examine how much the amplitude is reduced from the peak at a fixed frequency, $\Delta\omega$, separation from the resonant frequency, $\omega_r$. FIG. 5 illustrates response curves for four resistive values. The difference in amplitude between peak response, $I_0$, and the amplitude at a fixed frequency away, $I(\omega^*)$, is inversely proportional to resistance. The sensor's 16 magnetic field is proportional to its current. The current at frequency $\omega^*$ is $$I(\omega^*) = \frac{\varepsilon_0}{\sqrt{\left(\omega^* L - \frac{1}{\omega^* C}\right)^2 + R^2}} \quad (1)$$

where $$\omega^* = \omega_r - \Delta\omega \quad (2)$$

The amplitude reduction is $$I(\omega_r) - I(\omega^*) = \varepsilon_0 \left(\frac{1}{R} - \frac{1}{\sqrt{S^{*2} + R^2}}\right) \quad (3)$$

where $$S^* = \omega^* L - \frac{1}{\omega^* C}. \quad (4)$$

Because $$\sqrt{S^{*2} + R^2} > R \text{ and} \quad (5)$$

$$\frac{1}{R} > \frac{1}{\sqrt{S^{*2} + R^2}}, \quad (6)$$

the above expression is monotonic with respect to R for fixed S*. Therefore, $$R = f(I(\omega_r) - I(\omega^*)). \quad (7)$$

Equation (7) indicates that resistive measurements can be derived from the difference of amplitudes, $I(\omega_r) - I(\omega^*)$. Once amplitude reduction variation resistance, Equation (7), has been characterized, this method requires only two amplitude measurements to determine resistance, as compared with the multiple measurements required to determine 3 dB reduction.

Figure 6:
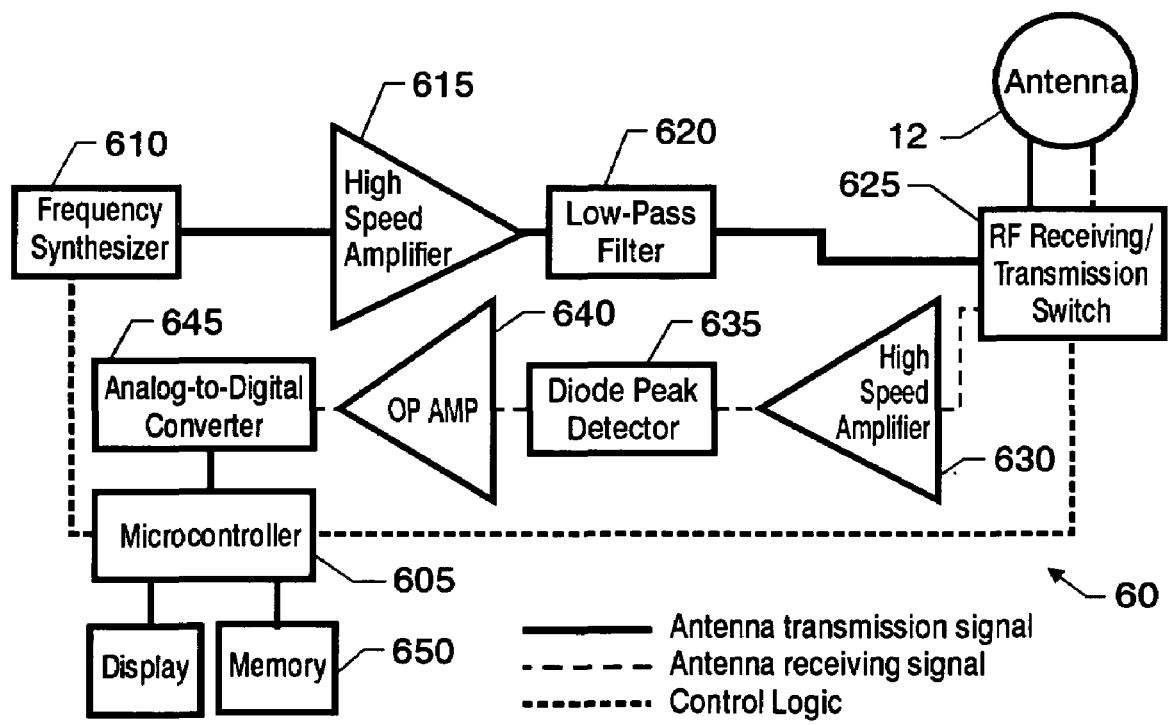
FIG. 6 is a schematic of the interrogation system.

The interrogation means comprises hardware for producing a varying magnetic field at a prescribed frequency and algorithms for controlling the magnetic field produced and for analyzing sensor 16 responses. A schematic of the interrogation system is shown in FIG. 6 and referenced generally by the numeral 60. The schematic illustrates the control logic and antenna 12 signals during transmission and reception. During transmission, the microcontroller 605 places antenna 12 into transmission mode and submits a binary code to frequency synthesizer 610. The frequency corresponding to this code is stored in memory 650. The frequency synthesizer 610 converts the code into a square wave, with the frequency of the wave being dependent on the code. An example of a suitable frequency synthesizer 610 is a DS1085L, made by Dallas Semiconductor, which interfaces easily to microcontroller 605 for in-situ programmable frequencies from 4 KHz to 66 Mhz with a controlled resolution of 5 KHz. A high-speed amplifier 615 then amplifies the square wave. All frequencies that are higher than the prescribed frequency are then attenuated using a low pass filter 620. The signal is then applied to the antenna 12 for a prescribed number of cycles of the wave. The minimum number of cycles should be that required to have the sensor 16 reach its steady-state response amplitude while excited by the antenna 12. The excited steady-state response is dependent upon the antenna 12 frequency, antenna 12 output, sensor 16 resonant frequency and damping in the sensor 16 due to inherent resistance. There is no maximum number of cycles. The antenna 12 should remain in the transmission long enough to have the sensor 16 reach its steady state response. The signal to the antenna 12 results in a time varying magnetic field. When the cycles are completed or after a set time duration is completed, the microcontroller 605 switches the antenna 12 to receiving mode via an RF receiving/transmission switch 625. During the transmission, the sensor 16 has current produced in it via Faraday induction. The sensor's 16 magnetic field decays when the antenna 12 is placed in the receiving mode. The minimum time duration that the antenna 12 should stay in the receiving mode is long enough for the sensor 16 to complete at least two cycles of free-decay. The response from the sensor 16 is amplified 630 after being received from the antenna 12. A diode peak detector 635 rectifies the signal (i.e., only the positive value of the signal is allowed to pass) and creates a DC value proportional to signal amplitude (i.e., a capacitor charge is proportional to signal amplitude). An op amp 640 amplifies the DC voltage from the peak detector 635. The signal from the op amp 640 is then converted into a digital signal, by an A/D converter such as a National Semiconductor ADC08831 A/D converter, an eight bit serial analog to digital converter which can interface to the microcontroller 605. The microcontroller 605 stores the amplitude (digital signal from op amp 640) and the transmission frequency.

The process described above is iterative for all discrete frequencies beginning with the frequency corresponding to the lower bound of the frequency partition for the sensor 16 with the lowest frequency range and continues to the upper bound of the sensor 16 with the highest frequency range. During the first two iterations of frequency for each partition, the amplitudes and frequencies are stored for each sensor 16.

During subsequent iterations, the current amplitude is compared to the previous two amplitudes to determine if the prior amplitude is an inflection point. Once an inflection amplitude has been detected, the inflection amplitude and frequency are stored, and then the next partition is examined. After the last partition is examined, a new sweep is started. Alternatively, during subsequent iterations, the current amplitude is compared to the stored amplitude. This requires only two storage locations, frequency and amplitude. If the current amplitude is greater than the stored amplitude, the current amplitude and frequency are stored and the previously stored amplitude and frequency are discarded. No response inflection has been identified and there is a shift to the next transmission frequency in the partition. If the current amplitude is less than the stored amplitude, then the stored amplitude is the response peak amplitude. The transmission frequency is then shifted to the lower bound frequency of the next partition. If it is the final partition, the transmission frequency is shifted to the first partition.

The objective of the aforementioned iterations is to identify the inflection point of each sensor's 16 magnetic field response. Once an inflection amplitude has been detected, the inflection amplitude and frequency are stored and then the next partition is examined. After the last partition is examined, a new sweep is started.

A third alternative is to sweep and store all data for the entire range if the microcontroller 605 has sufficient memory. Afterwards, peak amplitudes can be ascertained for each sensor 16 partition. The peak amplitudes and their respective frequencies are stored for comparisons to subsequent sweeps.

The sweep duration must be less than half the Nyquist period of the measured physical state with the highest frequency. For example, if one sensor is measuring vibrations of less than 30 Hz and other measured states have rates of change less than 30 Hz, then the sweeps must be done at a rate of 60 Hz or greater. All partitions should be examined during the first sweep. Subsequent sweeps allow for measurement of time varying properties. However, subsequent sweeps do not require that all partitions be examined. The frequency of inclusion of partitions in subsequent sweeps depends upon the desired sampling rate for a given measurement. After the initial sweep, the range of frequencies examined within a given partition can be narrowed to a band of a select number of frequencies on either side of the one identified during the sweep. Narrowing subsequent sweep bands can be used as a means of increasing the sweep rate. Discrete frequencies need not be evenly spaced throughout the frequency range (the range includes all sensor 16 partitions). However, they should be evenly spaced for each partition. The higher the number of discrete frequencies within a partition, the higher the sensor 16 resolution.

Each sensor 16 requires a data file that has sensor 16 type, response variation, frequency partition and measurement band for each partition sweep after the resonant is identified on the initial sweep. A table that correlates response variation to a physical state value is part of the data file. Examples of data files for fluid-level, proximity, and rotation sensing are provided below in Tables I, II and III, respectively.

All files are concatenated to form an aggregate file (i.e., interrogation file=file1, file2 , . . . , file 3). Using the examples given above, the aggregate file would be a concatenation of the proximity, and fluid, rotation sensor files in the respective order of increasing frequency range. The aggregate file is used for regulating antenna 12 scanning and for converting information acquired during scan to value of physical state.

Additional sensors 16 are added to the system by appending their data file to the existing aggregate file. Afterwards, a sorting algorithm, such as any of those very well known in the art, is used to sequence the files in ascending partition frequency rate. The addition of new sensors 16 only requires appending the new sensor's 16 data file to the aggregate data file. No wiring of the sensor 16 to the interrogation system is needed nor is there a data acquisition channel dedicated to the sensor 16. This allows simple implementation of a sensor 16 during any phase of a system's life or use (e.g., during manufacturing, at time of part replacement, or during vehicle overhaul). Also important is that measurements of two unrelated physical properties can be derived from the same sensor 16 by independently analyzing response amplitude, response frequency or response bandwidth. An example would be strain as one measurement and distance away from a position (e.g., antenna location) as a second measurement.

TABLE I

Fluid-level data file

| Level | Frequency |
|---|---|
| 0 | 6.837 |
| 0.5 | 6.7915 |
| 1 | 6.7265 |
| 1.5 | 6.6735 |
| 2 | 6.629 |
| 2.5 | 6.5755 |
| 3 | 6.5155 |
| 3.5 | 6.4605 |
| 4 | 6.414 |
| 4.5 | 6.367 |
| 5 | 6.336 |
| 5.5 | 6.289 |
| 6 | 6.2455 |
| 6.5 | 6.202 |
| 7 | 6.1625 |
| 7.5 | 6.1155 |
| 8 | 6.0805 |
| 8.5 | 6.0395 |
| 9 | 5.989 |

Sensor type: fluid
Response variation: Frequency
Start frequency: 7.5 MHz
End frequency: 5.5 MHz
Band: 3

TABLE II

Proximity data file

| Translation | Frequency |
|---|---|
| 0.05 | 4.00E+06 |
| 0.075 | 3.63E+06 |
| 0.1 | 3.35E+06 |
| 0.125 | 3.10E+06 |
| 0.15 | 2.89E+06 |
| 0.175 | 2.68E+06 |
| 0.2 | 2.51E+06 |
| 0.225 | 2.38E+06 |
| 0.25 | 2.27E+06 |
| 0.275 | 2.17E+06 |
| 0.3 | 2.07E+06 |
| 0.325 | 1.99E+06 |
| 0.35 | 1.90E+06 |
| 0.375 | 1.83E+06 |
| 0.4 | 1.75E+06 |

Sensor type: Proximity
Response variation: Frequency
Start frequency: 4.5 MHz
End frequency: 1.5 MHz
Band: 3

TABLE III

Rotation data file

| Position | Amplitude (Counts) |
|---|---|
| 0 | 100 |
| 90 | 60 |
| 180 | 20 |
| 270 | 60 |

Sensor type: Rotation
Response variation: Amplitude
Start frequency: 8.50 MHz
End frequency: 8.50 MHz Parameter Influence The basic physics of the measurement system will be discussed to highlight how key parameters influence the magnetic field response of the sensor 16 and measurement acquisition. Two simple circuits will be used to aid in the discussion. The first circuit is that of an interrogating antenna 12 loop of radius a at a distance, r, from the sensor. A harmonic voltage is applied to the loop. The circuit is designed to switch from a transmitting antenna to a receiving antenna. During transmission, a harmonic voltage, V, of frequency, $\omega$, is applied. The voltage is $$V = V_0 \cos \omega t. \tag{8}$$

The loop has inherent resistance, $R_a$, resulting in the loop current, $I_a$, being $$I_a = \frac{V_0}{R_a} \cos \omega t. \tag{9}$$

The current produces a time-varying magnetic field in the circuit. In this discussion, the sensor 16 is positioned at a distance r from the antenna 12 plane along the antenna 12 axis. The magnetic field, B, at the sensor 16 is $$B = \frac{I_a \mu a^2}{2(a^2 + r^2)^{3/2}} \qquad (10)$$

$$= \frac{V_0}{R_a} \frac{\mu a^2 \cos\omega t}{2(a^2 + r^2)^{3/2}}$$

When $r^2 \gg a^2$, the magnetic field is approximately $$= \frac{V_0}{R_a} \frac{\mu a^2 \cos\omega t}{2r^3} \qquad (11)$$

The permeability, $\mu$, is dependent upon the material that is placed upon the antenna 12. If nothing is in proximity to the antenna 12 loop, then the permeability of free space, $\mu^0 = 4\pi \times 10^{-7}$ N/ampere$^2$ can be used. The field is dependent upon the applied voltage, permeability of material in contact with antenna 12, amount of parasitic resistance, antenna 12 radius and the distance separating the sensor 16 from the antenna 12. The field strength decays cubically with separation distance.

Figure 7:
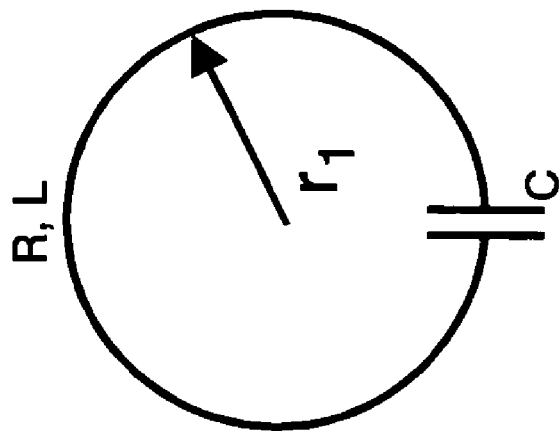
FIG. 7 illustrates a sensor circuit.

The second circuit, shown in FIG. 7, is that of the passive sensor 16. To simplify discussion, the sensor 16 is a capacitor c in a series circuit. Inductance L and resistance R are inherent to the circuit. The second circuit has a radius $r_1$. The magnetic flux, $\Phi_B$, acting upon the sensor 16 is $$\Phi_B = \int B \cdot ds. \qquad (12)$$

Note that B (flux strength and direction) and S (sensor 16 surface area and normal) are both vector quantities. Maximum flux occurs when the flux and the sensor 16 normal are parallel. Measurements can be acquired as long as these vectors are not perpendicular. When sensor 16 normal and flux are parallel, the flux is $$\Phi_B = \frac{V_0}{R_a} \pi r_1^2 \frac{\mu a^2 \cos\omega t}{2r^3}. \qquad (13)$$

In accordance with Faraday's law of induction, the induced electromotive force, $\epsilon$, produced in the sensor 16 is equal in magnitude to the rate that the flux is changing, $$\varepsilon = -\frac{d\Phi_B}{dt}. \qquad (14)$$

At the sensor 16, this quantity would be $$\varepsilon = \frac{V_0}{R_a} \pi r_1^2 \omega \frac{\mu a^2 \sin\omega t}{2r^3}. \qquad (15)$$

When the antenna's 12 magnetic field is harmonic, the resulting electromotive force produced in the sensor 16 is dependent upon flux, the area of the sensor's 16 inductor and is proportional to the frequency of the flux. The constituent components of the sensor 16 are in series. The dynamics of current in the sensor 16 is $$LI' + RI + \frac{1}{C} \int I \, dt = \varepsilon_0 \sin\omega t \qquad (16)$$

with $$\varepsilon_0 = \frac{V_0}{R_a} \pi r_1^2 \omega \frac{\mu a^2}{2r^3} \qquad (17)$$

and L, R, C and I, are the sensor's 16 inherent inductance, inherent resistance, capacitance and current. Equation (16) is differentiated to eliminate the integral, resulting in $$LI'' + RI' + \frac{1}{C}I = \omega \varepsilon_0 \cos\omega t. \qquad (18)$$

The solution of Equation (18) is $$I_{TX}(t) = \qquad (19)$$

$$\frac{\varepsilon_0}{(S^2 + R^2)} \left[ \frac{(\lambda_2 S - R\omega)e^{\lambda_1 t} + (R\omega - \lambda_1 S)e^{\lambda_2 t}}{(\lambda_1 - \lambda_2)} + S\cos\omega t - R\sin\omega t \right]$$

with $$S = \left(\omega L - \frac{1}{\omega C}\right) \qquad (20)$$

$$\lambda_1 = -\frac{R}{2L} + \frac{1}{2L}\sqrt{R^2 - \frac{4L}{C}} \qquad (21)$$

$$\lambda_2 = -\frac{R}{2L} - \frac{1}{2L}\sqrt{R^2 - \frac{4L}{C}}. \qquad (22)$$

The subscript, $_{TX}$, denotes that the antenna 12 is transmitting. The term, S, is reactance.

The sensor 16 current when the antenna 12 is transmitting is given by Equation (19). The steady state response of the sensor's 16 current while the antenna 12 is transmitting is $$I_p(t) = I_0 \sin(\omega t \pm \theta) \qquad (23)$$

where $$I_0 = \frac{\varepsilon_0}{\sqrt{S^2 + R^2}} \qquad (24)$$

and $$\tan\theta = \pm\frac{S}{R}. \quad (25)$$

The term $\sqrt{S^2+R^2}$ is impedance.

Equation (24) has the influence of sensor's 16 resistance, reactance and electromotive force level on the steady current amplitude, $I_0$, when the antenna 12 is transmitting. It can be concluded by examination of Equation (24), that the amplitude is maximized by minimizing resistance and reactance. Resistance is minimized by increasing electrical efficiency of constituent components. Reactance is zero when the antenna 12 broadcast frequency is that of the undamped resonance of the inductive-capacitive circuit, which is $$\omega = \frac{1}{\sqrt{LC}}. \quad (26)$$

The time to reach steady state is dominated by the larger of the two roots, $\lambda_1$. As can be seen from the root, the decay rate is proportional to resistance and inversely proportional to inductance. After a finite amount of time, $\Delta t$, the interrogation antenna 12 is switched to the receiving mode, thus removing the electromotive force from the sensor 16. The sensor 16 current response is now $$LI'' + RI' + \frac{1}{C}I = 0. \quad (27)$$

The response is overdamped if $$R^2 > \frac{4L}{C},$$

critically damped if $$R^2 = \frac{4L}{C},$$

or underdamped if $$R^2 < \frac{4L}{C}.$$

The overdamped response could occur if a resistive type measurement is added to the circuit and inductance and capacitance are kept constant. If an operational objective is to have considerable separation distance between the sensor 16 and the antenna 12, then the sensor 16 should only be composed of capacitive and inductive elements. If possible, the sensor 16 should be designed to reduce inherent resistance. The solution for the underdamped case is $$I_{RX}(t) = e^{\frac{-R}{2L}(t-\Delta t)} \quad (28)$$
$$\left[A\cos\left(\sqrt{\frac{1}{LC} - \frac{R^2}{4L^2}}\,(t-\Delta t)\right) + B\sin\left(\sqrt{\frac{1}{LC} - \frac{R^2}{4L^2}}\,(t-\Delta t)\right)\right]$$

$$I_{Rx}(\Delta t) = I_{TX}(\Delta t) = A. \quad (29)$$

The subscript, $_{RX}$, denotes that the antenna 12 is receiving.

The decay envelop depends on $$\frac{-R}{2L}.$$

The current value in the sensor 16, $I_{TX}(\Delta t)$, when the antenna 12 is switched to receiving mode, and current derivative value, $I'_{TX}(\Delta t)$, are the initial conditions used to determine coefficients A and B. In a manner similar to the antenna 12, the magnetic field produced by the sensor 16 is now $$B_{RX} = \frac{I_{RX}(t)\mu r_1^2}{2r^3} \text{ for } r^2 >> r_1^2. \quad (30)$$

As can be seen by Equation (30), the magnetic field is dependent upon the sensor's 16 current, which is dependent upon the electromotive force, reactance and resistance.

During subsequent transmission intervals, the final conditions from the prior mode (e.g., transmission or reception) are the initial conditions for the current mode. Hence, each transmission and reception interval has a closed form solution for current response. Table IV summarizes the influences of various parameters on the sensor's 16 magnetic field response.

TABLE IV

Influence of parameters on sensor response

| Parameter | Effect on Sensor's Magnetic Field Response when Parameter is Increased |
|---|---|
| Antenna voltage | Amplitude increases |
| Antenna inherent resistance | Amplitude decreases; increasing width of antenna trace reduces resistance |
| Permeability of material in contact to antenna | Amplitude increases |
| Antenna diameter | Amplitude increases |
| Antenna-sensor separation | Amplitude decreases cubically |
| Sensor orientation with respect to magnetic flux from antenna | Amplitude maximized when sensor normal and flux are parallel and zero degrees with perpendicular |
| Sensor inductance area | Amplitude increases |
| Frequency of antenna magnetic field | Amplitude increases |
| Reactance | Amplitude decreases; amplitude maximized when antenna frequency tuned to sensor circuit frequency |
| Sensor inherent resistance or applied resistance | Amplitude decreases, bandwidth increases; increasing width of inductor trace reduces resistance |

TABLE IV-continued

Influence of parameters on sensor response

| Parameter | Effect on Sensor's Magnetic Field Response when Parameter is Increased |
|---|---|
| Ratio of sensor resistance to sensor inductance | Sensor response decay rate increases as ratio is decreased. |

The distance at which the magnetic inductor response can be received is proportional to the strength of the magnetic field created in the inductor. The magnetic field strength is dependent upon the current in the sensor 16. Therefore, interrogation distance is also dependent upon the energy efficiency of the sensor 16. The higher the energy efficiency, the more current is created for the same level of power used by the interrogating antenna 12. The quality factor, Q, is representative of this efficiency. Q is the ratio of reactance to DC resistance. A stronger magnetic field is created with higher Q.

A magnetic field response sensor 16 is metamorphic if a physical property for which it measures, or if its environment, results in a permanent non-reversible change in one or more of its constituent components. The change results in a new reference (i.e., baseline) magnetic field response, thus giving it the ability to make other measurements. Examples of metamorphic changes include chemical reaction or phase transition and strain experienced during yield or cracking. Dielectric or permeability changes resulting from a phase transition, such as resin curing or chemical reactions, produce irreversible changes to a sensor 16. If interdigital electrodes are used for capacitance, the sensor is capable of measuring strain, displacement, or another physical property after the dielectric changes. During the dielectric change, a sensor 16 can be used to track the change (e.g., rate of curing or amount of chemical reaction). A new response baseline results from the completed dielectric change. A sensor 16 (e.g., a spiral inductor and interdigital capacitor) for measuring strain can be affixed to a surface via a direct metal deposition method. Direct deposition of a metallic thin film does not add any increased structural integrity to the surface. If a crack forms on the surface along the capacitor, causing some but not all of the capacitors to be severed, the sensor is still capable of determining other measurements (e.g., displacement). After a crack, strain can still be discerned, but referenced to a different baseline frequency. Other examples include a permanent structural yield to one of the components as a result of excessive strain. Sensor metamorphosis allows measurement of a physical property that undergoes an irreversible change to transform the sensor 16 into a means of measuring other physical states.

The acquisition system, the sensor 16 and the immediate environment of the sensor 16 form a triad. Unlike traditional sensors, a unique feature of magnetic field response sensors is that, when used with the interrogation system described herein, they can easily be transformed from the means of measuring one physical state to measuring that of another physical state. The magnetic field response of the sensor 16 is the means of acquiring the measurement from the sensor 16. The field can be varied by changes to multiple physical states influencing the sensor. Each constituent of the sensor 16 can be used for measurement. Capacitive variations result in sensor 16 response frequency variations. Inductive variations can result from position variations to conductive surfaces. The position variations change both frequency and amplitude of the sensor 16 response. When a sensor's 16 constituent values remain fixed, changes to the antenna/sensor separation produce an inverse variation of response amplitude. The aforementioned variations result in changes to response frequency, amplitude or both. Because they are independent, a single sensing element can be used to measure more that one independent physical property. A valid measurement is achieved by fixing all but one physical state. The variable state is the measured state. Table V summarizes changes to a sensor's physical or environmental attributes and the subsequent response change. Metaphoric sensors are also multi-functional, except that the irreversible property that they measure can only be measured once.

TABLE V

Changes to sensor magnetic field response due to parameter variation

| Sensor Variation | Attribute(s) of Magnetic Field Response |
|---|---|
| Inductor position relative to conductive surface decreasing | Amplitude decreases (dA), frequency increases (dω) |
| Inductor surface area overlap of conductive surface increasing | Amplitude decreases (dA), frequency increases (dω) |
| Capacitor plates or electrodes separation decreasing | Frequency decreases (dω) |
| Capacitor plates area overlap increasing | Frequency decreases (dω) |
| Dielectric immersion of electrodes or electroplates increases | Frequency decreases (dω) |
| Increased electrodes (e.g., electrical contact of two interdigital capacitors) | Frequency decreased (dω) |
| Increased inductance (e.g., electrical contact of two inductors) | Frequency increased (dω) |
| Dielectric phase transitions | Frequency change (increase or decrease depends upon electrical properties of each phase) |
| Dielectric change due to chemical reaction | Frequency change (increase or decrease depends upon electrical properties of each phase) |
| Dielectric change due to environmental exposure | Frequency increased (dω) |
| Inductor distance from antenna increases | Response amplitude decreases (dA) |
| Resistance in circuit increases | Amplitude decreases (dA) and bandwidth increases (df) |

The states need not have any relation to each other. An example of multi-functional sensing would be a sensor that uses interdigital electrodes for a capacitor embedded in a tire prior to curing rubber. The sensor has an initial response baseline. During curing, the frequency changes due to the material phase transition. Once cured, a new response baseline is established. Deformations or pressure variations to the tire change the spacing between electrodes and thus result in perturbations to the baseline frequency. This measurement is taken prior to motion of the vehicle, thus updating the response baseline for rotation measurements. If the antenna used to interrogate the sensor maintains a constant position and orientation, the rotation of the tire results in the amplitude of the response varying between two levels. The rate that the amplitude varies is the rate that the tire rotates. This example demonstrates that a single sensor can be used for measuring three independent properties: 1) tire curing, 2) tire pressure/deformation, and 3) tire rotation. If the tires are steel belted and the sensor is placed on the inside wall of the tire at a fixed separation from the steel belts, any change in inductor position relative to the steel belts could be indicative of tire ply separation. Under these conditions, a fourth measurement, bond separation, is achieved.

The manner in which a sensor 16 is interrogated and the response baselines updated allows for metamorphic and/or multi-functional use of magnetic field response sensors 16. Another example of multiple measurements being derived from a single sensor 16 is that of a moving linkage or door. Consider a lamina-type sensor 16 that is attached to a door for which knowledge of contact to another surface and its motion is required. The knowledge of contact is achieved by electrically shorting the sensor 16 with the contact surface. Knowledge of motion is achieved by examining the amplitude of the response. Further, the capacitive element could be used to measure other properties, such as strain or moisture.

Metamorphic sensors are interrogated in the same manner described earlier. When the permanent change of the sensor 16 is complete, a data file for measurements of the transformed sensor need to be concatenated to the aggregate file used for regulating the sensor 16.

Measurements from multi-functional sensors can be analyzed in two manners. In one embodiment, the sensor 16 measures one physical state and then is returned to its baseline frequency to measure the other state. When sensors are returned to their baseline, a separate data file for each type of measurement is required. The frequency partitions for each use will have some degree of overlap. Ideally, the sensor 16 returns to its baseline. If the sensor 16 cannot be returned to its baseline prior to measuring a second state, then a correlation table such as Table VI needs to be developed. The table allows combinations of amplitude and frequency to be correlated to combinations of physical values for State X and State Y. As can be seen from Table VI, if the amplitude and frequency, $A_3$, $\omega_3$, are the sensor baseline, the third column of combinations in Table VI would be the correlation data for State X. Similarly, the third row would be the correlation data for State Y.

TABLE VI

Multi-functional sensor correlation table

| | | Variation of Physical State Y | | | | |
|---|---|---|---|---|---|---|
| | | State $Y_1$ | State $Y_2$ | State $Y_3$ | State $Y_4$ | State $Y_5$ |
| Variation of Physical State X | State $X_1$ | $A_1, \omega_1$ | $A_2, \omega_1$ | $A_3, \omega_1$ | $A_4, \omega_1$ | $A_5, \omega_1$ |
| | State $X_2$ | $A_1, \omega_2$ | $A_2, \omega_2$ | $A_3, \omega_2$ | $A_4, \omega_2$ | $A_5, \omega_2$ |
| | State $X_3$ | $A_1, \omega_3$ | $A_2, \omega_3$ | $A_3, \omega_3$ | $A_4, \omega_3$ | $A_5, \omega_3$ |
| | State $X_4$ | $A_{-1}, \omega_4$ | $A_{-2}, \omega_4$ | $A_3, \omega_4$ | $A_4, \omega_4$ | $A_5, \omega_4$ |
| | State $X_5$ | $A_1, \omega_5$ | $A_2, \omega_5$ | $A_3, \omega_5$ | $A_4, \omega_5$ | $A_5, \omega_5$ |

In cases where rotation rate is one measurement and a threshold amplitude is used for determining rotation (i.e., the numbers of times the threshold is exceeded per minute), only the correlation information from the other measurement is required. If the other physical state's rate of change is far less than the rotation rate, the amplitude threshold could be a certain percent of the physical state's last measured amplitude.

Antenna Design

Figure 8:
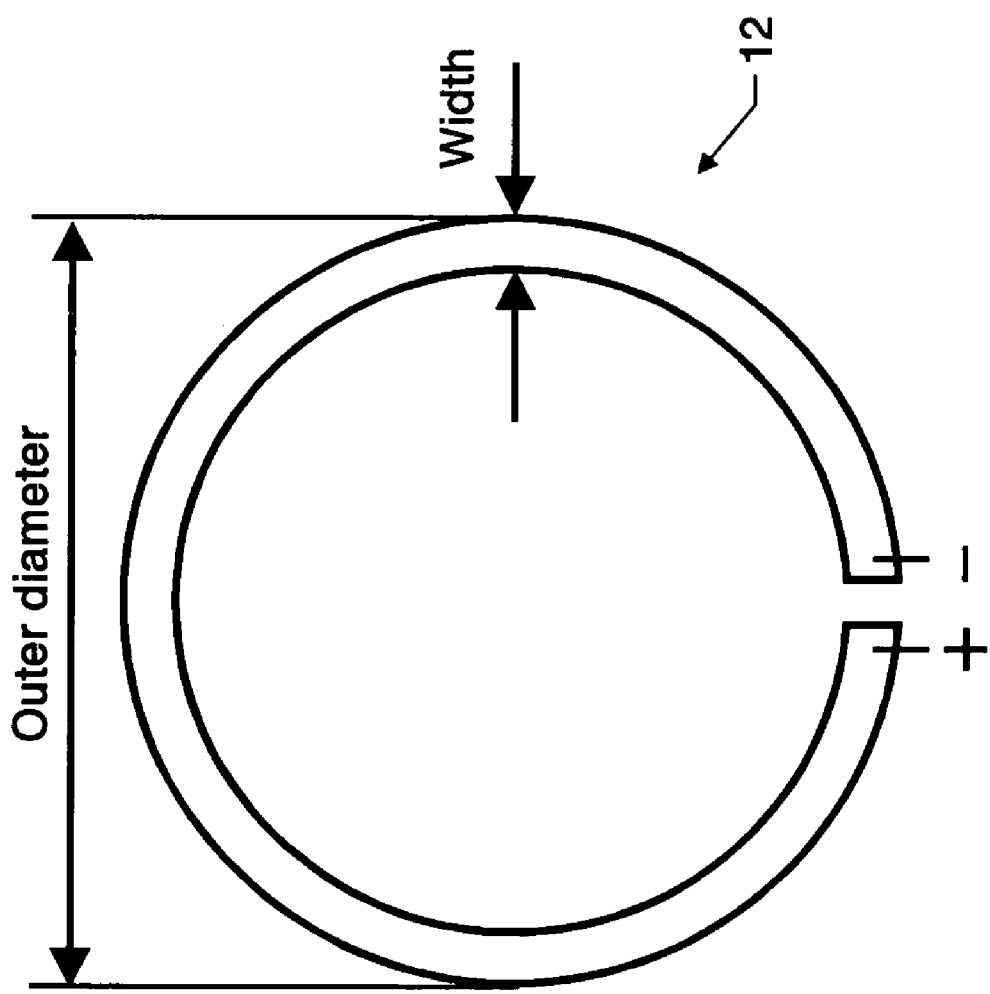
FIG. 8 is a representative antenna.

Parametric measurements were performed to ascertain the influence of geometric properties on interrogation antenna effectiveness, i.e., energy efficiency. To facilitate non-obtrusive use of the measurement system, the antennae were developed as either thin-film deposited on a dielectric membrane or thin foil which can be placed on any existing non-conductive surface. To ascertain the effect that geometry would have on the electrical properties, two features were considered: antenna width and antenna diameter. FIG. 8 is representative of a thin copper foil antenna 12 adhered to a Plexiglas plate. The antenna 12 trace width was initially 2.0 in. In a first study, the antenna's outer diameter remained a constant 18.0 inches. The inner diameter was reduced and measurements were taken when the antenna trace was 2.0, 1.5, 1.0, 0.5, and 0.25 in. The inductance, DC resistance and Q were measured for each width. A current of 1 KHz was used for the inductance measurements and the Q measurements.

Figure 9B:
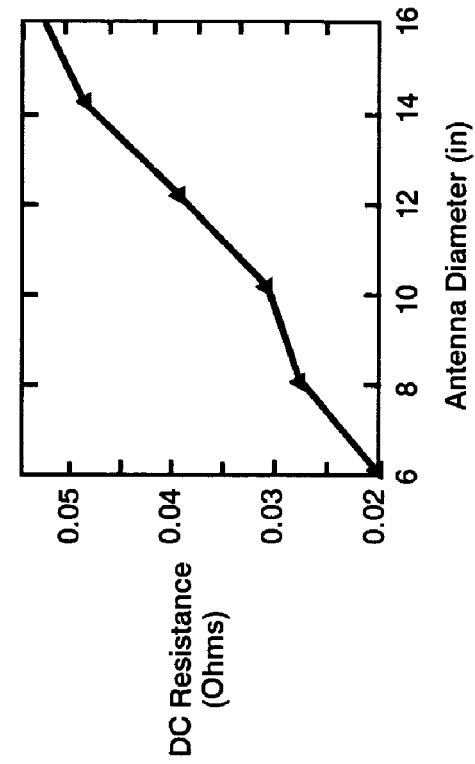
FIGS. 9a and 9b are graphs of resistance measurements.
Figure 9A:
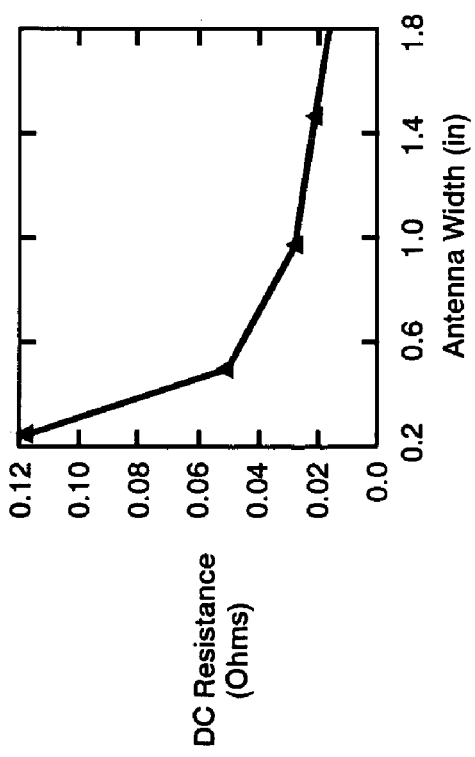

For the second antenna used for the parametric measurements, six 0.5 in traces of copper foil were adhered to a Plexiglas plate. The outer diameters were 6, 8, 10, 12, 14 and 16 inches. Coaxial cable was individually electrically connected to each trace. The inductance, DC resistance and Q were measured for each width. Resistance measurements are shown in FIG. 9 for both parametric changes to antenna width and diameter. As seen in FIG. 9a, DC resistance decreased with increased trace width. Resistance increased significantly as the width was reduced. The resistance changed from 0.052Ω to 0.118Ω as the width was changed from 0.5 in to 0.25 in. The resistances of the wider traces were substantially less. For the traces wider than 1.0 in, the resistance decreased to a lesser extent. As seen in FIG. 9b, the resistance increased approximately linearly with diameter. The measurement results indicate that to develop low resistance antennae, a wide trace would result in less applied power loss due to lower resistance.

Figure 10B:
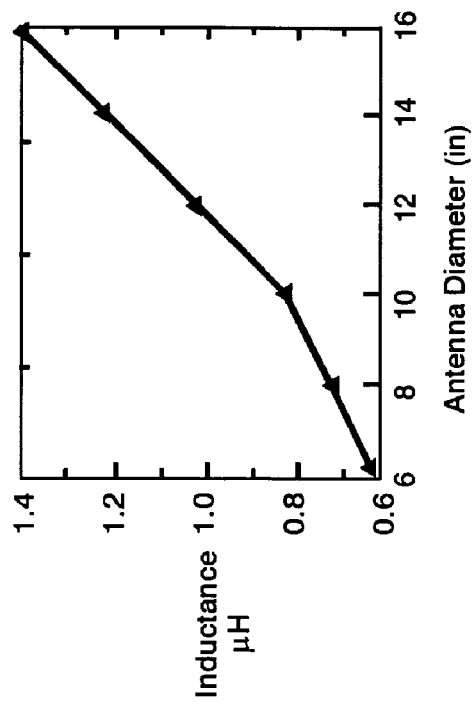
FIGS. 10a and 10b are graphs of inductance measurements.
Figure 10A:
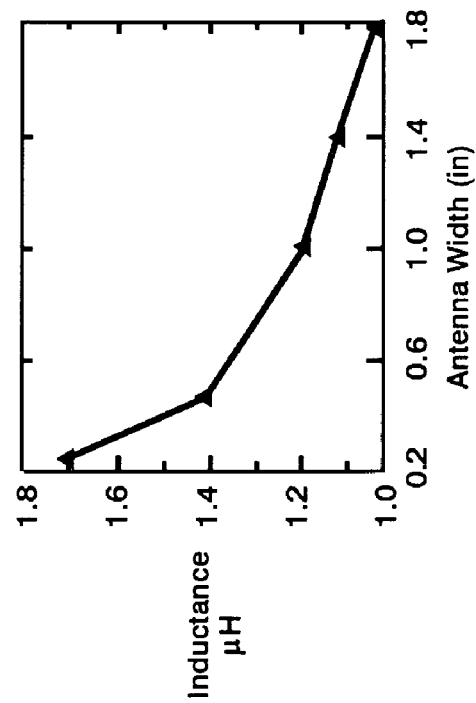
Figure 11A:
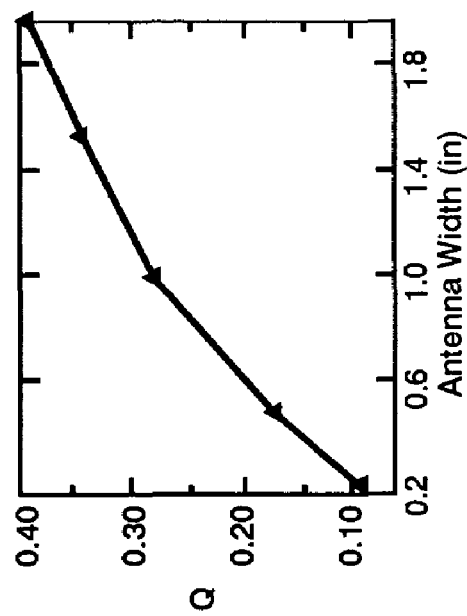
FIGS. 11a and 11b are graphs of quality factor, Q.
Figure 11B:
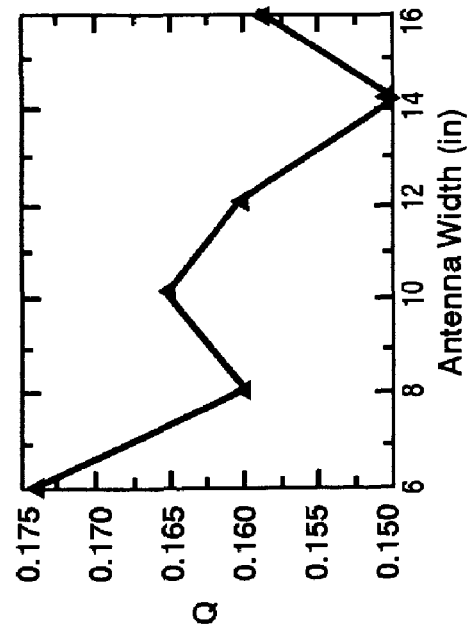

Inductance measurements are presented in FIGS. 10a and 10b. These measurements have similar trends as the resistance measurements. Inductance increases are more pronounced for narrower traces. Inductance also increases approximately linearly with increasing diameter. Values of Q are presented in FIGS. 11a and 11b. An antenna's electrical efficiency is dependent upon its Q (i.e., higher Q results in higher efficiency). The trace width has a significant effect on Q. The increase of Q with increasing trace width is approximately linear. As the width was changed from 0.25 in to 2.0 in, Q changed by greater than a factor of 4, as shown in FIG. 11a. Changing the outer diameter from 6 in to 16 in resulted in Q changing by less than 0.02, as shown in FIG. 11b.

Inductor Design

The effect that design features such as perimeter size and trace width had on inductance, DC resistance and Q was examined. The inductor serves to relay the measurement. The distance at which the magnetic inductor response can be received is proportional to the strength of the magnetic field created in the inductor. The magnetic field strength is dependent upon the current in the sensor 16. For the same applied energy, a lower resistance results in a higher current. Hence, to increase the range of the sensor 16, the sensor elements should have as low of a resistance as possible.

Figure 12:
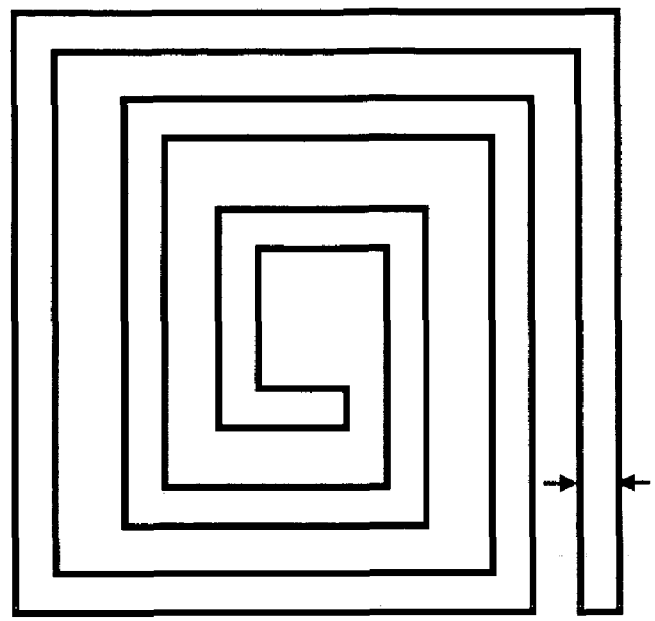
FIG. 12 illustrates a square spiral inductor.
Figures 13, 14:
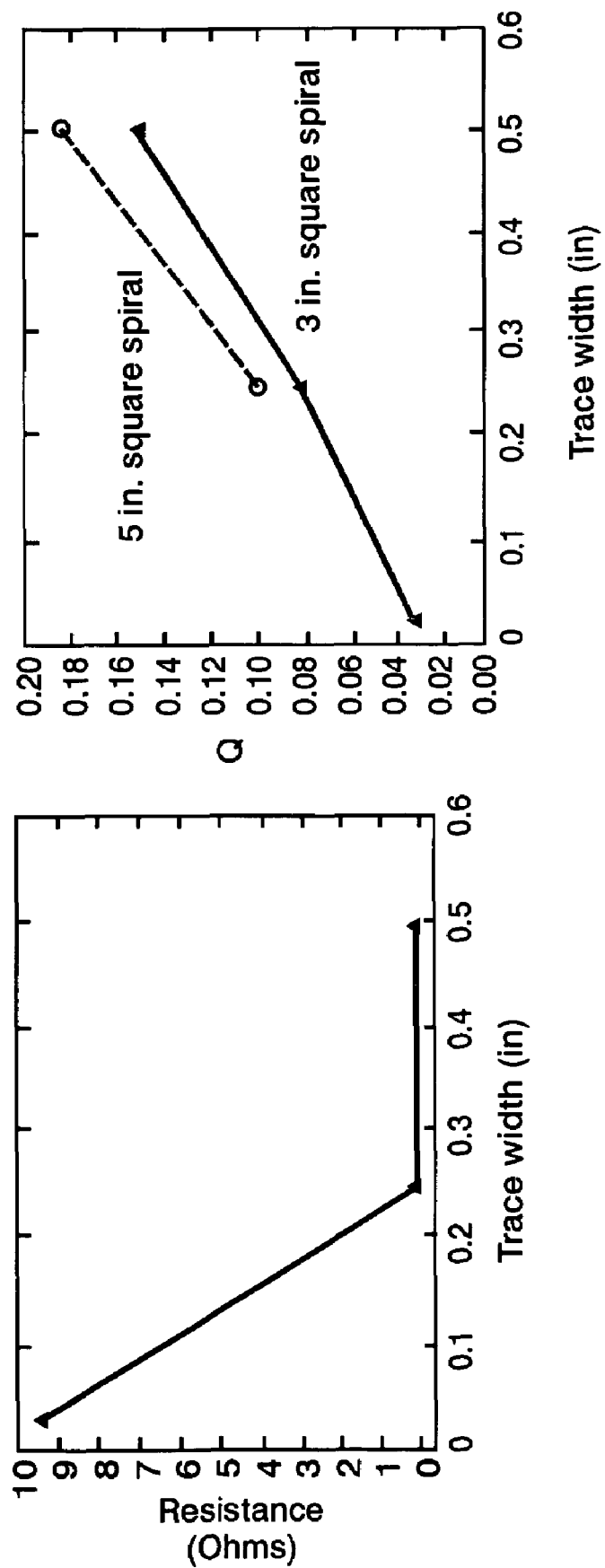
FIG. 13 is a graph of resistance versus inductor trace width.
FIG. 14 is a graph of quality factor, Q, versus inductor trace width.

FIG. 13 illustrates the effect of trace width on DC resistance. Three 3-inch square spiral inductors, as shown in FIG. 12, having widths 120 of 0.02, 0.25 and 0.50 inches were used. The resistance of the 0.02 in trace was 9.4Ω. Resistances for the 0.25 and 0.5 in traces were 0.055Ω and 0.023Ω, respectively. The significantly lower resistance of the wider traces demonstrates that the trace width is an effective design parameter. The effects of trace width and inductor perimeter size on Q are shown in FIG. 14. The values of Q for 3 in (0.02, 0.25, and 0.50 widths) and 5 in square spirals (0.25 in and 0.20 in widths) are shown. The value of Q increases approximately linearly with increasing trace width. The larger size square spiral results in a higher Q for the same trace width. Comparison of the 5 in square having the 0.25 in trace with the 3 in square spiral having the 0.50 inch trace shows that increasing width can be used as a method of producing a higher Q.

To quantify effective range for measurement acquisition, the inductors were coupled to capacitors. Two measurement configurations were investigated. In the first configuration, a switching antenna (12 in outer diameter loop using 12 gauge copper wire) was used with a transmission power level of 0.1 W. An inductor with a 5 in×5 in square spiral with a 0.75 in trace, coupled to a 504-pF capacitor, achieved a −60 dB response at a 25 in distance from the antenna. The inductor with a 3 in×3 in square spiral with a 0.25 in trace, coupled with a 826-pF capacitor, achieved a −60 dB response at a 22 in distance from the antenna. In a second measurement configuration, a transmission antenna (18 in outer diameter and 0.5 in trace) and separate receiving antenna (24 in outer diameter using 12 gauge copper wire) were used. They were positioned 11 ft apart. The antennae were operated such that the receiving antenna was off when the transmission antenna was powered on to excite the sensors 16. The transmission antenna used 1.5 W of power. When the transmission antenna was switched off, the receiving antenna was powered on, allowing it to receive the sensor's 16 response. In this configuration, the sensing elements could be interrogated anywhere in a volume approximated by a cylinder whose longitudinal axis ran between the antennae centers and with a diameter of approximately 4 ft. The length of the cylinder was the separation distance between the antennae. When the antennae were separated by 9 ft, the same sensing elements could be interrogated using 1.0 W of power. Using a single antenna electrically switched from a transmitting to receiving antenna, an interrogation distance of 2 ft was achieved using 0.1 W of power applied to the antenna.

It is necessary in some applications to have the sensor's 16 capacitor affixed to or embedded in a conductive surface. Proximity to conductive surfaces alters the inductance of the sensors. As the sensor gets closer to a conductive surface, the magnetic field energy of the sensor is reduced due to eddy currents being induced in the conductive surface. The inductor cannot be affixed to or embedded in a conductive surface. It is necessary to have a means of fixed separation (at least 0.375 in). The minimum distance for separation is determined by the sensor 16 response. The inductor should be separated from the conductive surface so that the response amplitude exceeds the noise level by a recommended 10 dB. FIGS. 15-16 illustrate embodiments for maintaining constant inductance levels. In FIG. 15, a nonconductive dielectric spacer 152 is used to maintain a fixed separation between inductor 155 and conductive surface 151. Nonconductive film 153 and capacitor 154 are also illustrated. Although the inductance is less than what it would be if it were not in proximity to conductive surface 151, the inductance is fixed. As long as the inductance is fixed, all variations of the magnetic field response are due to capacitance changes. FIG. 16 illustrates a sensor in which the inductor 155 is positioned at a fixed angle away from the conductive surface 151. A lightweight stiffener 156 is used to maintain the angle.

Numerous variations of inductor mounting can be utilized, such as housing that provide separation from the conductive surface as well as protection from impact damage. Systems that have limited space but undergo deployment can have inductors that deploy during deployment of the system and maintain fixed position after deployment is complete, including both rotational and telescopic deployable inductors. If capacitance is maintained fixed in value, changes in inductance resulting from variation of the separation between inductor and conductive surface can be used to measure proximity to that surface. This variation depends on the surface skin depth.

Table VII illustrates various ways in which variations to the capacitor's geometric properties can be used for sensing. Plate separation, plate apparent overlap and the orientation of the plates relative to each other can be extended to provide a variety of measurements predicated upon the plates' relative change in orientation or position with respect to each other. When interdigital electrodes are used as the capacitor of the sensor, spacing between the electrodes can be used for sensing. Table VIII illustrates the measurement applications resulting from capacitance variation. Table IX illustrates the measurement applications resulting from dielectric variation. Table X illustrates various ways in which the variations in either the sensor's inductance or variation in the sensor field response amplitude can be used for measurements.

Piezoelectric material can be used for the sensor's capacitive component. Piezoelectric materials (e.g., piezo-ceramics such as lead zirconate-titanate (PZT), or piezo-polymers such as polyvinylidene fluoride (PVDF)) have electrical properties similar to capacitors. These materials develop electric polarization when force is applied along certain directions. The magnitude of polarization is proportional to the force (within certain limits). The capacitance varies as the polarization varies, which suffices for measuring resulting strain from material deformation. Deformation can be due to either mechanical or thermal loading (pyroelectric effect). These materials can be used in lieu of capacitors for strain and temperature measurements.

The L-C circuit can be directly deposited onto a surface as a thin film using photo-lithography. In one embodiment, if the surface is nonconductive, the inductor and interdigital electrodes can be deposited first. A layer of dielectric material such as Silicon Nitride ($Si_3N_4$) with four electrical vias is deposited next. A via is placed at each terminus of the inductor and capacitor. A layer having two electrical conduits (trace of conductive material) is then deposited. The two conduits are positioned such that they complete the inductor-capacitor electrical connection. Silicon Nitride also can be used as thin film coating for environmental protection of sensor. These dielectric layers can be deposited by APCVD (Atmospheric Chemical Vapor

TABLE VII

Measurement applications for capacitor geometric variation

| Capacitive Geometric Variation | Measurement Application |
|---|---|
| Plate separation | Proximity sensing - Each plate can be attached to a separate surface. |
| | Pressure - If plates are elastic, surface deformation due to external pressure alters separation distance between plates. |
| | Strain |
| | If a dielectric of known elastic modulus is affixed to and between the rigid plates (e.g., embedded), compression and tension can be measured. |
| | If each plate is attached separately and perpendicular to a surface of known elastic modulus, surface compression and tension can be measured. |

TABLE VII-continued

Measurement applications for capacitor geometric variation

| Capacitive Geometric Variation | Measurement Application |
|---|---|
| Apparent area (i.e., plate overlap) | Position displacement when no dielectric is used and one plate is free to move relative to other plate; all plate motion must be parallel.<br>Shear force<br>When an elastic dielectric of known shear modulus is affixed to and between both plates (e.g., embedded), shear force is inversely proportional to plate overlap as plates translate with respect to each other. As the overlapped area of the plates change, the electric field changes. The electric field exists only within the area for which the plates overlap. All plate motion must be parallel.<br>If each plate is attached separately and parallel to two surfaces, any shear force between surfaces is inversely proportional to surface overlap.<br>Torsion - Can also be measured in a somewhat similar manner as shear. In torsion measurements, one plate is rotated about its normal relative to other plate. |
| Relative plate orientation | Angular orientation - Orientation of one plate relative to the other. Only applicable for a single axis of rotation. |

TABLE VIII

Measurement applications resulting from capacitive variation

| Capacitive Variation | Measurement Application |
|---|---|
| Separation between neighboring electrodes | Strain - In plane strain changes the distance between neighboring electrodes resulting in a change to the electric field and thus a capacitance change.<br>Pressure (Vacuum) sensor - Interdigital electrodes are deposited on an elastic dielectric membrane. The membrane is secured to a frame. The frame serves to separate the inductor from the conductive surface and serves as a portion of the cavity that maintains the pressure (vacuum). The other surfaces forming the cavity to which the pressure is maintained are the conductive surface and the membrane. When the sensor is exposed to pressure (vacuum) the membrane will deform toward (away) from the conductive surface thus changing the capacitance. |
| Number of electrodes | Numeric encoding - The relative number of interdigital electrodes can be used for numeric coding. The use of interdigital electrodes allows flexibility in selecting base (e.g., binary, octal, decimal, hexa-decimal, etc) for numeric coding. For example (using base 10), a single number can be developed as a single inductor in parallel with ten electrode pairs. This circuit is the equivalent of a single digit. When more than one digit is needed, similar circuits can be used but different inductance levels are used to distinguish the digits. Ten electrode pairs give the circuitry the ability to be resolved as a base 10 numeral. All capacitors have the same capacitance. A numeral is determined by the number of active electrode pairs (i.e., in the non-opened portion of the circuit). The number that the circuit represents is the number of active electrode pairs subtracted from ten. Different inductance values are used when other digits are needed. |

TABLE IX

Measurement applications resulting from dielectric variation

| Dielectric Variation | Measurement Application |
|---|---|
| Dielectric immersion | Dielectric level (e.g., fluid level or solid particle level). The sensor resonant changes inversely to dielectric immersion. When interdigital electrodes are used, resonant changes discretely with immersion. |
| Dielectric phase changes | Material phase transition (e.g., solid to liquid) |
| Reversible environmental exposure | Moisture, chemical exposure resulting in nonstoichemtric changes to dielectric |
| Stoichemetric (chemical) changes to dielectrics | Examples are hydrogen exposed to a palladium dielectric (a means of developing an hydrogen detector) or a silicon dielectric exposed to oxygen (a means of developing an oxygen detector). Each example alters the dielectric properties. |

Deposition)/or LPCVD (Low Pressure Chemical Vapor Deposition)/or PECVD (Plasma Enhanced Chemical Vapor Deposition)/Sputtering/Sol-Gel/Electron beam lithography/Thermal evaporation/or Microwave methods. Characteristics of silicon nitride can be varied by different gas doping such as leaking small quantity of oxygen during deposition, or by implanting nitrogen ions in already deposited silicon nitride. With varying doping level and species, refractive index and other characteristics of thin film can be varied, hence usage for different applications. After deposition of silicon nitride film, these films can be thermally rapid annealed. Furthermore, the capacitor can be directly deposited upon conductive directly after a dielectrical material has been deposited upon the surface. The inductor must be spaced or position such that its inductance reminds constant.

TABLE X

Measurement applications resulting from inductive variation

| Inductive Variation | Measurement Application |
|---|---|
| Inductor proximity to conductive surface | Inductance changes as distance to a conductive surface varies due to eddy currents being produced in the conductive surface. As an inductor is moved closer to surface, amplitude decreases and frequency increases. Applications are:<br>Proximity measurement - inductance changes as inductor gets closer to a conductive surface.<br>Wear measurement - Inductor is placed on the upper surface of a material whose thickness is lessened with the wear and the lower surface is in contact with a conductive material. As material wears, inductance decreases due to increased proximity to conductive material.<br>Bond separation - Placement of a conductive surface on one side of a surface bond and a lamina-type L-C element on the other side of a bond such that the conductive surface and the L-C element are in proximity to each other. If the bond is broken, the |

TABLE X-continued

Measurement applications resulting from inductive variation

| Inductive Variation | Measurement Application |
| --- | --- |
| | inductance will change. An example would be that for steel-belted tires. If an L-C element is placed on the inside wall of the tire, any separation of the steel belts from the rubber would result in an inductance change.<br>Pressure (Vacuum) sensor - Spiral inductor is deposited on an elastic dielectric membrane. The membrane is secured to a frame. The frame serves to separate the inductor from the conductive surface and serves as a portion of the cavity that maintains the pressure (vacuum). The other surfaces forming the cavity to which the pressure is maintained are the conductive surface and the membrane. When the sensor is exposed to pressure (vacuum) the membrane will deform toward (away) from the conductive surface thus changing the inductance.<br>Load sensing - If a material of known elastic modulus if affixed to the conducting surface and the inductor surface, axial compression or tension can be measured.<br>Identifying conductive materials - Skin depths for seawater and graphite are 200 and 1.59 mm at 1 MHz. Aluminum, chromium, copper, gold and silver have skin depths of 0.085, 0.081, 0.066, 0.075 and 0.064 mm, respectively. The inductance of the sensor is proportional to its induced magnetic field. The field (and inductance) decreases as the inductor distance to the conductive surface decreases. As inductance decreases, the sensor resonant frequency increases. The response amplitude also decreases as the inductor gets closer to the conductive surface due to more energy being lost to the conductive material. The amplitude decay with respect to increased frequency is proportional to skin depths.<br>Therefore, the slope, $\frac{dA}{d\omega}$, can be used as a means of discerning water, graphite and metals from each other. |
| Variation in inductor surface area overlap of conductive material | Inductance changes with proximity to a conductive surface that results in L-C amplitude and frequency variation. When distance separating inductor and conductive surface is fixed, the amount of inductance is proportional to the area overlap of inductor and conductive surface. In a manner similar to capacitive plate overlap variation, one surface has a conductive material and the other has the inductor. Applications are:<br>Position and displacement measurements.<br>Shear load measurement<br>Torsion load measurements<br>Relative plate orientation |
| Inductor distance from receiving and transmitting antenna(e) | When capacitance and inductance are fixed, amplitude of response is dependent upon distance from receiving antenna and transmitting antenna. Both antennae must have a fixed position and orientation. Response frequency will not vary but response amplitude will vary as the inductor's position relative antenna(e) changes. Applications are displacement and displacement rate measurements such as tire rotation, motion of a linkage, etc. |
| Numeric encoding | The relative number of inductors in series can be used for numeric coding in a manner similar to that for the interdigital capacitor. |

Specific Sensor Embodiments

EXAMPLE 1

Sensing Element for Closed Cavities having Low RF Transmissivity

Examples of closed cavities for which measurements are desired within a cavity include metal fuel tanks and landing gear struts. Metal enclosures have low transmissivity for the RF energy. The magnetic field produced from an electrically active inductor is eliminated when placed in very close proximity to an electrically conductive material. This means that antennae or inductors can not be placed on the surface of an electrically conductive material or embedded in electrically conductive composite materials (e.g., graphite fibers). Additionally, to use a conductive material to support an antenna made from metal foil or metal deposited on a thin film, the antenna must be separated, such as by use of a spacer. The thickness of the spacer is dependent on the amount of field strength that the antenna can lose without losing its ability to acquire its measurement. The same is true for the inductor used in the sensor. If the sensor is placed on a conductive surface, the capacitor can be placed in contact with the surface (a dielectric layer must separate the capacitor and the surface), but the inductor must be separated from the surface via a spacer. Similarly, the capacitor can be embedded within conductive composite layers but the inductor must be placed on the outside and separated.

When the cavity containing the sensor 16 is made of a conductive material and the antenna 12 is external to the cavity, the inductor must also be external to the cavity to allow the sensor 16 to be exposed to the antenna's 12 varying magnetic field. The inductor must be maintained in a fixed position relative to and separated from the conductive surface.

Figure 17:
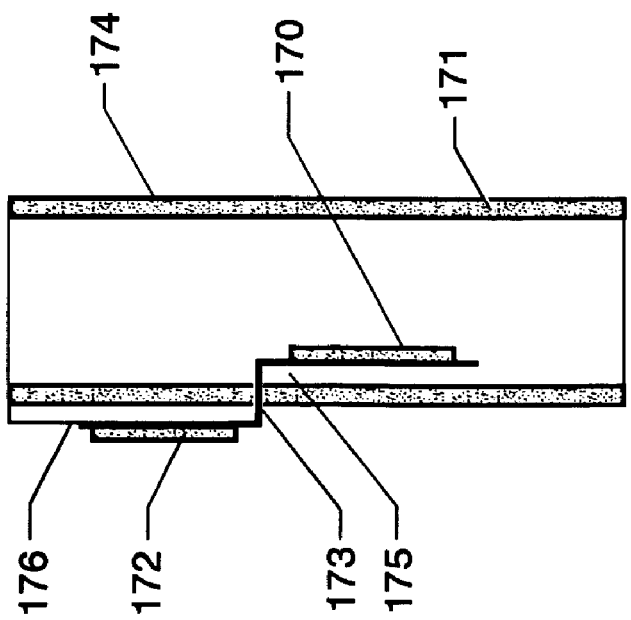
FIG. 17 is a schematic of a conductive closed cavity sensor configuration.

A representative embodiment is shown in FIG. 17. The capacitive element 170 of the sensor 16 is situated in a closed cavity 171 and the inductive element 172 of the sensor 16 is placed outside of the closed cavity. This allows the inductive portion 172 of the sensor to radiate in essentially open space and transmit the information gathered by the enclosed capacitive element 170. A broadband antenna broadcasts electromagnetic energy within the frequency range of the sensor and receives the emissions of the sensor 16, which signals are processed to identify phenomena associated with each sensor 16.

Figure 18:
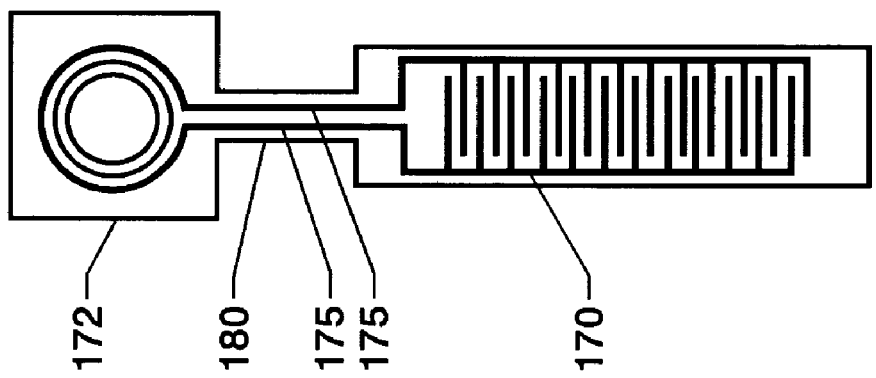
FIG. 18 is a schematic of a sensor for a conductive closed cavity.

Referring to FIG. 18, a narrow throat portion 180 of the sensor 16 connects the inductor 172 to the capacitor 170. The throat 180 is of sufficient length to allow the capacitor 170 to be appropriately placed within the cavity 171. The inductor 172 is placed outside the cavity 171, and separated from the cavity wall 174 via nonconductive spacer 176. The throat 180 is fed through the orifice 173 in the cavity wall 174 that is used to fill the cavity 171 (e.g., fuel tank opening) and connects the inductor 172 and capacitor 170 via electrical leads 175 to form a parallel circuit. Another embodiment is to have the inductor 172 and capacitor 170 fabricated as separate units. In this embodiment, the inductor 172 is mounted external to the cavity 170 and the capacitor 170 is mounted internal to the cavity 171. Electrical leads 175 are fed through the orifice 170 that is used to fill the cavity 171 and connect the inductor 172 and capacitor 170 to form a parallel circuit.

Figure 19:
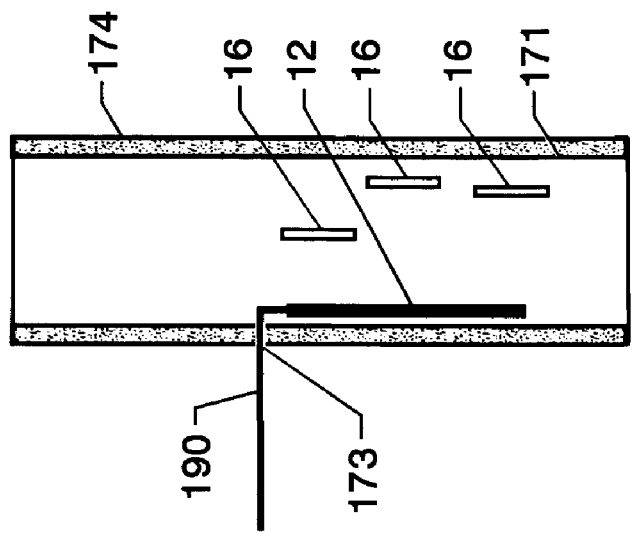
FIG. 19 is a schematic of a conductive cavity with antenna and multiple sensors located internal to the cavity.

Referring to FIG. 19, when a cavity 171 containing multiple sensors 16 is made of a conductive material, an antenna 12 can be placed internal to cavity 171. An internal antenna 12 allows all components of the sensors 16 to reside inside the cavity 171. The antenna 12 must be separated from the conductive surface 174. The inductors must be maintained in a fixed position relative to and separated from the conductive surface 174. Antenna leads 190 feed through orifice 173.

EXAMPLE 2

Sensing Element for Material Phase Transition and Strain Measurement

Figure 20B:
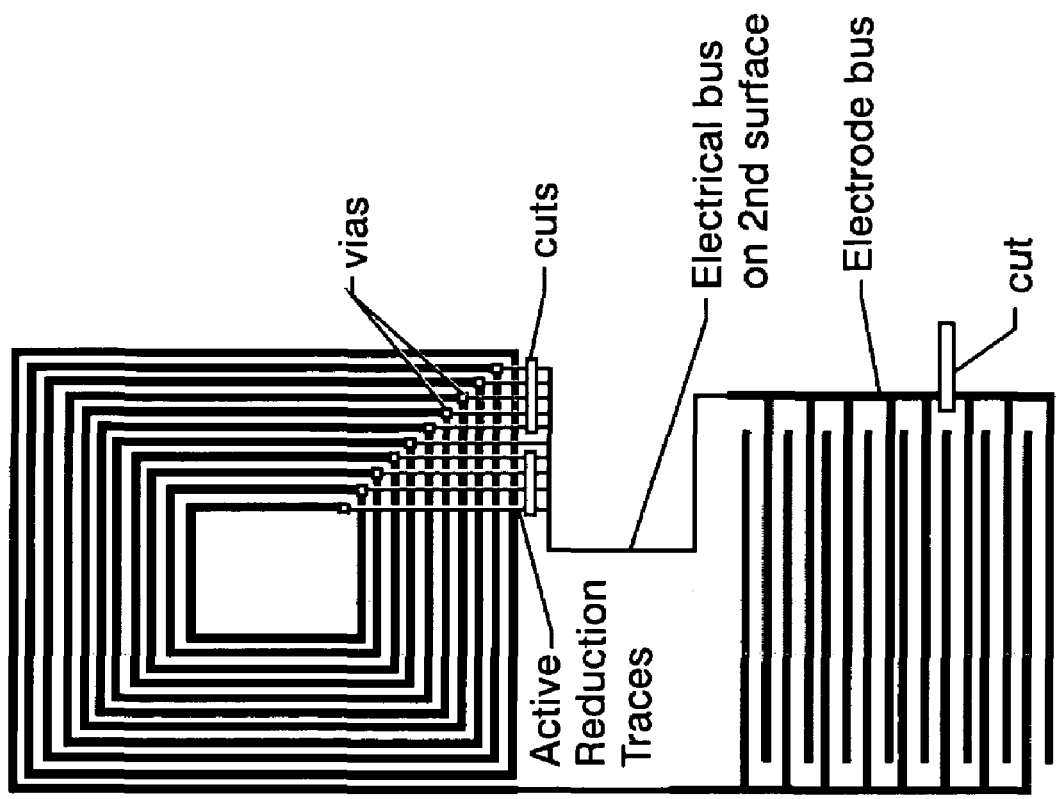
FIG. 20b illustrates a sensor embodiment that can be used to distinguish parts during curing.
Figure 20A:
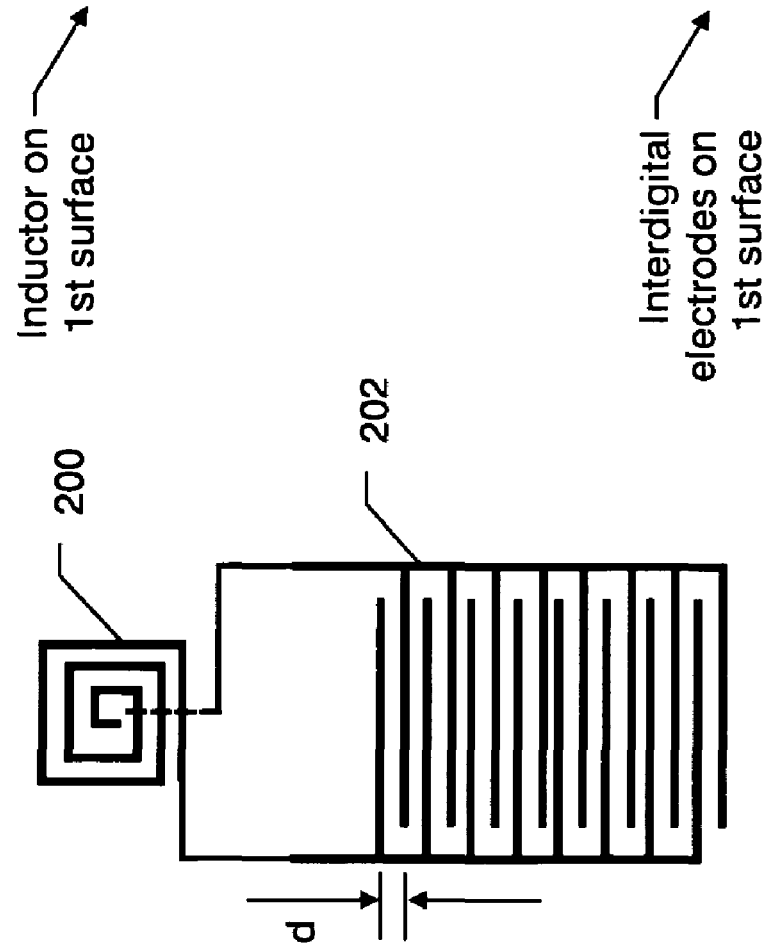
FIG. 20a is a schematic of a sensor embodiment for phase transition and strain measurement.

FIG. 20a illustrates a sensor embodiment used to measure material phase transition. The inductor 200 is formed as a square spiral trace of copper. Interdigital electrodes are used for the capacitor 202. The inductor 200 and the capacitor 202 are deposited on a thin dielectric film. A single antenna 12 is used to power the sensor 16 and to receive its response. The resonant frequency of the sensor 16 is 5.6 MHz. As an experimental example, the sensor 16 was placed in the bottom of a plastic container. Liquid resin was poured into the container and became a dielectric of the capacitor 202, resulting in the sensor 16 resonant frequency changing to 4.8 MHz. As the resin cured, its dielectric constant changed, resulting in a changed capacitive value of the sensor 16. FIG. 20b is an embodiment that distinguishes parts during curing. The circuit can be programmed easily to have a response range for one part (to be cured) different from another. FIG. 21 shows a time history of the magnetic field response resonant frequency during resin curing. As seen in FIG. 21, the response frequency had no further change after 100 minutes, when the curing was complete. This embodiment can also be used for strain measurements. When the sensor 16 is affixed to a surface, the separation, d, between electrodes will change when the surface is strained. As the separation changes, the capacitance, and thus the resonant frequency, of the circuit changes.

EXAMPLE 3

Sensing Element for Wear and Thermal Measurements

Figures 23, 24:
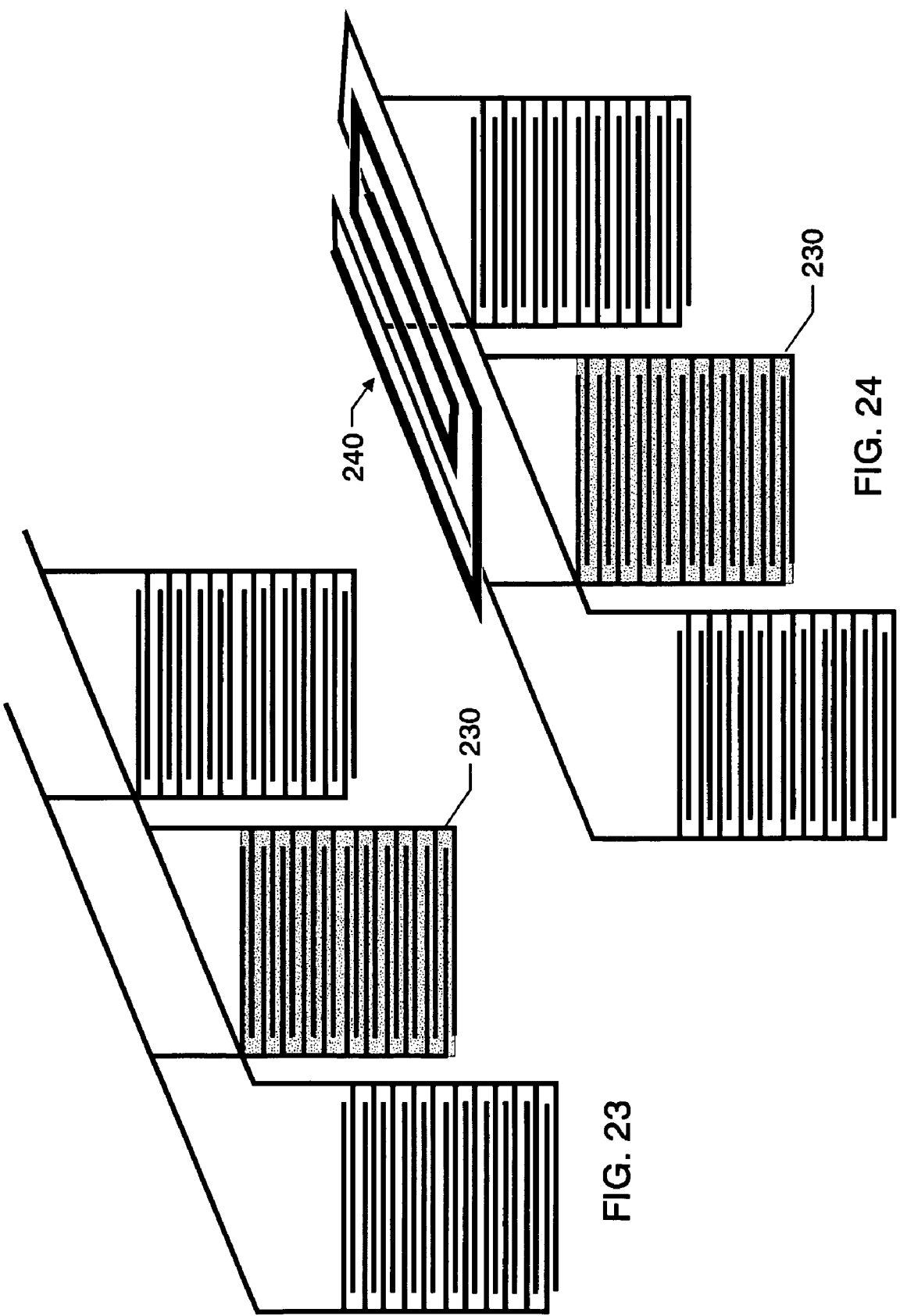
FIG. 23 illustrates an embodiment of an interdigital device with one of the electrodes having a temperature sensitive dielectric or a dielectric which has a phase transition when exposed to excessive temperature.
FIG. 24 illustrates a sensor embodiment for wear or thermal measurement having the inductor embedded within the capacitor.

Applications for sensors 16 which measure wear or temperature include landing gear or automotive brakes. The sensors 16 can incorporate either the individual functions of wear and temperature measurement or both combined. A first embodiment utilizes one or more interdigital electrodes 220 positioned such that the electrodes 220 are parallel to the surface of wear, as illustrated in FIG. 22. The metal used for the electrodes 220 is a metal that can wear away more easily than the surface for which wear is to be measured. The device is positioned while the volume (of which one surface is to have its wear measured) is liquid. The liquid is cured to a solid, thereby embedding the capacitive element. Furthermore, the curing of the material can be monitored. After the material is cured, the sensor can be used for wear measurements. As the surface wears away, the primary electrical buses wear away. As wear increases, electrodes 220 are severed from the bus, thereby altering the capacitance of the device. FIG. 23 illustrates an embodiment of an interdigital device with one of the electrodes 230 having a temperature sensitive dielectric or a dielectric which has a phase transition (i.e., solid to liquid) when exposed to excessive temperature. The phase transition dielectric solidifies when the temperature is reduced below critical. Hence, it has the function of wear measurement and excessive temperature indications. When a temperature sensitive dielectric is used, the capacitance changes proportionally with temperature. When a phase transition dielectric is used, the capacitance changes more dramatically when the phase changes.

Figure 25:
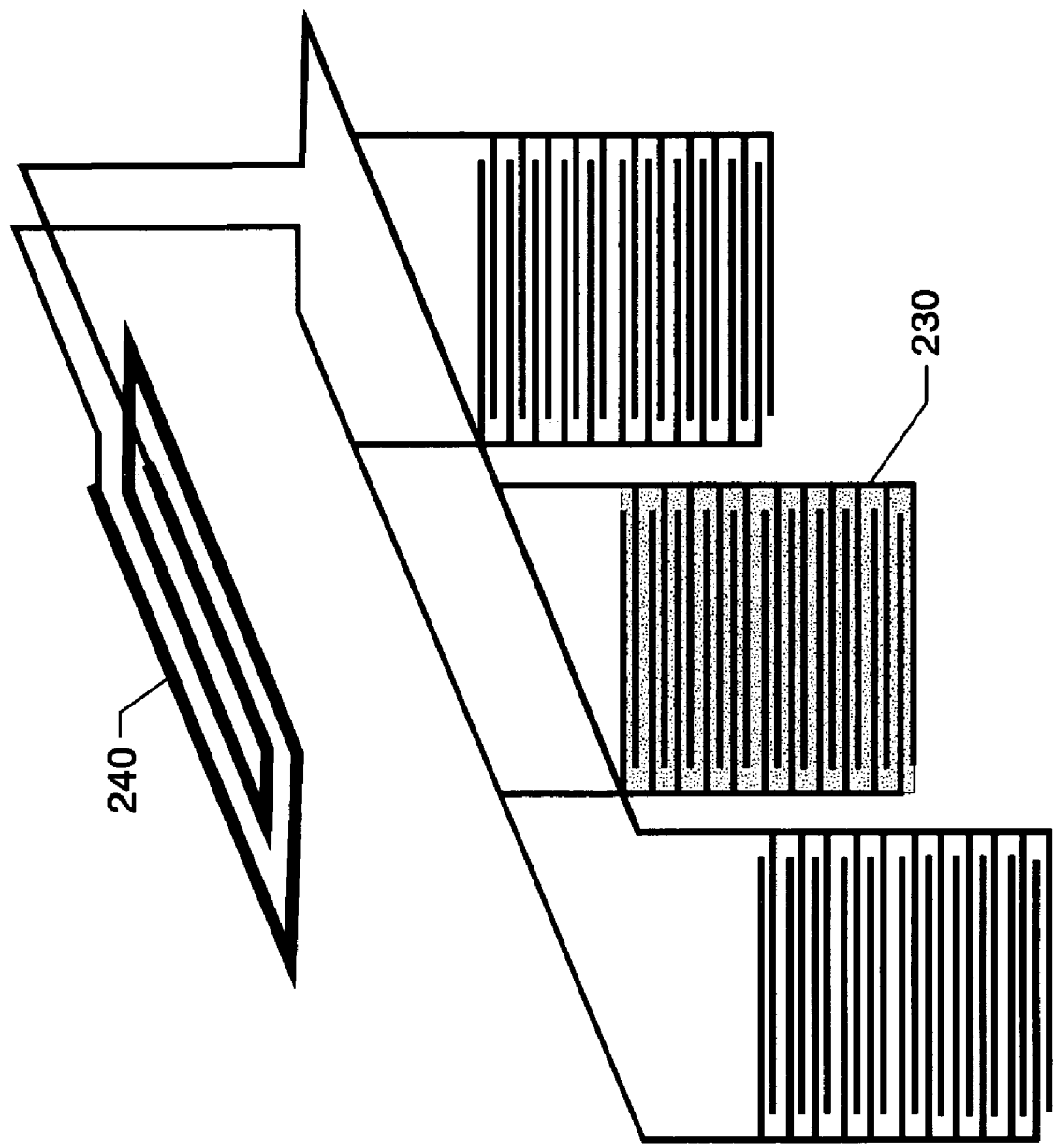
FIG. 25 illustrates a sensor embodiment for wear or thermal measurement having the inductor mounted externally.
Figure 26:
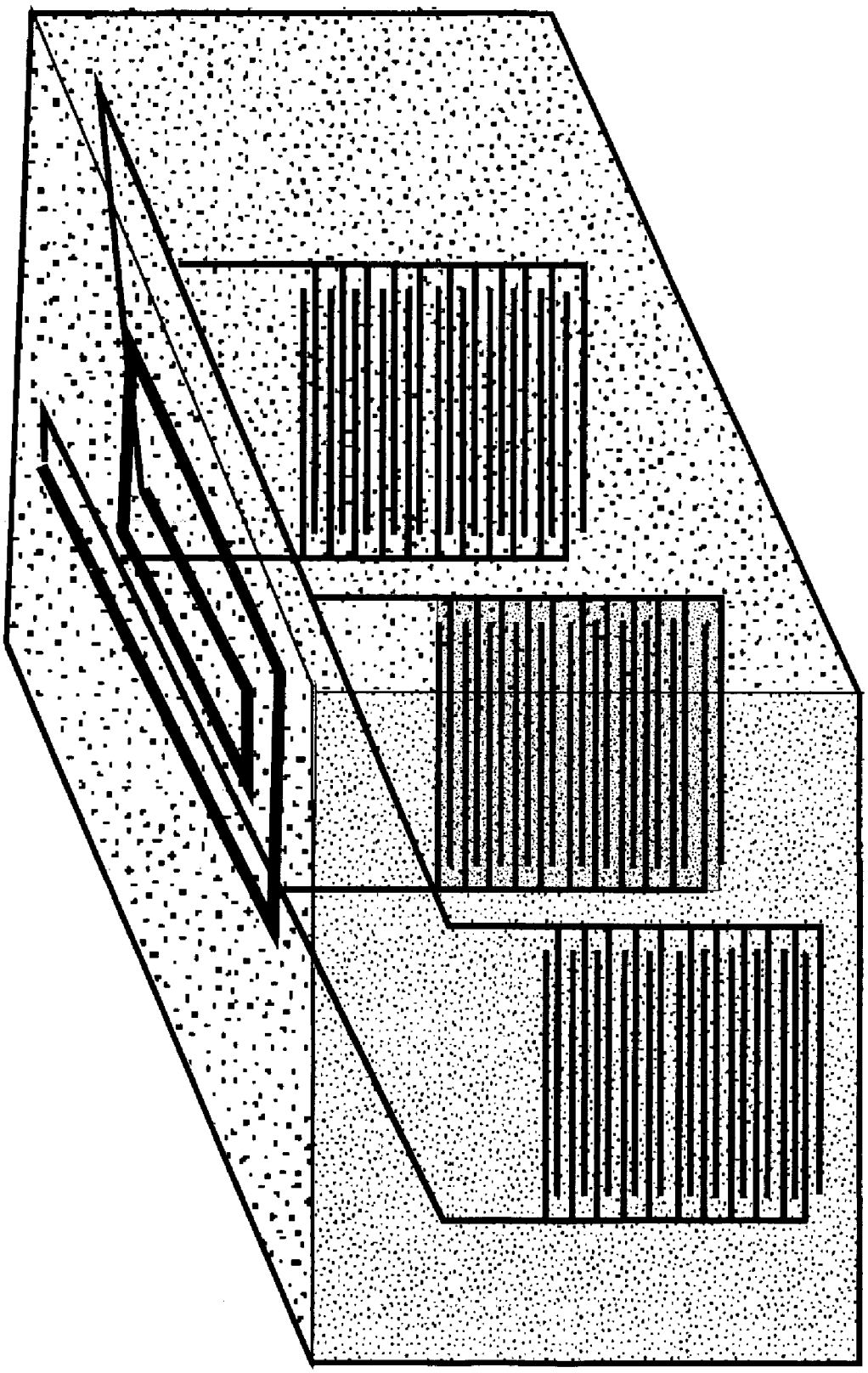
FIG. 26 a sensor embodiment for wear or thermal measurement having a sensor embedded in a cube.

When directly deposited, spiral inductors, such as shown in FIG. 12, are advantageous functionally; however, other inductors may be used. The inductor is electrically connected to the upper leads of the interdigital electrodes to form the sensor 16, as shown in FIG. 24. In FIG. 24, the inductor 240 is embedded with the capacitor. In environments where the cured material and capacitive elements are partially encased in metal or other encasements which reduce the transmissivity of radio frequency energy, the inductor can be mounted external to the encasement and connected to the capacitive element (e.g., flex circuits). This is illustrated in FIG. 25. FIG. 26 illustrates the sensor embedded in a rectangular cube.

Another means of developing the capacitive element for wear measurement is to use interdigital electroplates, as shown in FIG. 27. Similar to the device shown in FIG. 22, the metal used for the electrodes is a metal that can wear away more easily than the surface of which wear is to be measured. The capacitive device is placed while the volume is liquid. The liquid is cured to a solid, thereby embedding the capacitive device. As the surface wears away, the area of the electric plates wears away, altering the capacitance of the device.

FIG. 28 illustrates an embodiment of the interdigital electroplates with temperature sensitive dielectric, thermomagnetic or a phase transition dielectric 280 between the electroplates. The temperature sensitive dielectric or the phase transition dielectric 280 add their respective functionality as described above.

Another embodiment utilizes direct deposition of one or more interdigital electrodes as a thin film positioned such that the electrodes are parallel to the surface of wear. The electrodes are positioned along an outer surface of the material for which wear is to be determined. If the electrodes are coated with a layer temperature sensitive dielectric, thermomagnetic or a phase transition material; the embodiment can be used for both wear and thermal measurements.

For wear measurement, an inductor is placed on the upper surface of a material whose thickness is lessened with wear and the lower surface is in contact with a conductive material. As material wears, inductance decreases due to increased proximity to conductive material. If the interdigital electrodes are used and are coated with a layer temperature sensitive dielectric, thermomagnetic or a phase transition material; the embodiment can be used for both wear and thermal measurements.

EXAMPLE 4

Sensor for Displacement Measurements

Figure 31:
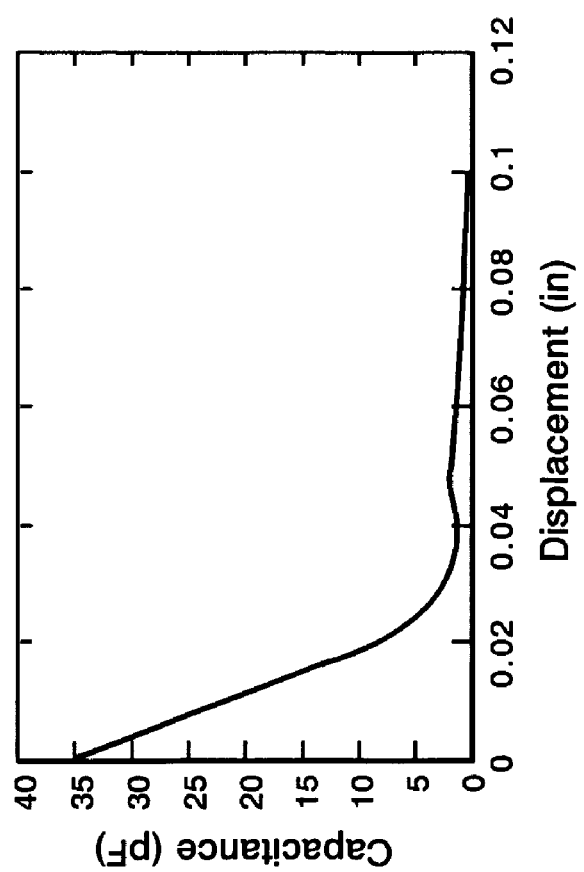
FIG. 31 is a first graph of capacitor variation with displacement.

A first embodiment of a sensor for displacement measurements is illustrated in FIG. 31. This embodiment comprises two parallel electroplates 290 (negative) and 291 (positive). One electroplate is stationary. The other electroplate has an opposite charge and moves perpendicular to its surface. The direction of electric field E is indicated. The capacitance, C(x), is dependent upon the distance that the plates are separated, x.

$$C(x) = \frac{\varepsilon_0 l w}{x} \quad (30)$$

When the electroplate capacitor is coupled to an inductor, such as the square spiral inductor illustrated in FIG. 12, thus forming a parallel circuit, the resonant electrical frequency of the circuit is $$\omega(x) = \frac{1}{\sqrt{LC(x)}}. \quad (31)$$

Figure 30:
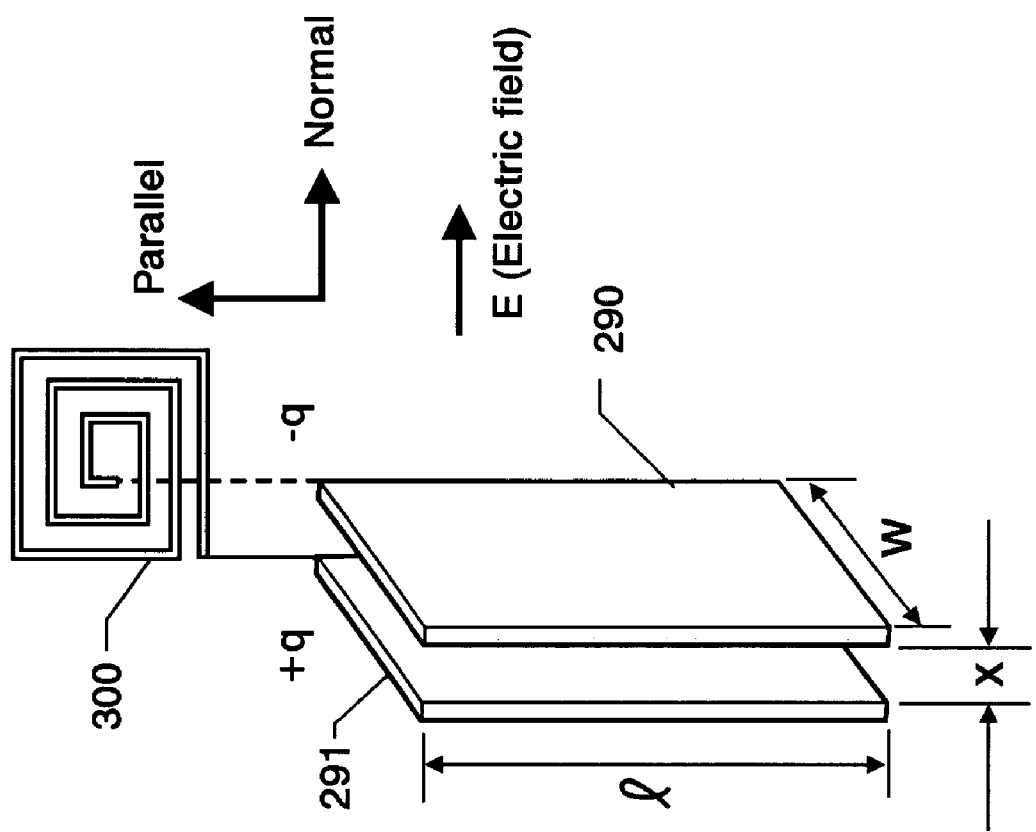
FIG. 30 illustrates an embodiment of a sensor for displacement measurements.

Although a square spiral is illustrated in FIG. 12, other inductor designs can be used. The complete sensing element, showing inductor 300, is illustrated in FIG. 30.

Inclusion of the equation for capacitance, Equation (30), into the Equation for resonant frequency, Equation (31), results in the following expression which relates the resonant frequency to plate separation distance.

$$\omega(x) = \left[\frac{L\varepsilon_0 l w}{x}\right]^{-1/2} \quad (32)$$

The variation in frequency with respect to separation plate separation distance is $$\frac{d\omega(x)}{dx} = +\frac{1}{2}\left[\frac{L\varepsilon_0 l w}{x}\right]^{-3/2}\left[\frac{L\varepsilon_0 l w}{x^2}\right]. \quad (33)$$

Figure 32:
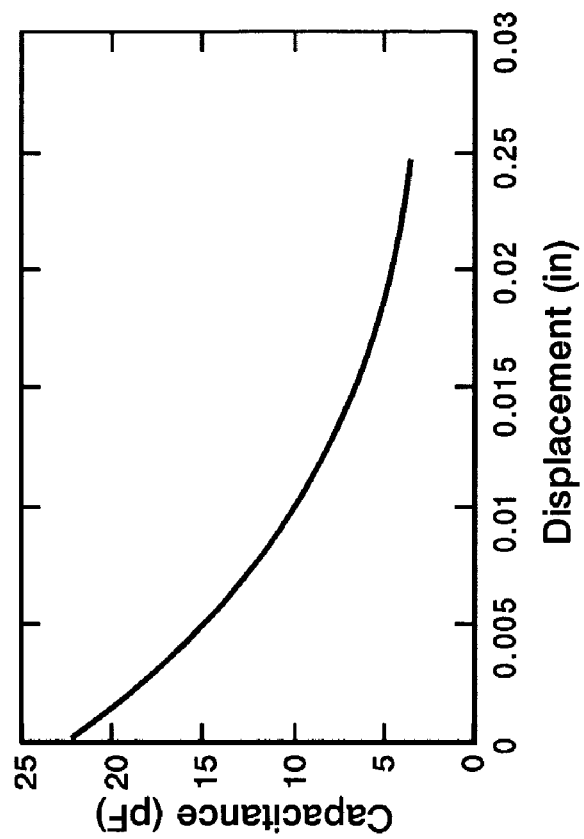
FIG. 32 is a second graph of capacitor variation with displacement.

The frequency variation is dominated by the inverse quadratic term. The frequency change will become more pronounced as the plates are brought closer together. The sensitivity of the frequency with respect to the separation distance is of order $x^{-1/2}$. Capacitance variation with displacement is shown in FIGS. 31 and 32. FIG. 31 shows results of a total displacement of 0.10 inches using displacement increments of 0.025 in. A more refined resolution is shown in FIG. 32, where increments of 0.005 in. were used for a total displacement of 0.025 inches. The dielectric is ambient air.

Key design parameters of this embodiment are the total length of electroplates, l, and the width of the plates, w. The equations shown in Table XII relate the sensitivity of the resonant frequency changes to changes in the aforementioned key parameters (i.e., sensitivity changes resulting from a variation in a parameter).

TABLE XII

Sensitivity resulting from parameter change

| Parameter | Sensitivity |
| --- | --- |
| Length of electroplates | $\frac{d\omega}{dl} = -\frac{1}{2}\left[\frac{L\varepsilon_0 l w}{x}\right]^{-3/2}\left[\frac{L\varepsilon_0 w}{x}\right]$ |

TABLE XII-continued

Sensitivity resulting from parameter change

| Parameter | Sensitivity |
| --- | --- |
| Width of electroplates | $\frac{d\omega}{dw} = -\frac{1}{2}\left[\frac{L\varepsilon_0 l w}{x}\right]^{-3/2}\left[\frac{L\varepsilon_0 l}{x}\right]$ |

As the plates 290 and 291 are made longer or wider, the resonant frequency becomes less sensitive to displacement, as can be seen from the two sensitivity expressions.

Figure 33:
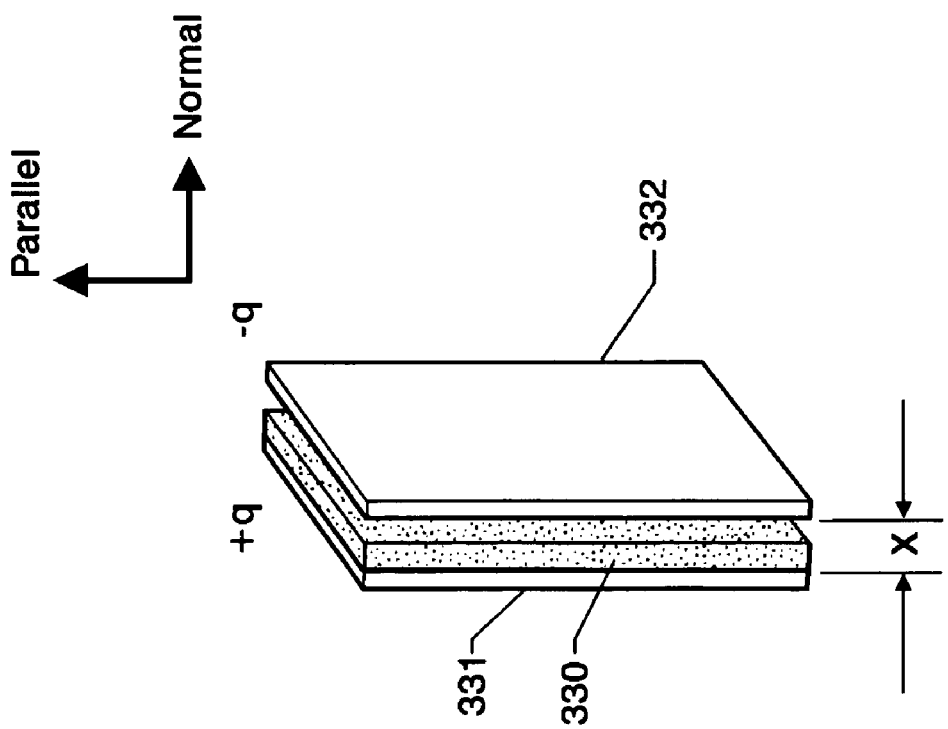
FIG. 33 illustrates a second embodiment of a sensor for displacement measurements.

A second embodiment, illustrated in FIG. 33, comprises a dielectric 330 of thickness, b, affixed to a stationary electroplate 331 (positive). The voltage across the electroplates 331 and 332 (negative) is dependent upon the electric field through the dielectric, $E_b$, and the free air, E.

$$V = -\int_0^x E(l) \cdot dl \quad (34)$$
$$= -\int_0^x E(l)\cos(180°) dl$$
$$= \int_0^x E(l) dl$$
$$= E_b b + E(x-b)$$

The electric field in the dielectric is $$E_b = \frac{E}{\kappa}. \quad (35)$$

Therefore the voltage across the plates 331 and 332 is $$V = E\left(\frac{b}{\kappa} + x - b\right) \quad (36)$$
$$= E\left[x - b\left(1 - \frac{1}{\kappa}\right)\right]$$

The capacitance across the plates 331 and 332 is $$C(x) = \frac{q}{V} = \frac{\varepsilon_0 w l E}{E\left[x - b\left(1 - \frac{1}{\kappa}\right)\right]} \quad (37)$$
$$= \frac{\varepsilon_0 w l}{\left[x - b\left(1 - \frac{1}{\kappa}\right)\right]}$$

resulting in the following expression for resonant frequency $$\omega(x) = \left[\frac{L\varepsilon_0 l w}{\left[x - b\left(1 - \frac{1}{\kappa}\right)\right]}\right]^{-1/2}. \quad (38)$$

Equation (38) is the more general expression for the displacement sensor embodied as capacitive plates that have relative translations that are perpendicular to each other. When no dielectric is present, it reduces to that of Equation (31).

The variation in frequency with respect to separation plate separation distance is $$\frac{d\omega(x)}{dx} = +\frac{1}{2}\left[\frac{L\varepsilon_0 lw}{\left[x - b\left(1 - \frac{1}{\kappa}\right)\right]}\right]^{-3/2} \frac{L\varepsilon_0 lw}{\left[x - b\left(1 - \frac{1}{\kappa}\right)\right]^2}. \quad (39)$$

The frequency variation is dominated by the inverse quadratic term. The frequency change will be more pronounced as the plates are brought closer together. The sensitivity of the frequency with respect to the separation distance is of order $$\left[x - b\left(1 - \frac{1}{\kappa}\right)\right]^{-1/2}.$$

Sensitivity is more pronounced for dielectrics of either increased thickness or higher dielectric constant.

Figure 34:
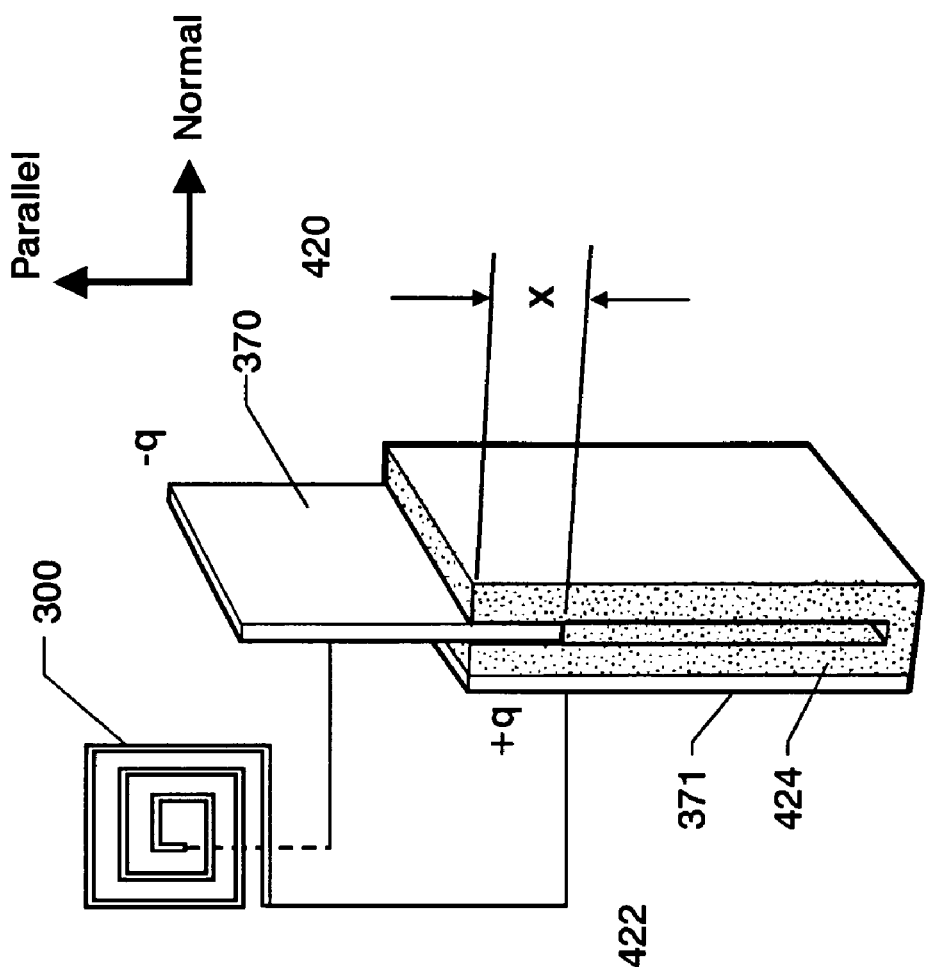
FIG. 34 illustrates a third embodiment of a sensor for displacement measurements.

A third embodiment, shown in FIG. 34, comprises two parallel electroplates 370 (negative) and 371 (positive). One electroplate is stationary. The other electroplate has an opposite charge and moves parallel to its surface. The capacitance, C(x), is dependent upon the length, x, that the plates overlap. The effective area of the capacitor is dependent upon the plates' overlap. The plates are separated by a distance, d. Each plate has width w. The resulting capacitance is $$C(x) = \frac{\kappa\varepsilon_0 wx}{d}. \quad (40)$$

When the electroplate capacitor is coupled to an inductor, as shown in FIG. 32, thus forming a parallel circuit, the resonant electrical frequency of the circuit is provided by Equation (31). Although a square spiral is shown in FIG. 12, other inductor designs can be used. The complete sensor is shown in FIG. 34. Inclusion of the equation for capacitance (Equation (41)) into that for resonant frequency (Equation (31)) results in the following expression which relates the resonant frequency to plate separation distance $$\omega(x) = \left[\frac{L\kappa\varepsilon_0 wx}{d}\right]^{-1/2}. \quad (41)$$

The variation in frequency with respect to the plate overlap length, x, is $$\frac{d\omega(x)}{dx} = +\frac{1}{2}\left[\frac{L\kappa\varepsilon_0 xw}{d}\right]^{-3/2}\left[\frac{L\kappa\varepsilon_0 w}{d}\right]. \quad (42)$$

Figure 35:
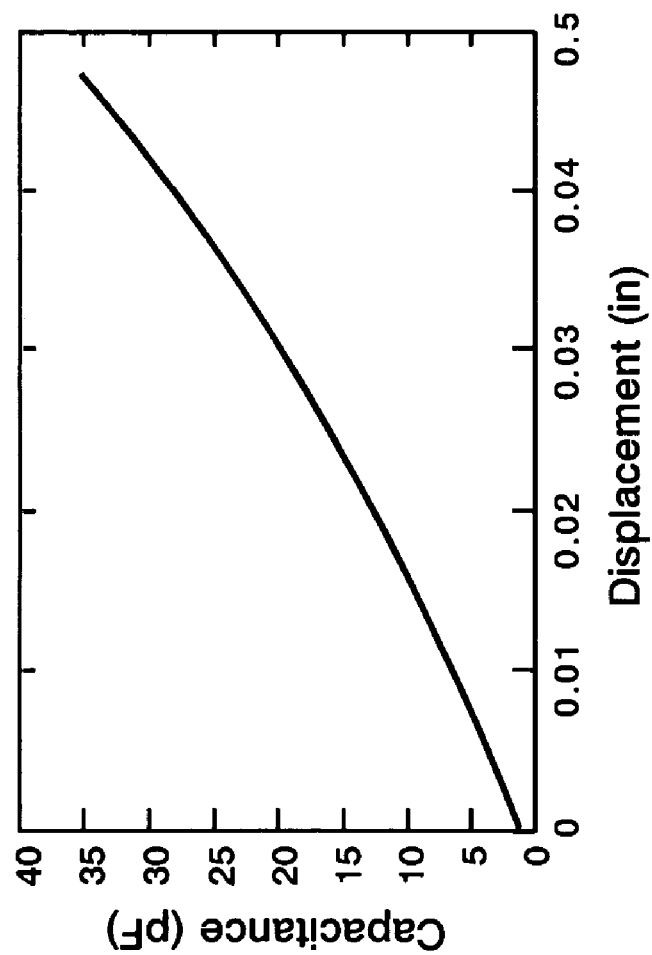
FIG. 35 is a graph showing capacitance variation with displacement.

The sensitivity of the frequency with respect to the separation distance is of order $x^{-3/2}$. Capacitance variation with displacement is shown in FIG. 35. FIG. 35 illustrates results of a total displacement of 0.475 inches using displacement increments of 0.025 in. The dielectric is ambient air.

Key design parameters of this embodiment are width of the plates, w; separation of plates, d, and the dielectric constant, κ. The equations in Table XIII relate the sensitivity of the resonant frequency changes to changes in the aforementioned key parameters (i.e., sensitivity change resulting from parameter variation)

TABLE XIII

Sensitivity resulting from parameter change

| Parameter | Sensitivity |
|---|---|
| Separation distance | $\frac{d\omega(x)}{d(d)} = +\frac{1}{2}\left[\frac{L\kappa\varepsilon_0 wx}{d}\right]^{-3/2}\left[\frac{L\kappa\varepsilon_0 wx}{d^2}\right]$ |
| Width of electroplates | $\frac{d\omega(x)}{dw} = -\frac{1}{2}\left[\frac{L\kappa\varepsilon_0 wx}{d}\right]^{-3/2}\left[\frac{L\kappa\varepsilon_0 x}{d}\right]$ |
| Dielectric constant | $\frac{d\omega(x)}{d\kappa} = -\frac{1}{2}\left[\frac{L\kappa\varepsilon_0 wx}{d}\right]^{-3/2}\left[\frac{L\kappa\varepsilon_0 wx}{d}\right]$ |

As the plates are made wider or if a larger dielectric constant is used, the resonant frequency becomes less sensitive to displacement, as can be seen from the two sensitivity expressions. Decreasing the separation distance of the plates increases the sensitivity to displacement.

Figure 36:
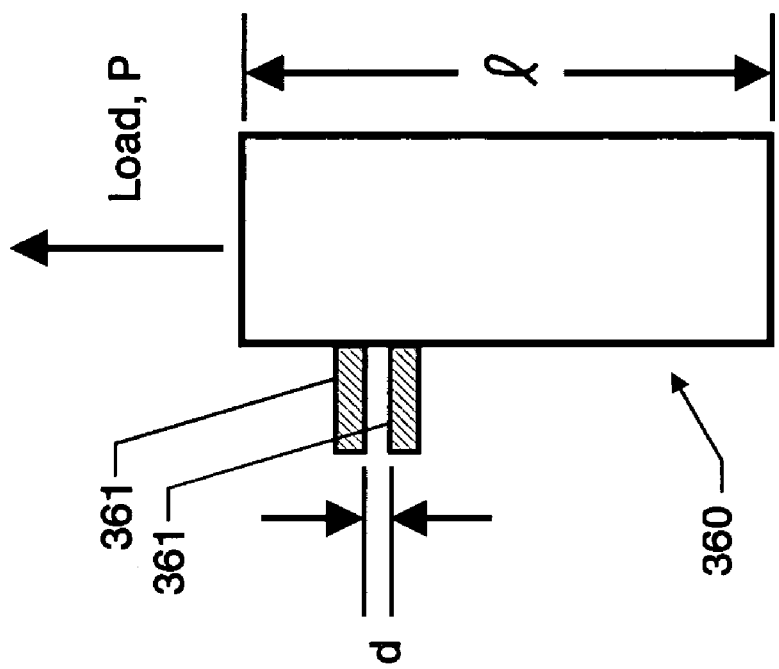
FIG. 36 illustrates a fourth embodiment of a sensor for displacement measurements.

A fourth embodiment is illustrated in FIG. 36. If a structural member 360 (rod, truss, beam, etc) of known elastic modulus, E, and cross sectional area, A, has two rigid electrically capacitive plates 361 affixed to it (either externally or embedded), axial compression or tension can be measured. The plates must be oriented such that the axial force, P, is perpendicular to their surface. The axial load is $$P = \epsilon AE \quad (43)$$

The elongation per unit length or strain, ε, is determined by $$\varepsilon = \frac{\ell - \ell_0}{\ell_0} = \frac{\Delta\ell}{\ell_0}. \quad (44)$$

The capacitance, C, is given by $$C = \varepsilon_c \frac{A_c}{d} \quad (45)$$

where $E_c$, $A_c$ and d are the permittivity, capacitor plate area and plate separation, respectively. Any change in capacitance is dependent upon the elongation of the member. Hence, $$\Delta\ell = \ell - \ell_0 = \Delta d = \varepsilon_c A_c\left(\frac{1}{C_2} - \frac{1}{C_1}\right) \quad (46)$$

Therefore, any applied axial load is $$P = \frac{AE\varepsilon_c A_c}{\ell_0}\left(\frac{1}{C_2} - \frac{1}{C_1}\right) \quad (47)$$

This embodiment allows axial load to be determined by measuring changes in capacitance. When the capacitor is electrically coupled to an inductor, axial load is now determined by changes in measured resonant frequency.

Interdigital electrodes could be used in lieu of the capacitive plates. A resistive sensor is bonded to a surface for which it is sensing shear. The surface material, the bond adhesive and the resistor all have different moduli of elasticity. When strained, each deforms separately. The effect is minimized when the substrate modulus is far higher that the adhesive and resistive material. However, for materials with low modulus, the resistive material could significantly dominate the overall composite modulus due to all constituent layers. Use of the capacitor eliminates this effect because the electroplates (electrodes) can move independent of each other.

EXAMPLE 5

Sensor for Fluid Level Measurement

Figure 29:
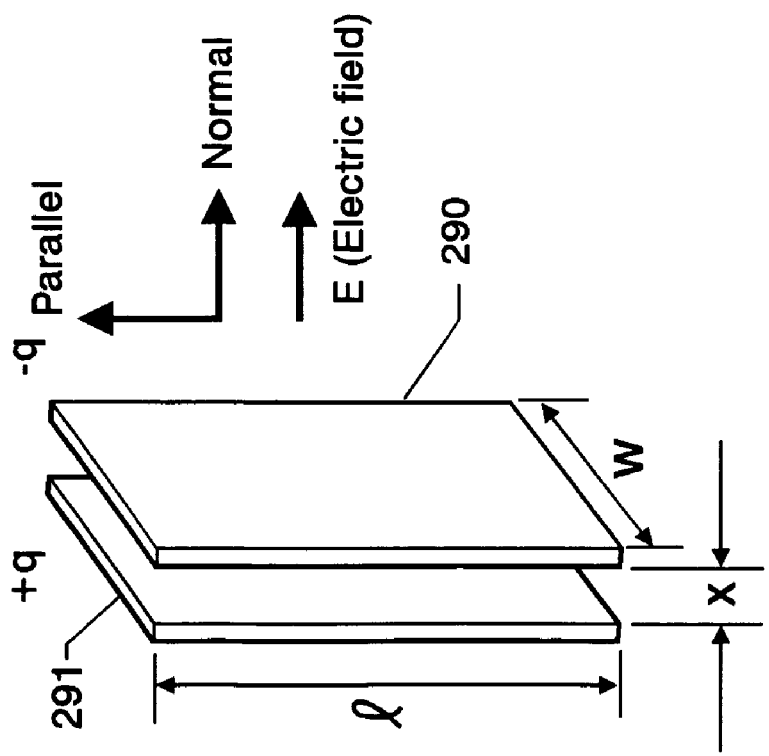
FIG. 29 illustrates a capacitor with a negative electroplate that translates perpendicular to its surface and a stationary plate.
Figure 37:
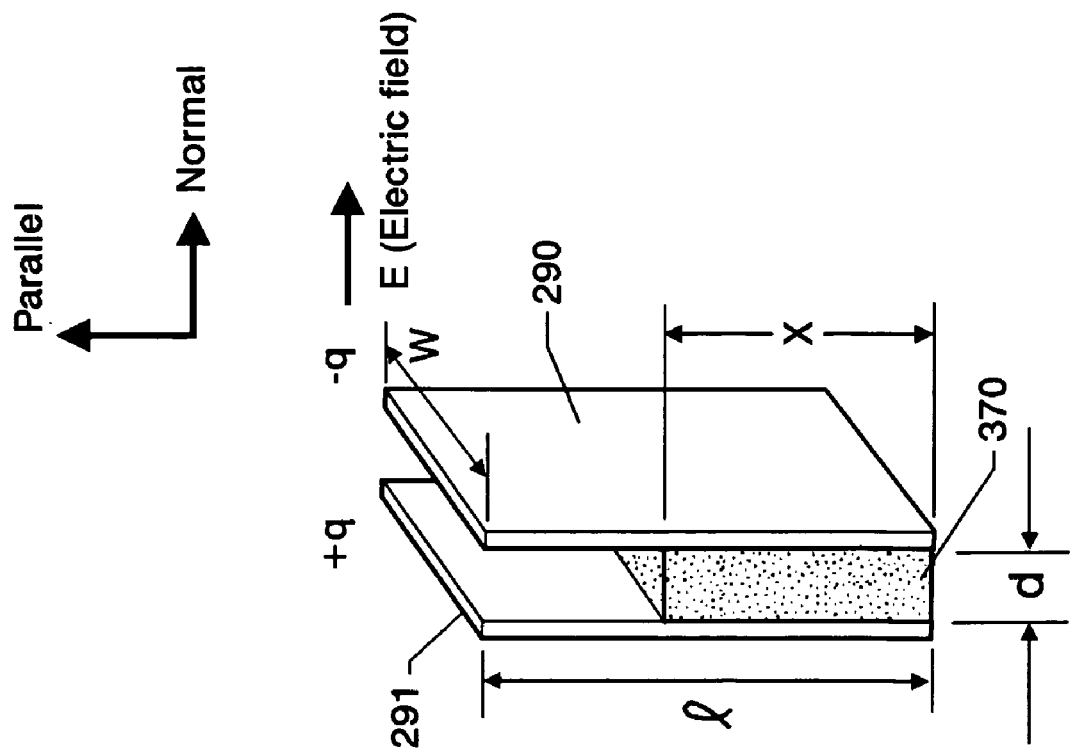
FIG. 37 illustrates electroplates and dielectric medium for a first embodiment of a sensor for fluid level measurements.

A first embodiment of a fluid level sensor, illustrated in FIG. 29, comprises two parallel electroplates 290 and 291. The direction of electric field E is indicated. In FIG. 37, a dielectric medium ($\kappa$, other than air) 370 fills a portion of the gap between the electric plates, which would alter the capacitance in a manner similar to having the capacitor partially immersed in the medium. The capacitance, C(x), is dependent upon the immersion depth, x, and is the combination of the capacitance of that portion of the electroplate that is not immersed in the medium and the capacitance of the portion that is immersed in the medium. The two portions of the capacitor act as a parallel capacitor since they share the same electric field.

$$C(x) = C_{free} + C_{immersed} \quad (48)$$
$$= (\ell - x)\frac{\varepsilon_0 w}{d} + \frac{\varepsilon_0 w}{d}\kappa x$$
$$= \frac{\varepsilon_0 w}{d}[\ell + x(\kappa - 1)]$$

When the capacitor is not immersed (i.e., dielectric medium level, x=0), the capacitance is $$C(x) = \frac{\varepsilon_0 w \ell}{d} \quad (49)$$

The capacitor completely immersed (i.e., dielectric medium level, x=1) has capacitance of $$C(x) = \frac{\kappa \varepsilon_0 w \ell}{d} \quad (50)$$

When the electroplate capacitor is coupled to an inductor, such as the square spiral inductor illustrated in FIG. 12, thus forming a parallel circuit, the resonant electrical frequency of the circuit is $$\omega = \frac{1}{\sqrt{LC(x)}}. \quad (51)$$

Figure 38:
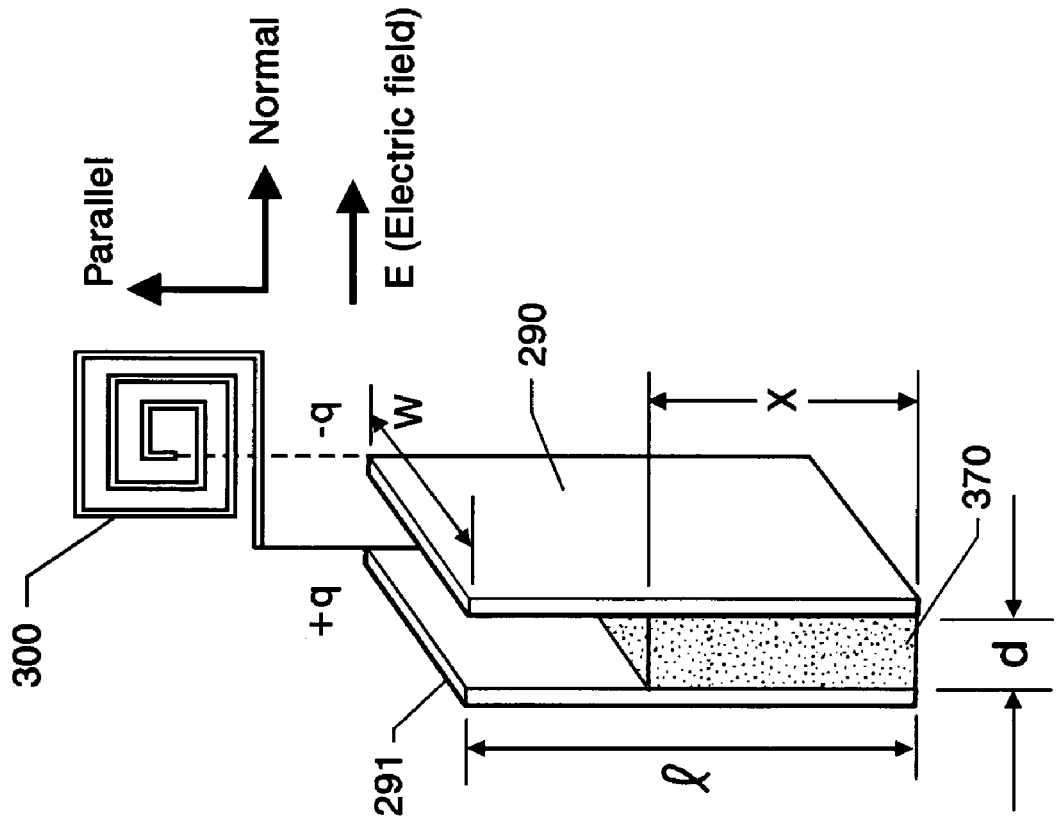
FIG. 38 illustrates a first embodiment of a sensor for fluid level measurements.

Although a square spiral is shown in FIG. 12, other inductor designs can be used. The complete sensor is shown in FIG. 38.

Inclusion of the equation for capacitance (Equation (48)) into that for resonant frequency (Equation (51)) results in the following expression which relates the resonant frequency to immersion depth $$\omega = \left[\frac{L\varepsilon_0 w}{d}[\ell + x(\kappa - 1)]\right]^{-1/2}. \quad (52)$$

Key design parameters of this embodiment are the total length of electroplates, l; width of the plates, w; separation of the plates, d; and the dielectric constant, $\kappa$, of the medium in which the plates are immersed. The equations shown in Table XIV relate the sensitivity of the resonant frequency changes to changes in the aforementioned parameters (i.e., sensitivity changes resulting from parameter variation).

TABLE XIV

Sensitivity resulting from parameter changes

| Parameter | Sensitivity |
|---|---|
| Length of electroplates | $\frac{d\omega}{dl} = -\frac{1}{2}\left[\frac{L\varepsilon_0 w}{d}[l + x(\kappa - 1)]\right]^{-3/2}\left[\frac{L\varepsilon_0 w}{d}\right]$ |
| Width of electroplates | $\frac{d\omega}{dw} = -\frac{1}{2}\left[\frac{L\varepsilon_0 w}{d}[l + x(\kappa - 1)]\right]^{-3/2}\left[\frac{L\varepsilon_0[l + x(\kappa - 1)]}{d}\right]$ |
| Separation of electroplates | $\frac{d\omega}{d(d)} = +\frac{1}{2}\left[\frac{L\varepsilon_0 w}{d}[l + x(\kappa - 1)]\right]^{-3/2}\left[\frac{L\varepsilon_0 w[l + x(\kappa - 1)]}{d^2}\right]$ |
| Dielectric constant | $\frac{d\omega}{d\kappa} = -\frac{1}{2}\left[\frac{L\varepsilon_0 w}{d}[l + x(\kappa - 1)]\right]^{-3/2}\left[\frac{L\varepsilon_0 w x \kappa}{d}\right] |

As the plates are made longer or wider, the resonant frequency becomes less sensitive to changes in dielectric constant level, as can be seen from the first two sensitivity expressions. The resonant frequency sensitivity to plate separation is inversely quadratic, which results in the sensitivity changing quadratically as the plates are placed closer together. When the electroplate capacitor is to be used for viscous fluids, the plate separation also effects any capillary action of the fluid.

Figure 39:
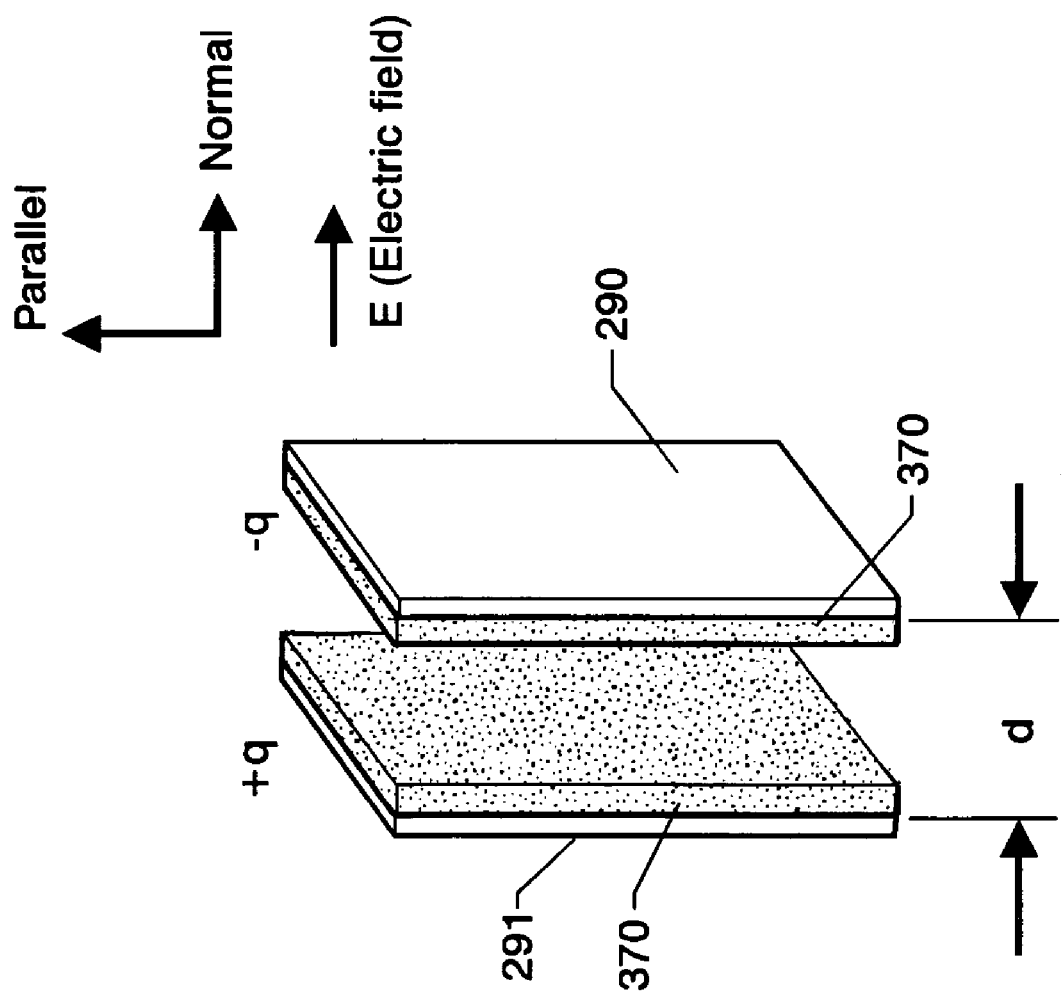
FIG. 39 illustrates electroplates having residual fluid film.

A consideration for using the sensor for viscous fluids is the effect of residual fluid film on the electroplates after the plates have been removed from the fluid. Many dielectrics leave a film residue when removed from the electroplates. FIG. 39 illustrates electroplates with a separation distance, d. A film of thickness, b, is to the left of each plate. The separation of the plates is far greater than the thickness of the film (i.e., b<<d). The voltage across the electroplates is dependent upon the electric field through the dielectric, $E_b$, and the free air, E.

$$V = -\int_0^d E \cdot d\ell \qquad (53)$$
$$= -\int_0^d E\cos(180°) d\ell$$
$$= \int_0^d E d\ell$$
$$= 2E_b b + E(d - 2b)$$

The electric field in the dielectric is provided by Equation (35). Therefore the voltage across the plates is $$V = E\left(\frac{2b}{\kappa} + d - 2b\right) \qquad (54)$$
$$= E\left(d - 2b\left(1 - \frac{1}{\kappa}\right)\right)$$

To determine the effect of the dielectric, it is necessary to examine the term $$\left(1 - \frac{1}{\kappa}\right)$$

for extreme values of κ. The lower bounds of value that the dielectric can have is the value in vacuum (κ=1). The dielectric value of air is approximately 1 (κ≈1). Therefore if no dielectric film was present, $$\left(1 - \frac{1}{\kappa}\right) \approx 0 \qquad (55)$$

For cases in which the dielectric constant is greater than 1

$$\lim_{\kappa \to \infty}\left(1 - \frac{1}{\kappa}\right) = 1. \qquad (56)$$

Therefore $$0 \leq \left(1 - \frac{1}{\kappa}\right) \leq 1. \qquad (57)$$

which results in the following two voltage extrema $$Ed \leq E\left(d - 2b\left(1 - \frac{1}{\kappa}\right)\right) \leq E(d - 2b). \qquad (58)$$

The latter extrema is that which can be used to determine the effect of the dielectric film. Using the latter extrema, the voltage across the electroplates is $$V = E(d - 2b) \approx Ed \text{ for b<<d.} \qquad (59)$$

Thus, the film has a negligible effect on the voltage across the electroplates and, thus, the capacitance across the plates.

Figure 41:
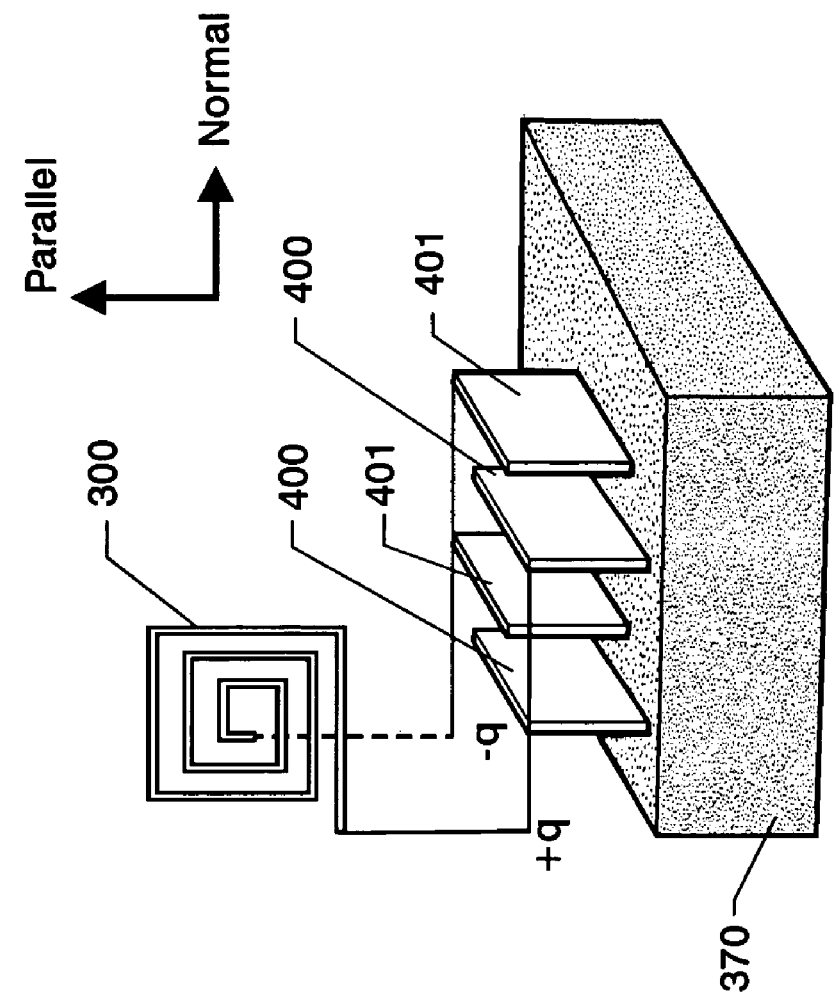
FIG. 41 illustrates a second embodiment of a sensor for fluid level measurements.
Figure 40:
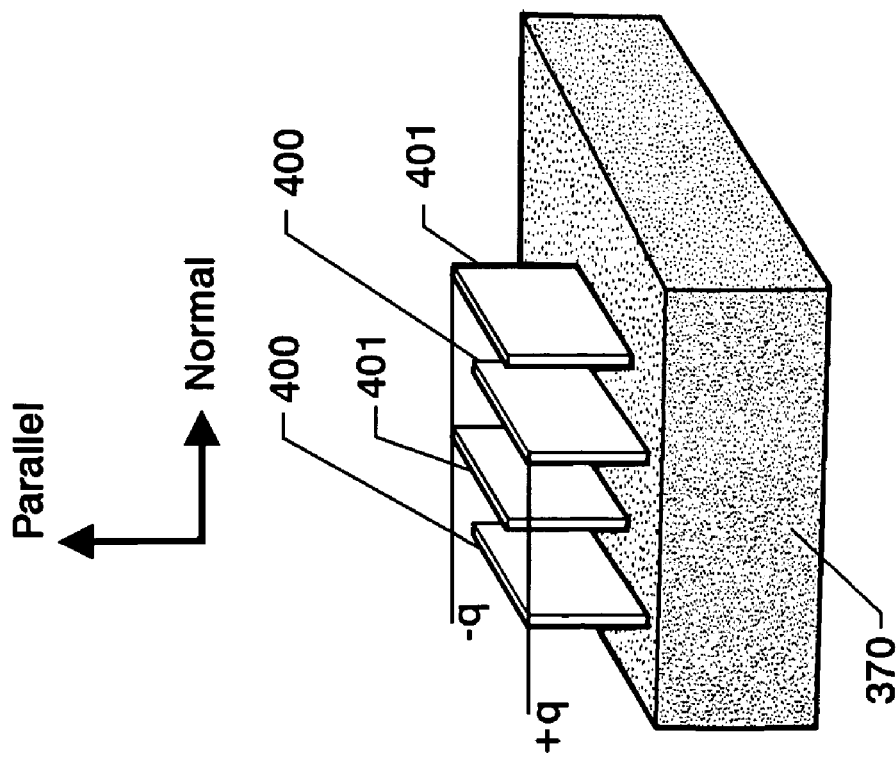
FIG. 40 illustrates n pair of parallel electroplates and dielectric medium for a second embodiment of a sensor for fluid level measurements.

A second embodiment of a fluid level sensor, illustrated in FIG. 40, comprises n pairs of parallel electroplates. A pair is any surface of a positive plate 400 facing the surface of a negative plate 401. The key geometric parameters are those provided in FIG. 29. The direction of electric field E is indicated. A dielectric medium 370 (κ, other than air) fills a portion of the gap between the electric plates 400 and 401 that would alter the capacitance in a manner similar to having the plates 400 and 401 partially immersed in the medium. The capacitance, C(x), is provided by Equations (48), (49) and (50), each multiplied by n. The resonant electrical frequency is provided by Equation (52). Although a square spiral is shown in FIG. 12, other inductor designs can be used. The complete sensor is shown in FIG. 41. Inclusion of the equation for capacitance (Equation (48)) into that for resonant frequency (Equation (51)), modified by factor n, results in the following expression which relates the resonant frequency to immersion depth $$\omega = \left[\frac{nL\varepsilon_0 w}{d}[l + x(\kappa - 1)]\right]^{1/2} \qquad (60)$$

The expression for resonant frequency is that of the single set of electroplates with a multiplying factor, n. Hence multiple plates can be used to tailor the resonant frequency so that its variation is within a specified range.

Key design parameters of this embodiment are number of parallel electroplate sets, n; total length of electroplates, l; width of the plates, w; separation of the plates, d, and the dielectric constant, κ, of the medium in which the plates are immersed. The equations in Table XV relate the sensitivity of the resonant frequency changes to changes in the aforementioned key parameters (i.e., sensitivity changes resulting from parameter variation).

TABLE XV

Sensitivity variation resulting from parameter change

| Parameter | Sensitivity |
|---|---|
| Number of electroplate sets | $\frac{d\omega}{dn} = -\frac{1}{2}\left[\frac{nL\varepsilon_0 w}{d}[l + x(\kappa - 1)]\right]^{-3/2}\left[\frac{L\varepsilon_0 w(l + x(\kappa - 1))}{d}\right]$ |
| Length of electroplates | $\frac{d\omega}{dl} = -\frac{1}{2}\left[\frac{nL\varepsilon_0 w}{d}[l + x(\kappa - 1)]\right]^{-3/2}\left[\frac{nL\varepsilon_0 w}{d}\right]$ |
| Width of electroplates | $\frac{d\omega}{dw} = -\frac{1}{2}\left[\frac{nL\varepsilon_0 w}{d}[l + x(\kappa - 1)]\right]^{-3/2}\left[\frac{nL\varepsilon_0(l + x(\kappa - 1))}{d}\right]$ |
| Separation of electroplates | $\frac{d\omega}{d(d)} = +\frac{1}{2}\left[\frac{nL\varepsilon_0 w}{d}[l + x(\kappa - 1)]\right]^{-3/2}\left[\frac{nL\varepsilon_0 w(l + x(\kappa - 1))}{d^2}\right]$ |
| Dielectric constant | $\frac{d\omega}{d\kappa} = -\frac{1}{2}\left[\frac{nL\varepsilon_0 w}{d}[l + x(\kappa - 1)]\right]^{-3/2}\left[\frac{nL\varepsilon_0 wx}{d}\right]$ |

As the plates are made longer or wider, the resonant frequency becomes less sensitive to changes in dielectric constant level, as can be seen from the second and third sensitivity expressions. The resonant frequency sensitivity to plate separation is inversely quadratic, which results in the sensitivity changing quadratically as the plates are placed closer together. When the electroplate capacitor is to be used for viscous fluids, the plate separation also affects any capillary action of the fluid. Increasing the number of electroplate sets increases the effect of the other key parameters of resonant frequency sensitivity. Therefore, more sensitivity is achieved when multiple plate sets are used and the separation distance between plates of opposite charge is small. However, as the other parameters are increased, the sensitivity is decreased. Another consideration for using the sensor for viscous fluids is the effect of residual fluid film on the electroplates after the plates have been removed from the fluid.

Figures 42, 43:
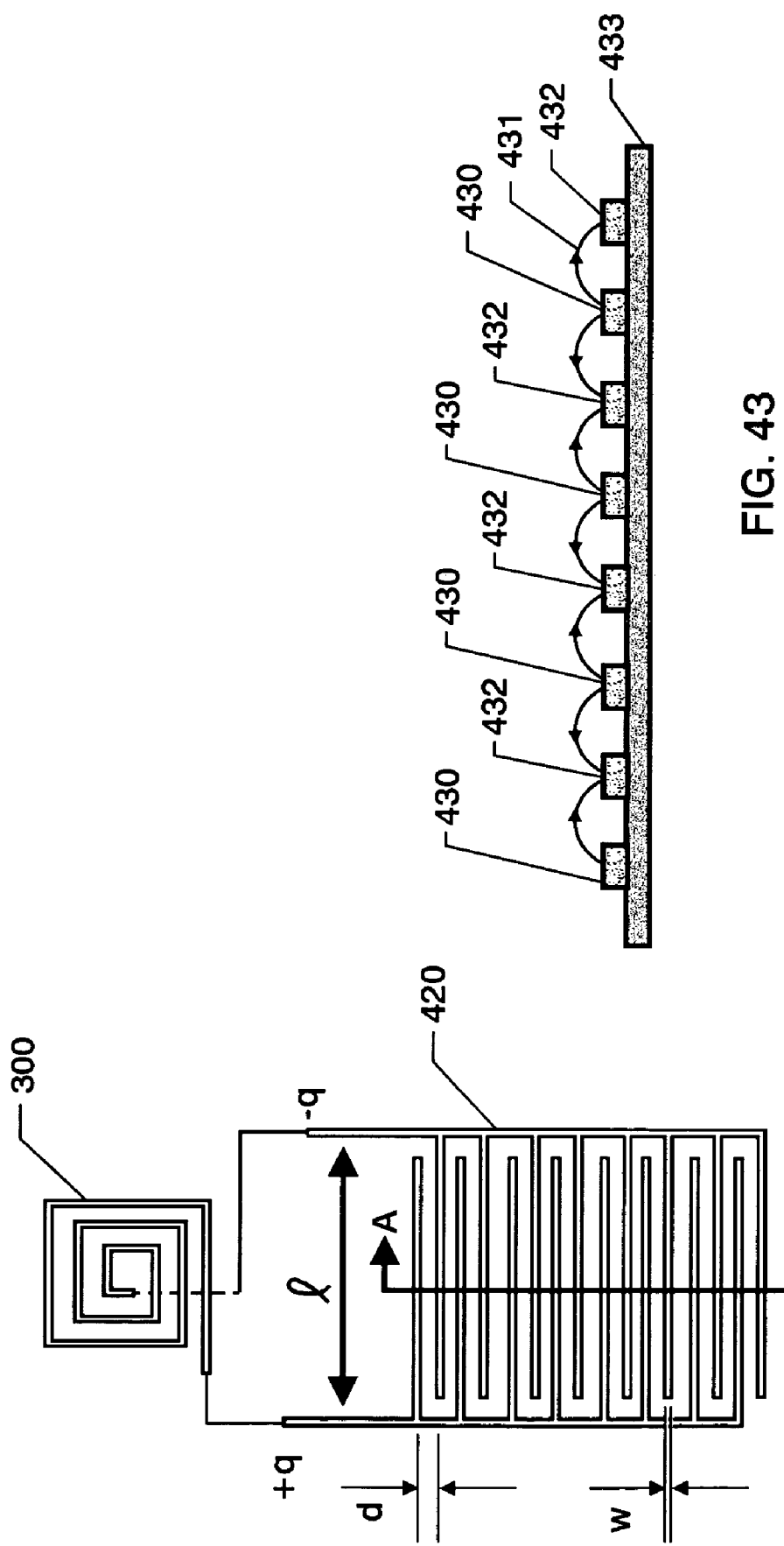
FIG. 42 illustrates a third embodiment of a sensor for fluid level measurements.
FIG. 43 illustrates a cross section of interdigital capacitor with electric field.

A third embodiment, illustrated in FIG. 42, comprises n pair of parallel interdigital electrodes 420 for the capacitor. The advantage of this method is that the entire sensor can be embodied as a lamina (e.g., thin film). The fluid sensor can be directly deposited to the wall of a non-conductive container via direct deposition. A pair is any positive electrode that neighbors a negative electrode. A cross sectional A–A' of electrically charged interdigital capacitor with electric field illustrated is FIG. 43. The electric field 431 starts from the positive electrodes 430 and ends at the negative electrodes 432, shown on substrate 433. Unlike the first and second embodiments, the electric field is not perpendicular to the electrodes. Portions of the field near the electrodes are parallel to the plane of the electrodes. The electric has its highest concentration near the plane of the electrodes.

Figures 44, 45:
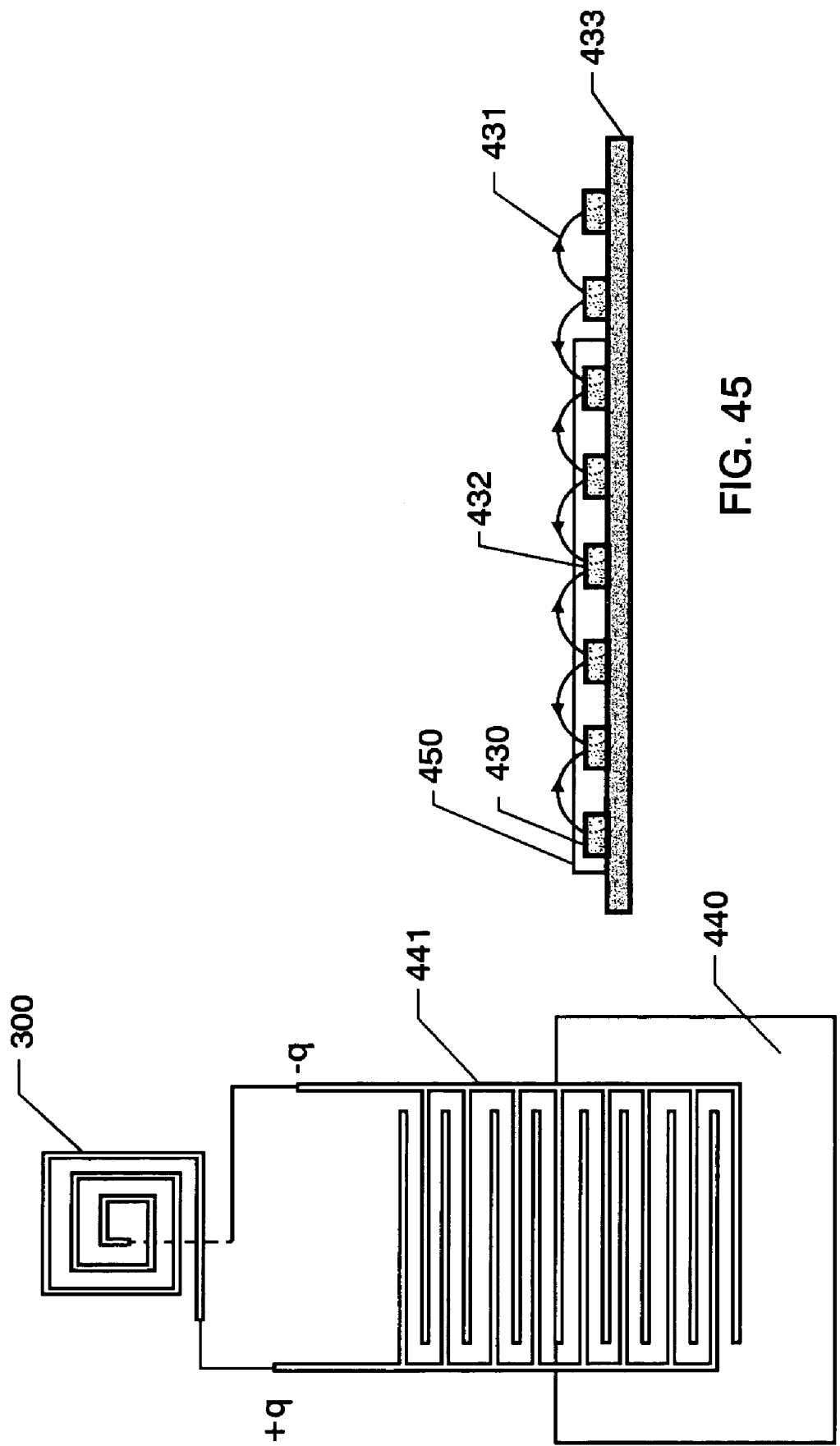
FIG. 44 illustrates a dielectric medium in contact with electrode pairs.
FIG. 45 illustrates electrodes with a thin residual film.

In FIG. 44, a dielectric medium ($\kappa$) 440 is in contact with m pairs of electrodes 441 (e.g., placed in a fluid such that m electrode pairs are submersed). The capacitance, C(m), is dependent upon the number of electrode pairs, m, in contact with the dielectric and those pairs which are not in contact. All of the electrode pairs 441 are parallel capacitors since they share the same electric field. Another feature that distinguishes this embodiment from the first and second is that the measurement variation to dielectric contact are discrete with the interdigital electrodes, but are continuous when the electroplates are used.

$$C(m) = C_{free} + C_{immersed} \quad (61)$$

$$= (n-m)\frac{\varepsilon_0 wl}{d} + \frac{m\kappa\varepsilon_0 wl}{d}$$

$$= \frac{\varepsilon_0 wl}{d}[n + m(\kappa - 1)]$$

When the capacitor is not immersed (i.e., dielectric medium level, m=0), the capacitance is $$C(m) = \frac{\varepsilon_0 nwl}{d} \quad (62)$$

The capacitor completely immersed (i.e., dielectric medium level, m=n) has capacitance of $$C(m) = \frac{\kappa\varepsilon_0 nwl}{d} \quad (63)$$

When the electroplate capacitor is coupled to an inductor, such as the square spiral illustrated in FIG. 12, thus forming a parallel circuit, the resonant electrical frequency of the circuit is $$\omega = \frac{1}{\sqrt{LC(m)}}. \quad (64)$$

Although a square spiral is shown in FIG. 12, other inductor designs can be used. The complete sensor is shown in FIG. 44.

Inclusion of the equation for capacitance (Equation (61)) into that for resonant frequency (Equation (64)) results in the following expression which relates the resonant frequency to immersion depth $$\omega = \left[\frac{L\varepsilon_0 wl}{d}[n + m(\kappa - 1)]\right]^{-1/2}. \quad (65)$$

Key design parameters of this embodiment are number of parallel electrode pairs, n; length of positive and negative electrode overlap, l; width of the electrodes, w; separation of the electrodes, d, and the dielectric constant, $\kappa$, of the medium in which the electrodes are immersed. The equations in Table XVI relate the sensitivity of the resonant frequency changes to changes in the aforementioned key parameters (i.e., sensitivity changes resulting from parameter change).

TABLE XVI

Sensitivity resulting from parameter change

| Parameter | Sensitivity |
|---|---|
| Number of interdigital electrode pairs | $\frac{d\omega}{dn} = -\frac{1}{2}\left[\frac{L\varepsilon_0 wl}{d}[n + m(\kappa - 1)]\right]^{-3/2}\left[\frac{L\varepsilon_0 wl}{d}\right]$ |
| Length of positive and negative electrode overlap | $\frac{d\omega}{dl} = -\frac{1}{2}\left[\frac{L\varepsilon_0 wl}{d}[n + m(\kappa - 1)]\right]^{-3/2}\left[\frac{L\varepsilon_0 w(n + m(\kappa - 1))}{d}\right]$ |
| Width of electrodes | $\frac{d\omega}{dw} = -\frac{1}{2}\left[\frac{L\varepsilon_0 wl}{d}[n + m(\kappa - 1)]\right]^{-3/2}\left[\frac{L\varepsilon_0 l(n + m(\kappa - 1))}{d}\right]$ |
| Separation of electrodes | $\frac{d\omega}{d(d)} = +\frac{1}{2}\left[\frac{L\varepsilon_0 wl}{d}[n + m(\kappa - 1)]\right]^{-3/2}\left[\frac{L\varepsilon_0 wl(n + m(\kappa - 1))}{d^2}\right]$ |
| Dielectric constant | $\frac{d\omega}{d\kappa} = -\frac{1}{2}\left[\frac{L\varepsilon_0 wl}{d}[n + m(\kappa - 1)]\right]^{-3/2}\left[\frac{mL\varepsilon_0 wl}{d}\right]$ |

As the electrode overlap becomes longer or as the electrodes are made, wider, the resonant frequency becomes less sensitive to changes in dielectric constant level, as Scan be seen from the second and third sensitivity expressions. The resonant frequency sensitivity to electrode separation is inversely quadratic, which results in the sensitivity changing quadratically as the plates are placed closer together. Increasing the number of electrode pairs increases the sensitivity effect of the other key parameters. Therefore, more sensitivity is achieved when multiple electrode pairs are used and the separation distance between plates of opposite charge is reduced. However, as the other parameters are increased, the sensitivity due to more electrode pairs is decreased.

Another consideration for using the sensor for viscous fluids is the effect of residual fluid film on the electroplates after the plates have been removed from the fluid.

The effect of dielectric film on the interdigital electrodes is more pronounced than on the electroplates. FIG. 45 illustrates some of the electrodes with a thin residual film. The electric field E is also indicated. The field lines are nearly parallel to the film, resulting in the electrical field being exposed to the dielectric at the part of the field that has the highest strength (near the surface). As a result of the more pronounced effect of residual film, the interdigital electrodes are suitable for viscous fluids (e.g., water, gas, alcohol).

Figure 46:
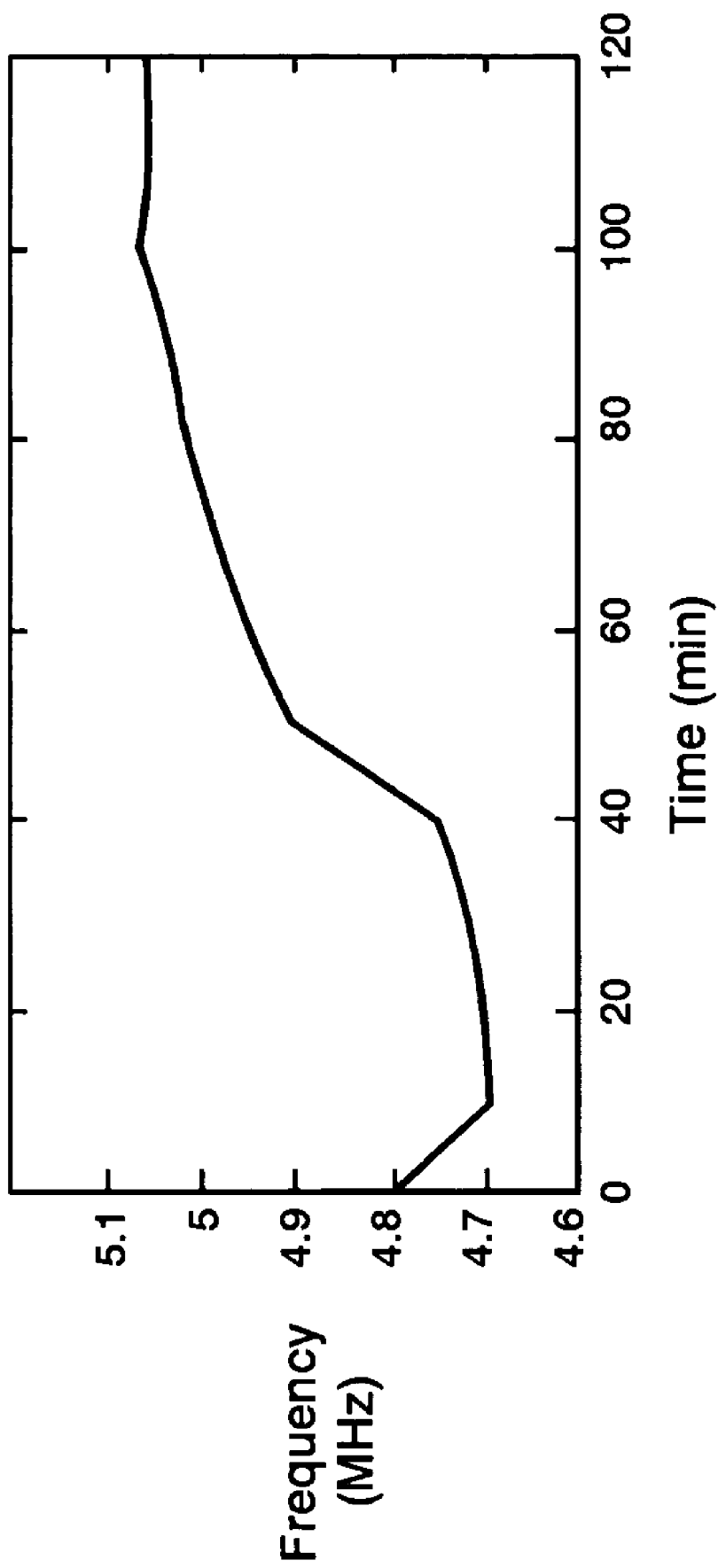
FIG. 46 is a graph of frequency measurement for two fluid level sensors.

As an experimental example, a magnetic field response fluid-level sensor embodiment is shown in FIG. 38. The sensor consists of two capacitive plates electrically coupled to an inductor. The capacitor was placed in a cylindrical container while the inductor remained outside the container. The container was filled with hydraulic fluid. As the fluid filled the void between the plates, the effective dielectric increased proportional to fluid immersion, thus changing the sensor's resonant frequency. Frequency measurements for two 9-inch fluid-level sensors of different widths are shown in FIG. 46. As the levels increased, the frequencies decreased. Fluid level was increased using 0.5 in increments. A fluid-level of 9 inches resulted in frequency reductions of over 1.1 MHz (⅛ in plate width) and 0.8 MHz (1/16 in plate width from that of the empty container. The sensor embodiment illustrated in FIG. 21 can also be used for measuring the fluid levels of non-viscous fluids. The electric field of the interdigital electrodes arcs from one positive electrode to its neighboring negative electrode. Most of the interdigital electrode's electric field is near the plane of the electrodes, whereas the electric field of the capacitive plates is perpendicular to the plates. The interdigital electrode's electric field has proportionally more exposure to the viscous fluid film residue (and more dielectric exposure) than that of the plates. The capacitive plates are necessary when viscous fluids are used because any residual film has a negligible effect on measurements. The amount of plate separation is designed to eliminate capillary effects. When non-viscous fluids are used (e.g., water, gasoline, alcohol), the interdigital electrodes do not require the volume necessary for plates since they can be placed on thin-film dielectrics or directly deposited to a surface. The interdigital electrodes are easier to fabricate and mount.

EXAMPLE 6

Sensor for Contact Measurement

A first embodiment of a sensor for contact measurement uses two separate components affixed to either surface. A component can either be an L-C circuit, inductor or capacitor. Table XVII lists combinations of components and their responses before and after contact. In (1) and (2), the circuit is altered by changing the value of existing constituents (e.g., adding capacitance or inductance). A circuit is created in (3) when the surfaces contact.

In a second embodiment, an L-C circuit is shorted when contact is made. (1) or (2) are the desired combinations. Magnetic field responses exist before and after contact. Hence, contact is gauged by a shift in frequency response. In the other cases, the response either exists before or after contact but not both.

Measuring the bond between two surfaces can be interrogated in the manner similar to contact. Component combinations of (1)–(4) can be used to determine bond also. The method can be extended to determine degree of separation using the numeric encoding method outlined in Tables VIII and Table X. The electrical contacts are distributed in an array throughout a first surface. The surface array has an inductor and capacitor which allows it to resonate (frequency is the resultant of single inductor and capacitor) even when not in contact with the other surface. A mating array of capacitors is on a second surface with their electrical leads facing toward and beneath those of the array on the second surface. When both surfaces are bonded, the resonant is the resultant of all the capacitors and a single inductor. If contact (hence, bond) is severed, the resonant will shift in frequency. As more contacts are broken, the frequency increases.

TABLE XVIII

Contact Combinations

| Component combinations | First component | Second component | Response prior to contact | Response after contact |
|---|---|---|---|---|
| (1) | L-C circuit | Capacitor | $\omega = \frac{1}{\sqrt{LC}}$ | $\omega = \frac{1}{\sqrt{2LC}}$ |
| (2) | L-C circuit | Inductor | $\omega = \frac{1}{\sqrt{LC}}$ | $\omega = \sqrt{\frac{2}{LC}}$ |
| (3) | Inductor | Capacitor | Does not exist (Circuit is not complete) | $\omega = \frac{1}{\sqrt{LC}}$ |
| (4) | L-C circuit | Conductive surface | $\omega = \frac{1}{\sqrt{LC}}$ | Does not exist (Circuit is shorted when it contacts conductive surface) |

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A magnetic field response measurement acquisition system, comprising:
   one or more inductively powered magnetic field response sensors, wherein one or more attributes of the one or more sensor responses correspond to one or more measured unrelated physical states and further wherein said one or more attributes are selected from the group consisting of amplitude, frequency and bandwidth;
   antenna means for transmitting magnetic fields to power said one or more sensors and for receiving magnetic field responses from said one or more sensors;
   an interrogation means for regulating said magnetic field transmission from and reception to said antenna means, and for analyzing said one or more sensor response attributes received from said one or more sensors, wherein said interrogation means can interrogate multiple sensors concurrently using a single acquisition channel, does not require that said signals from said one or more sensors be transmitted as modulated signals on a radio frequency carrier, and can concurrently acquire measurements of more than one unrelated physical state from each said sensor;

wherein said antenna means is a single switching antenna, and further wherein said interrogation means comprises the following steps:

(a) at the lower limit of a predetermined range, transmitting a radio frequency harmonic for a predetermined length of time from said antenna;

(b) switching said transmission mode of said antenna off;

(c) turning the receiving mode of said antenna on;

(d) rectifying the received response from said sensor to determine said rectified response's amplitude;

(e) storing the amplitude, $A_i(t)$, of said rectified response and the frequency, $\omega_i(t)$, of said transmitted radio frequency harmonic;

(f) switching the receiving mode off and the transmission mode on;

(g) shifting the transmitted radio frequency harmonic by a predetermined amount;

(h) transmitting the harmonic for a predetermined length of time;

(i) switching the transmission mode off;

(j) switching the receiving mode on;

(k) rectifying the received response from said sensor to determine said rectified response's amplitude;

(l) storing the amplitude, $Ai(t)$, of said rectified response and the frequency, $\omega_i(t)$, of said transmitted radio frequency harmonic;

(m) comparing said amplitude, $A_i$, to the two previously recorded amplitudes, $A_{i-1}$ and $A_{i-2}$;

(n) if said previous amplitude, $A_{i-1}$, is greater than said amplitude, $A_i$, and the previous amplitude, $A_{i-1}$, is greater than the amplitude prior to it, $A_{i-2}$, storing said amplitude, $A_{i-1}$, as the amplitude inflection and the corresponding frequency, $\omega_{i-1}$, for the current frequency sweep;

(o) subtracting $A_n(t)$, obtained n harmonic steps prior to that of i–2, from amplitude inflection, $A_{i-1}(t)$, obtained in step (n) and storing inverse $1/(A_{i-}(t)-A_n(t))$ as corresponding to response bandwidth;

(p) comparing said attributes of amplitude, frequency and the value corresponding to bandwidth steps (n) and (o) with attributes of next subsequent sweep of said sensor; and (q) once amplitude inflection has been reached, continuing the sweep to said next sensor.

2. The acquisition system of claim 1, wherein the sweep rate for each said sensor is dependent on the rate of change of the physical state being measured.

3. The acquisition system of claim 1, wherein said sensors have one or more different frequency resolutions.

4. The acquisition system of claim 1, wherein the frequency resolution of one or more sensors is not fixed.

5. The acquisition system of claim 1, wherein dynamic measurements are obtained by taking the variation in one or more response attributes selected from the group consisting of frequency, amplitude and the value corresponding to bandwidth of a current sweep with those of prior sweeps and referencing the variations to the elapsed time between current sweep and prior sweeps.

6. The acquisition system of claim 1, wherein a change in position of a sensor is obtained from comparison of amplitude variations of successive sweeps.

7. The acquisition system of claim 1, wherein said interrogation means determines amplitude, frequency and the value corresponding to bandwidth variation with time.

8. The acquisition system of claim 1, wherein said first sweep determines all resonant frequencies and corresponding amplitudes and all values corresponding to bandwidth.

9. The acquisition system of claim 1, wherein said sensors comprise inductor-capacitor circuits and one or more of the parameters selected from the group consisting of capacitance, inductance and resistance is variable.

10. The acquisition system of claim 1, wherein said sensors comprise inductor-capacitor-resistor circuits and one or more of the parameters selected from the group consisting of capacitance, inductance and resistance is variable.

11. A magnetic field response measurement acquisition system, comprising:

one or more inductively powered magnetic field response sensors, wherein one or more attributes of the one or more sensor responses correspond to one or more measured unrelated physical states and further wherein said one or more attributes are selected from the group consisting of amplitude, frequency and bandwidth;

antenna means for transmitting magnetic fields to power said one or more sensors and for receiving magnetic field responses from said one or more sensors;

an interrogation means for regulating said magnetic field transmission from and reception to said antenna means, and for analyzing said one or more sensor response attributes received from said one or more sensors, wherein said interrogation means can interrogate multiple sensors concurrently using a single acquisition channel, does not require that said signals from said one or more sensors be transmitted as modulated signals on a radio frequency carrier, and can concurrently acquire measurements of more than one unrelated physical state from each said sensor;

wherein said antenna means is separate transmission and receiving antennae; and further wherein said interrogation means comprises the following steps:

(a) at the lower limit of a predetermined range, transmitting a radio frequency harmonic for a predetermined length of time from said antenna;

(b) turning said transmission antenna off;

(c) turning said receiving antenna on;

(d) rectifying the received response from said sensor to determine said rectified response's amplitude;

(e) storing the amplitude, $A_i(t)$, of said rectified response and the frequency, $\omega_i(t)$, of said transmitted radio frequency harmonic;

(f) turning said receiving antenna off and transmission antenna on;

(g) shifting the transmitted radio frequency harmonic by a predetermined amount;

(h) transmitting the harmonic for a predetermined length of time;

(i) turning said transmission antenna off;

(j) turning said receiving antenna on;

(k) rectifying the received response from said sensor to determine said rectified response's amplitude;

(l) storing said current amplitude, $A_i(t)$, of said rectified response, and said frequency, $\omega_i(t)$, of said transmitted radio frequency harmonic;

(m) comparing said amplitude, $A_i$, to the two previously recorded amplitudes, $A_{i-1}$ and $A_{i-2}$;

(n) if said previous amplitude, $A_{i-1}$, is greater than said amplitude, $A_i$, and the previous amplitude, $A_{i-1}$, is greater than the amplitude prior to it, $A_{i-2}$, storing said amplitude, $A_{i-1}$, as the amplitude inflection and the corresponding frequency, $\omega_{i-1}$, for the current frequency sweep;

(o) subtracting $A_n(t)$, obtained n harmonic steps prior to that of i–2, from amplitude inflection, $A_{i-1}(t)$, obtained in step (n) and storing inverse $1/(A_{i-1}(t)-A_n(t))$ as corresponding to response bandwidth;

(p) comparing said attributes of amplitude, frequency and the value corresponding to bandwidth steps (n) and (o) with attributes of next subsequent sweep of said sensor; and (q) once amplitude inflection has been reached, continuing the sweep to said next sensor.

12. The acquisition system of claim 11, wherein the sweep rate for each said sensor is dependent on the rate of change of the physical state being measured.

13. The acquisition system of claim 11, wherein said sensors have one or more different frequency resolutions.

14. The acquisition system of claim 11, wherein the frequency resolution of one or more sensors is not fixed.

15. The acquisition system of claim 11, wherein dynamic measurements are obtained by taking the variation in one or more response attributes selected from the group consisting of frequency, amplitude and the value corresponding to bandwidth of a current sweep with those of prior sweeps and referencing the variations to the elapsed time between current sweep and prior sweeps.

16. The acquisition system of claim 11, wherein a change in position of a sensor is obtained from comparison of amplitude variations of successive sweeps.

17. The acquisition system of claim 11, wherein said interrogation means determines amplitude, frequency and the value corresponding to bandwidth variation with time.

18. The acquisition system of claim 11, wherein said first sweep determines all resonant frequencies and corresponding amplitudes and all values corresponding to bandwidth.

19. The acquisition system of claim 11, wherein said sensors comprise inductor-capacitor circuits and one or more of the parameters selected from the group consisting of capacitance, inductance and resistance is variable.

20. The acquisition system of claim 11, wherein said sensors comprise inductor-capacitor-resistor circuits and one or more of the parameters selected from the group consisting of capacitance, inductance and resistance is variable.

* * * * *